US011457142B2

(12) United States Patent
Mizuno

(10) Patent No.: US 11,457,142 B2
(45) Date of Patent: Sep. 27, 2022

(54) RECEPTION DEVICE, TRANSMISSION DEVICE, CONTROL METHOD, PROGRAM, AND TRANSMISSION AND RECEPTION SYSTEM

(71) Applicant: Sony Semiconductor Solutions Corporation, Kanagawa (JP)

(72) Inventor: Masatoshi Mizuno, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 308 days.

(21) Appl. No.: 16/618,619

(22) PCT Filed: May 25, 2018

(86) PCT No.: PCT/JP2018/020116
§ 371 (c)(1),
(2) Date: Dec. 2, 2019

(87) PCT Pub. No.: WO2018/225534
PCT Pub. Date: Dec. 13, 2018

(65) Prior Publication Data
US 2021/0360151 A1 Nov. 18, 2021

(30) Foreign Application Priority Data
Jun. 9, 2017 (JP) .............................. JP2017-114382

(51) Int. Cl.
*H04N 5/232* (2006.01)
*H04L 7/00* (2006.01)

(52) U.S. Cl.
CPC ....... *H04N 5/23227* (2018.08); *H04L 7/0008* (2013.01)

(58) Field of Classification Search
CPC ............. H04L 65/4092; H04L 65/4076; H04L 7/0008; H04N 5/23227

(Continued)

(56) References Cited

U.S. PATENT DOCUMENTS

2012/0120289 A1* 5/2012 Sugioka ................ G06F 13/385
348/294
2014/0013179 A1 1/2014 Takaku
(Continued)

FOREIGN PATENT DOCUMENTS

CN 102378004 A 3/2012
CN 102469277 A 5/2012
(Continued)

OTHER PUBLICATIONS

Extended European Search Report dated Apr. 2, 2020 for corresponding European Application No. 18813638.6.

*Primary Examiner* — Xi Wang
(74) *Attorney, Agent, or Firm* — Michael Best & Friedrich LLP

(57) ABSTRACT

The present technology relates to a reception device, a transmission device, a control method, a program, and a transmission and reception system capable of correcting a difference between data timings in respective communication links in a case where data is transmitted by using a plurality of communication links. The reception device according to the present technology executes processing for receiving data streams that have same data structures and are transmitted from a plurality of transmission units included in a transmission device by using a plurality of lanes in parallel and execute processing for integrating the received data streams into a single system data and acquiring a packet configuring the data stream and corrects a difference between corresponding pieces of data timings in respective communication links realized by each pair of the one transmission unit and the one reception unit. The present technology is applied to data transmission between chips.

13 Claims, 61 Drawing Sheets

(58) Field of Classification Search
USPC .................... 348/515, 294; 725/62; 709/217
See application file for complete search history.

(56) References Cited

U.S. PATENT DOCUMENTS

2015/0229467 A1   8/2015  Lee et al.
2015/0312476 A1  10/2015  Wakabayashi

FOREIGN PATENT DOCUMENTS

| | | |
|---|---|---|
| CN | 202889529 U | 4/2013 |
| JP | H08202653 A | 8/1996 |
| JP | 2004-289567 A | 10/2004 |
| JP | 2012-120159 A | 6/2012 |
| WO | 2007052229 A2 | 5/2007 |
| WO | 2009/005154 A1 | 1/2009 |
| WO | 2012/063949 A1 | 5/2012 |
| WO | 2014/013601 A1 | 1/2014 |

* cited by examiner

FIG. 7

| LARGE ITEM | SMALL ITEM | INFORMATION AMOUNT | CONTENT |
|---|---|---|---|
| FRAME INFORMATION | Frame Start | 1bit | INDICATE HEAD OF FRAME (EXAMPLE: FIRST LINE) |
| | Frame End | 1bit | INDICATE END OF FRAME (EXAMPLE: LINE BEFORE REAR DUMMY) |
| LINE INFORMATION | Line Valid | 1bit | INDICATE VALID/INVALID LINE |
| | Line Number | 13bit | INDICATE LINE NUMBER |
| OTHERS | Reserved | 32bit | SECURE FOR EXTENSIBILITY IN FUTURE |
| | Header ECC | 18byte | ECC OF HEADER INFORMATION |

FIG. 8

| Byte | Bit | Contents |
|---|---|---|
| H1 | 15 | CRC[15] X^15 |
| | 14 | CRC[14] X^14 |
| | 13 | CRC[13] X^13 |
| | 12 | CRC[12] X^12 |
| | 11 | CRC[11] X^11 |
| | 10 | CRC[10] X^10 |
| | 9 | CRC[9] X^9 |
| | 8 | CRC[8] X^8 |
| H0 | 7 | CRC[7] X^7 |
| | 6 | CRC[6] X^6 |
| | 5 | CRC[5] X^5 |
| | 4 | CRC[4] X^4 |
| | 3 | CRC[3] X^3 |
| | 2 | CRC[2] X^2 |
| | 1 | CRC[1] X^1 |
| | 0 | CRC[0] X^0 |

| Byte | Bit | Contents |
|---|---|---|
| H3 | 31 | Reserved[15] |
| | 30 | Reserved[14] |
| | 29 | Reserved[13] |
| | 28 | Reserved[12] |
| | 27 | Reserved[11] |
| | 26 | Reserved[10] |
| | 25 | Reserved[9] |
| | 24 | Reserved[8] |
| H2 | 23 | Reserved[7] |
| | 22 | Reserved[6] |
| | 21 | Reserved[5] |
| | 20 | Reserved[4] |
| | 19 | Reserved[3] |
| | 18 | Reserved[2] |
| | 17 | Reserved[1] |
| | 16 | Reserved[0] |

| Byte | Bit | Contents |
|---|---|---|
| H5 | 47 | Reserved[31] |
| | 46 | Reserved[30] |
| | 45 | Reserved[29] |
| | 44 | Reserved[28] |
| | 43 | Reserved[27] |
| | 42 | Reserved[26] |
| | 41 | Reserved[25] |
| | 40 | Reserved[24] |
| H4 | 39 | Reserved[23] |
| | 38 | Reserved[22] |
| | 37 | Reserved[21] |
| | 36 | Reserved[20] |
| | 35 | Reserved[19] |
| | 34 | Reserved[18] |
| | 33 | Reserved[17] |
| | 32 | Reserved[16] |

| Byte | Bit | Contents |
|---|---|---|
| H7 | 63 | Frame Start |
| | 62 | Frame End |
| | 61 | Line Valid |
| | 60 | Line Number[12] |
| | 59 | Line Number[11] |
| | 58 | Line Number[10] |
| | 57 | Line Number[9] |
| | 56 | Line Number[8] |
| H6 | 55 | Line Number[7] |
| | 54 | Line Number[6] |
| | 53 | Line Number[5] |
| | 52 | Line Number[4] |
| | 51 | Line Number[3] |
| | 50 | Line Number[2] |
| | 49 | Line Number[1] |
| | 48 | Line Number[0] |

FIG. 12

| Pixel | Bit |
|---|---|
| Pixel N | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |
| Pixel N+1 | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |
| Pixel N+2 | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |
| Pixel N+3 | Data[13] |
| | Data[12] |
| | Data[11] |
| | Data[10] |
| | Data[9] |
| | Data[8] |
| | Data[7] |
| | Data[6] |
| | Data[5] |
| | Data[4] |
| | Data[3] |
| | Data[2] |
| | Data[1] |
| | Data[0] |

⇒

| Byte | Bit | |
|---|---|---|
| Byte 1.75*N | Data[13] | Pixel N |
| | Data[12] | |
| | Data[11] | |
| | Data[10] | |
| | Data[9] | |
| | Data[8] | |
| | Data[7] | |
| | Data[6] | |
| Byte 1.75*N+1 | Data[13] | Pixel N+1 |
| | Data[12] | |
| | Data[11] | |
| | Data[10] | |
| | Data[9] | |
| | Data[8] | |
| | Data[7] | |
| | Data[6] | |
| Byte 1.75*N+2 | Data[13] | Pixel N+2 |
| | Data[12] | |
| | Data[11] | |
| | Data[10] | |
| | Data[9] | |
| | Data[8] | |
| | Data[7] | |
| | Data[6] | |
| Byte 1.75*N+3 | Data[13] | Pixel N+3 |
| | Data[12] | |
| | Data[11] | |
| | Data[10] | |
| | Data[9] | |
| | Data[8] | |
| | Data[7] | |
| | Data[6] | |
| Byte 1.75*N+4 | Data[5] | Pixel N |
| | Data[4] | |
| | Data[3] | |
| | Data[2] | |
| | Data[1] | |
| | Data[0] | |
| | Data[5] | Pixel N+1 |
| | Data[4] | |
| Byte 1.75*N+5 | Data[3] | |
| | Data[2] | |
| | Data[1] | |
| | Data[0] | |
| | Data[5] | Pixel N+2 |
| | Data[4] | |
| | Data[3] | |
| | Data[2] | |
| | Data[1] | |
| | Data[0] | |
| Byte 1.75*N+6 | Data[5] | Pixel N+3 |
| | Data[4] | |
| | Data[3] | |
| | Data[2] | |
| | Data[1] | |
| | Data[0] | |

FIG. 21

| PHY CONTROL CODE | USE APPLICATION | 8B10B SYMBOL CONFIGURATION | | | |
|---|---|---|---|---|---|
| Idle Code | SYMBOL GROUP USED TO CONTINUOUSLY TOGGLE OUTPUT SIGNAL IN PERIOD OTHER THAN TIME WHEN PACKET IS TRANSMITTED (MARGIN PERIOD AND THE LIKE) | D00.0 | | | |
| Start Code | INDICATE START OF PACKET (LINE/H) | K28.5 | K27.7 | K28.2 | K27.7 |
| End Code | INDICATE END OF PACKET (LINE/H) | K28.5 | K29.7 | K30.7 | K29.7 |
| Pad Code | Padding SYMBOL GROUP THAT IS INSERTED SO AS TO FILL DIFFERENCE BETWEEN PIXEL DATA (PAYLOAD DATA) BAND AND PHY TRANSMISSION BAND | K23.7 | K28.4 | K28.6 | K28.3 |
| Sync Code | SYMBOL GROUP USED TO SECURE BIT SYNCHRONIZATION OF I/F AND 8B10B SYMBOL SYNCHRONIZATION | K28.5 | Any** | ↓ | ↓ |
| Deskew Code | SYMBOL GROUP USED AS MARKING SO AS TO ADJUST Data Skew BETWEEN LANES | K28.5 | Any** | ↓ | ↓ |
| Standby Code | SYMBOL GROUP USED TO NOTIFY RX SIDE THAT TX OUTPUT BECOMES High-Z | K28.5 | Any** | ↓ | ↓ |

FIG. 22

| Control Symbol | | 10B abcdei_fghj | | memo |
|---|---|---|---|---|
| Code | 8B HgF_EDCBA | RD- | RD+ | |
| K23.7 | 11110111 | 1110101000 | 0001010111 | Used in Pad Code |
| K27.7 | 11111011 | 1101101000 | 0010010111 | Used in Start Code |
| K28.0 | 00011100 | 0011110100 | 1100001011 | Reserved |
| K28.1 | 00111100 | 0011111001 | 1100000110 | Reserved |
| K28.2 | 01011100 | 0011110101 | 1100001010 | Used in Start Code |
| K28.3 | 01111100 | 0011110011 | 1100001100 | Used in Pad Code |
| K28.4 | 10011100 | 0011110010 | 1100001101 | Used in Pad Code |
| K28.5 | 10111100 | 0011111010 | 1100000101 | Comma Character |
| K28.6 | 11011100 | 0011110110 | 1100001001 | Used in Pad Code |
| K28.7 | 11111100 | 0011111000 | 1100000111 | Reserved |
| K29.7 | 11111101 | 1011101000 | 0100010111 | Used in End Code |
| K30.7 | 11111110 | 0111101000 | 1000010111 | Used in End Code |

FIG. 32

| LARGE ITEM | SMALL ITEM | INFORMATION AMOUNT | CONTENT |
|---|---|---|---|
| FRAME INFORMATION | Frame Start | 1bit | INDICATE HEAD OF FRAME (EXAMPLE: FIRST LINE) |
| | Frame End | 1bit | INDICATE END OF FRAME (EXAMPLE: LINE BEFORE REAR DUMMY) |
| LINE INFORMATION | Line Valid | 1bit | INDICATE VALID/INVALID LINE |
| | Line Number | 13bit | INDICATE LINE NUMBER |
| | Embedded Line | 1bit | INDICATE EMBEDDED LINE NUMBER |
| DATA INFORMATION | Data ID | Pbit | INDICATE DATA IDENTIFICATION |
| REGION INFORMATION | Region Number | 1bit | INDICATE REGION NUMBER |
| OTHERS | Reserved | 30-Pbit | SECURE FOR EXTENSIBILITY IN FUTURE |
| | Header ECC | 18byte | ECC OF HEADER INFORMATION |

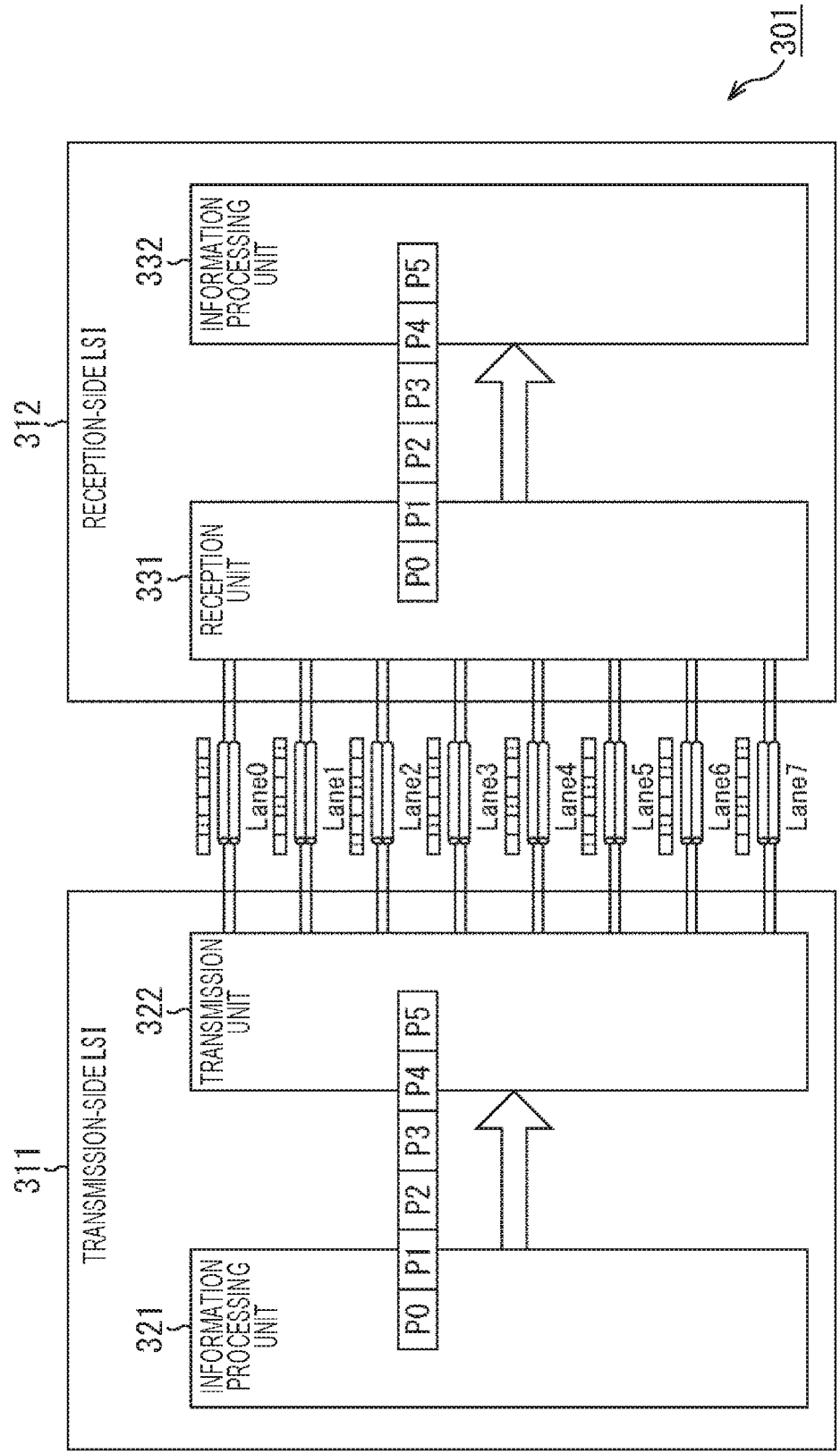

RECEPTION DEVICE, TRANSMISSION DEVICE, CONTROL METHOD, PROGRAM, AND TRANSMISSION AND RECEPTION SYSTEM

TECHNICAL FIELD

The present technology relates to a reception device, a transmission device, a control method, a program, and a transmission and reception system, and particularly, to a reception device, a transmission device, a control method, a program, and a transmission and reception system capable of correcting a difference between data timings of respective communication links in a case where data is transmitted by using a plurality of communication links.

BACKGROUND ART

As image quality and a frame rate of an image sensor increase, a data transmission amount required for an interface between the image sensor and a Digital Signal Processor (DSP) that processes an image captured by the image sensor increases.

Patent Document 1 describes a transmission method in which a packet storing image data is distributed into a plurality of lanes and data is transmitted from an image sensor to a DSP via the plurality of lanes. In this transmission method, the image data forming each line of one frame is stored in each packet in the image sensor and is transmitted to the DSP.

Furthermore, Patent Document 1 describes that a plurality of pairs of transmission units on the image sensor side and reception units on the DSP side is provided and data is transmitted between the transmission and reception units.

CITATION LIST

Patent Document

Patent Document 1: Japanese Patent Application Laid-Open No. 2012-120159

SUMMARY OF THE INVENTION

Problems to be Solved by the Invention

When it is assumed that a single communication link includes a single transmission unit on an image sensor side and a single reception unit on a DSP side, data is transmitted by using a plurality of communication links in a case where a plurality of pairs of the transmission units and the reception units is provided.

In a case where data is independently transmitted in each communication link, data timings in the communication links are different from each other.

The present technology has been made in consideration of such a situation, and can correct a difference between data timings in the respective communication links in a case where a plurality of communication links is used to transmit data.

Solutions to Problems

A reception device according to a first aspect of the present technology includes a plurality of reception units that executes processing for receiving data streams that have the same data structures and are transmitted from a plurality of transmission units included in a transmission device by using a plurality of lanes in parallel as processing of a first layer and executes processing for integrating the received data streams into a single system data and acquiring a packet configuring the data stream as processing of a second layer and a control unit that corrects a difference between timings of corresponding pieces of data in respective communication links realized by each pair of the one transmission unit and the one reception unit.

A transmission device according to a second aspect of the present technology includes a plurality of transmission units that executes processing including generation of a packet that stores data to be transmitted and processing for distributing the generated packet into a plurality of lanes as processing of a first layer and executes processing for transmitting data streams having the same data structures including the distributed packet to a reception device including a plurality of reception units by using the plurality of lanes in parallel as processing of a second layer and a control unit that corrects a difference between timings of corresponding pieces of data in respective communication links realized by each pair of the one transmission unit and the one reception unit.

In the first aspect of the present technology, processing for receiving data streams that have same data structures and are transmitted from a plurality of transmission units included in a transmission device by using a plurality of lanes in parallel as processing of a first layer and processing for integrating the received data streams into a single system data and acquiring a packet configuring the data stream as processing of a second layer are executed by a plurality of reception units and a difference between timings of corresponding pieces of data in respective communication links realized by each pair of the one transmission unit and the one reception unit is corrected.

In the second aspect of the present technology, processing including generation of a packet that stores data to be transmitted and processing for distributing the generated packet into a plurality of lanes as processing of a first layer and processing for transmitting data streams having the same data structures including the distributed packet to a reception device including a plurality of reception units by using the plurality of lanes in parallel as processing of a second layer are executed by a plurality of transmission units and a difference between timings of corresponding pieces of data in respective communication links realized by each pair of the one transmission unit and the one reception unit is corrected.

Effects of the Invention

According to the present technology, in a case where data is transmitted by using a plurality of communication links, a difference between data timings in the respective communication links can be corrected.

Note that the effects described herein are not limited and that the effect may be any effects described in the present disclosure.

BRIEF DESCRIPTION OF DRAWINGS

FIG. 7 is a diagram illustrating contents and an information amount of header information.

FIG. 8 is a diagram illustrating an example of a bit arrangement.

FIG. 12 is a diagram illustrating an example of Pixel to Byte conversion in a case where a pixel value of each pixel is represented by 14 bits.

FIG. 21 is a diagram illustrating examples of control codes.

FIG. 22 is a diagram illustrating values of K Character.

FIG. 32 illustrates contents of the header information.

FIG. 33 is a diagram illustrating a first exemplary configuration of a transmission system using a general-purpose I/F.

MODE FOR CARRYING OUT THE INVENTION

Embodiments for carrying out the present technology will be described below. The description will be made in the following order.
1. First Embodiment (example in which pixel data is transmitted)
2. Second Embodiment (example in which predetermined data is transmitted as well as pixel data)
3. Correction of Data Skew Between Communication Links
  (1) Data Skew Between Communication Links
  (2) Removal of Data Skew Between Communication Links
4. Modification
5. Application example

1. First Embodiment (Example in which Pixel Data is Transmitted)

[Exemplary Configuration of Transmission System]

Figure 1:
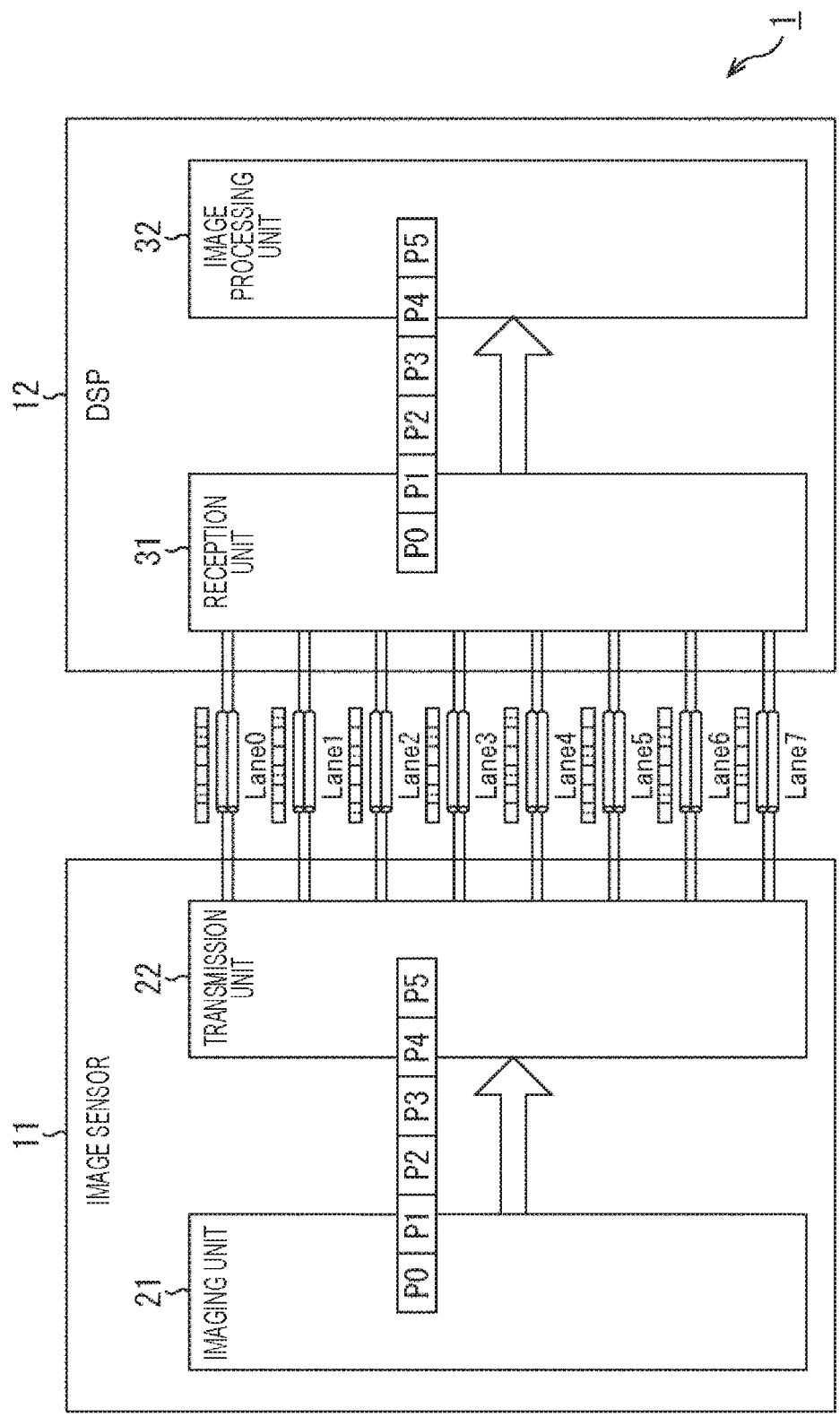
FIG. 1 is a diagram illustrating a first exemplary configuration of a transmission system.

FIG. 1 is a diagram illustrating a first exemplary configuration of a transmission system according to one embodiment of the present technology.

A transmission system 1 in FIG. 1 includes an image sensor 11 and a DSP 12. The image sensor 11 and the DSP 12 are respectively configured by Large Scale Integrated Circuits (LSI) different from each other and are provided in the same imaging device having an imaging function such as a digital camera and a mobile phone. An imaging unit 21 and a single transmission unit 22 are provided in the image sensor 11, and a single reception unit 31 and an image processing unit 32 are provided in the DSP 12.

The imaging unit 21 of the image sensor 11 includes an imaging element such as a Complementary Metal Oxide Semiconductor (CMOS) and photoelectrically converts light received via a lens. Furthermore, the imaging unit 21 performs A/D conversion on a signal acquired by the photoelectric conversion, for example, and outputs pixel data included in a one-frame image to the transmission unit 22 in order by one-pixel data.

The transmission unit 22 allocates the data of each pixel supplied from the imaging unit 21 to a plurality of transmission paths, for example, in an order of the supplement from the imaging unit 21 and transmits the data to the DSP 12 via the plurality of transmission paths in parallel. In the example in FIG. 1, the pixel data is transmitted by using eight transmission paths. The transmission path between the image sensor 11 and the DSP 12 may be a wired transmission path or a wireless transmission path. Hereinafter, the transmission path between the image sensor 11 and the DSP 12 is appropriately referred to as a lane (Lane).

The reception unit 31 of the DSP 12 receives the pixel data transmitted from the transmission unit 22 via the eight lanes and outputs the data of each pixel to the image processing unit 32 in order.

The image processing unit 32 generates a one-frame image on the basis of the pixel data supplied from the reception unit 31 and executes various image processing by using the generated image. The pixel data transmitted from the image sensor 11 to the DSP 12 is RAW data, and the image processing unit 32 executes various processing such as compression of the image data, display of the image, recording of the image data to a recording medium, and the like.

Figure 2:
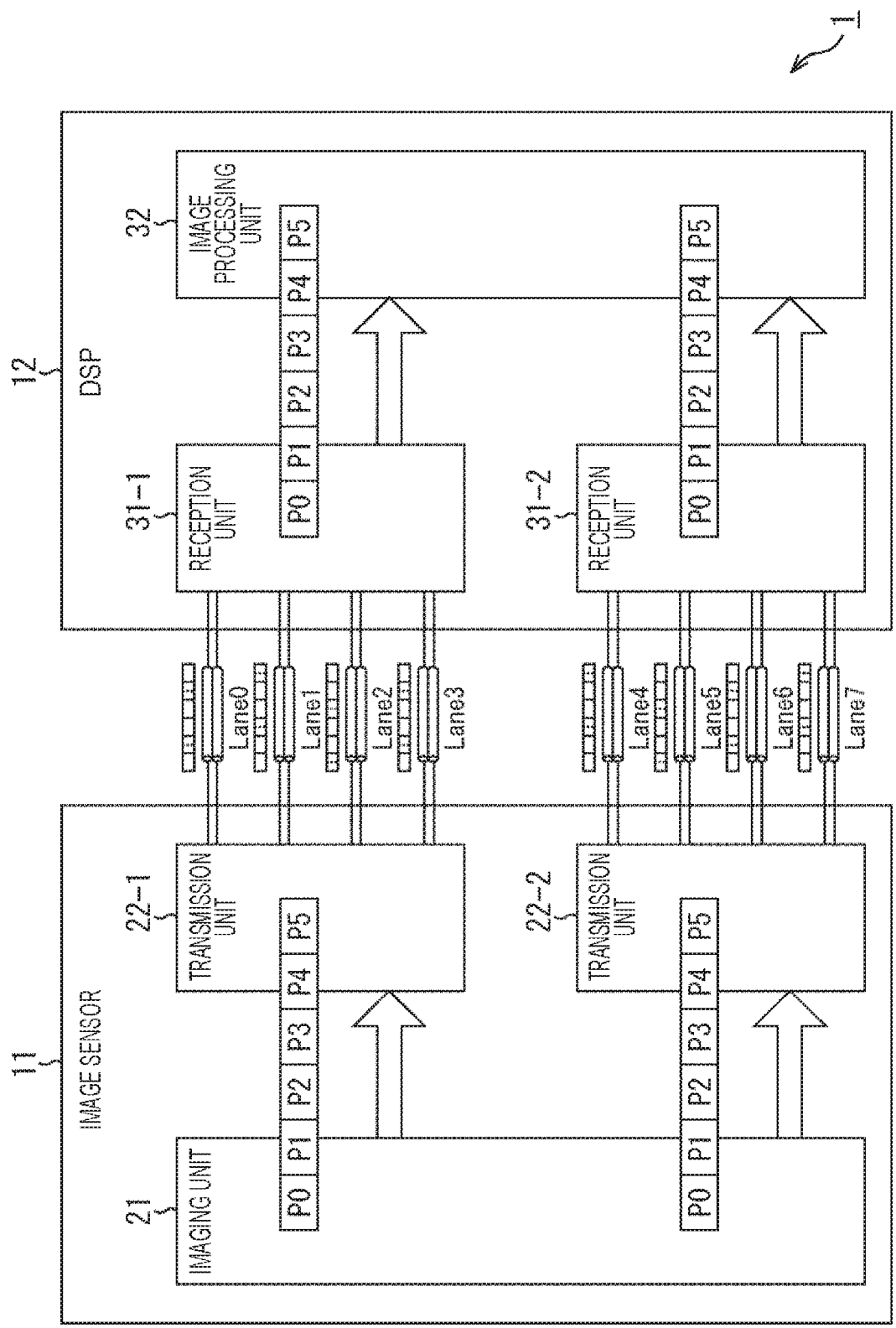
FIG. 2 is a diagram illustrating a second exemplary configuration of the transmission system.

FIG. 2 is a diagram illustrating a second exemplary configuration of the transmission system 1. Components illustrated in FIG. 2 same as the components illustrated in FIG. 1 are respectively denoted with the same reference numerals. The overlapped description will be appropriately omitted.

The imaging unit 21 and two transmission units 22-1 and 22-2 are provided in the image sensor 11 of the transmission system 1 in FIG. 2, and two reception units 31-1 and 31-2 and the image processing unit 32 are provided in the DSP 12.

The imaging unit 21 outputs pixel data included in one-frame image acquired by imaging to the transmission units 22-1 and 22-2 in parallel by one-pixel data. For example, the imaging unit 21 outputs data of pixels in odd-number lines to the transmission unit 22-1 and outputs data of pixels in even-number lines to the transmission unit 22-2.

The transmission unit 22-1 allocates the data of each pixel supplied from the imaging unit 21 to a plurality of lanes, for example, in an order of the supplement from the imaging unit 21 and transmits the data to the DSP 12 via the plurality of lanes in parallel. The transmission unit 22-2 similarly allocates the data of each pixel supplied from the imaging unit 21 to a plurality of lanes, for example, in an order of the supplement from the imaging unit 21 and transmits the data to the DSP 12 via the plurality of lanes in parallel.

In the example in FIG. 2, the image sensor 11 is connected to the DSP 12 via the eight lanes. Each of the transmission units 22-1 and 22-2 transmits the pixel data by using four lanes.

The reception unit 31-1 of the DSP 12 receives the pixel data transmitted from the transmission unit 22-1 via the four lanes and outputs the data of each pixel to the image processing unit 32 in order. The reception unit 31-2 of the DSP 12 similarly receives the pixel data transmitted from the transmission unit 22-2 via the four lanes and outputs the data of each pixel to the image processing unit 32 in order.

The image processing unit 32 generates a one-frame image on the basis of the pixel data supplied from the reception unit 31-1 and the pixel data supplied from the reception unit 31-2 and executes various image processing by using the generated image.

As illustrated in FIG. 2, by providing the two transmission units in the image sensor 11 and providing the two reception units in the DSP 12 in correspondence with the two transmission units, even in a case where a rate of the pixel data output from the imaging unit 21 is high, the pixel data can be transmitted to the DSP 12.

Figure 3:
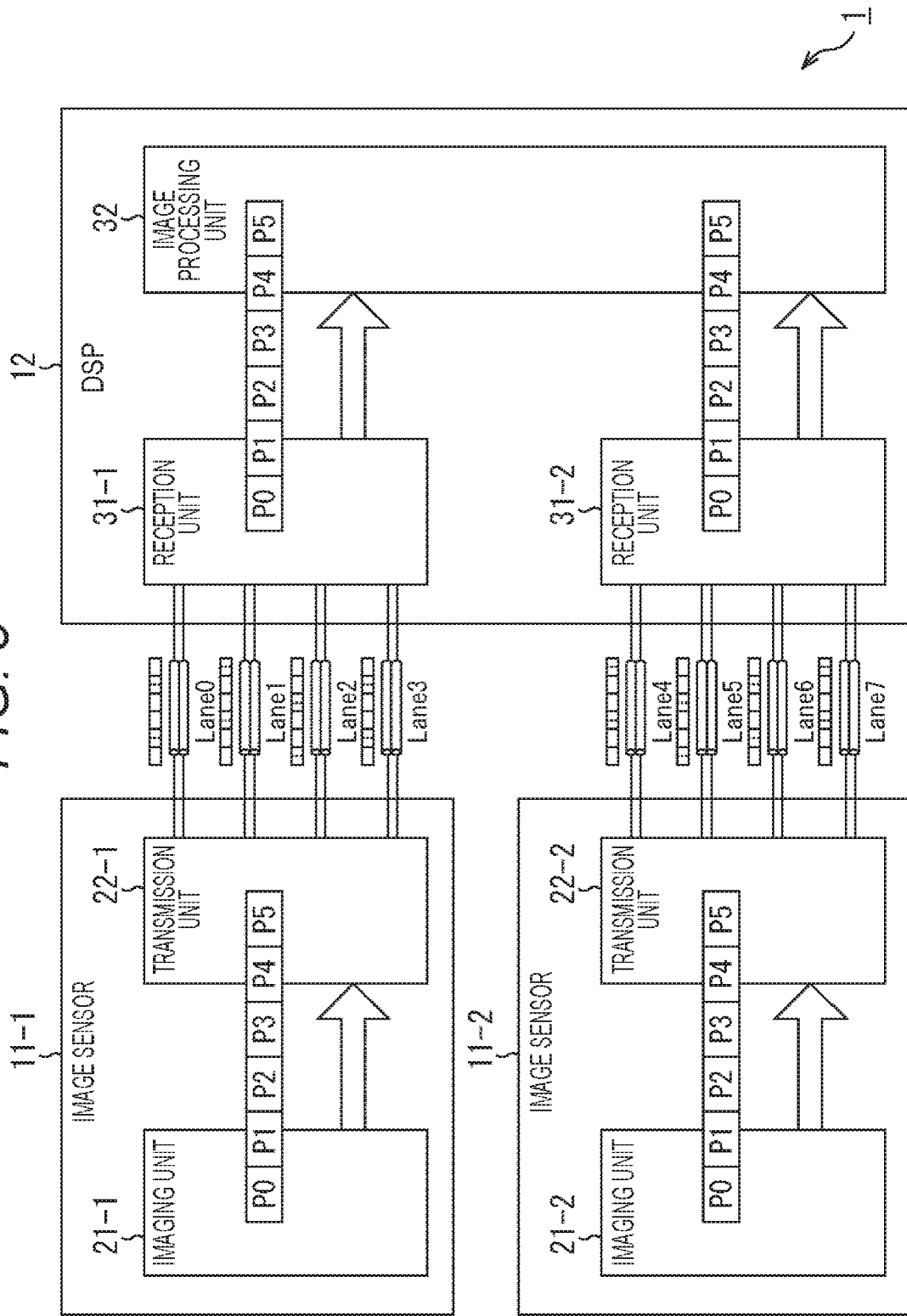
FIG. 3 is a diagram illustrating a third exemplary configuration of the transmission system.

FIG. 3 is a diagram illustrating a third exemplary configuration of the transmission system 1. Components illustrated in FIG. 3 same as the components illustrated in FIG. 1 are respectively denoted with the same reference numerals. The overlapped description will be appropriately omitted.

In the transmission system 1 in FIG. 3, two image sensors including image sensors 11-1 and 11-2 are provided. An imaging unit 21-1 and a transmission unit 22-1 that is one transmission unit are provided in the image sensor 11-1, and an imaging unit 21-2 and a transmission unit 22-2 that is one transmission unit are provided in the image sensor 11-2. As in a case of FIG. 2, the reception units 31-1 and 31-2 that are two reception units and the image processing unit 32 are provided in the DSP 12.

The imaging unit 21-1 of the image sensor 11-1 outputs pixel data included in the one-frame image acquired by imaging to the transmission unit 22-1 in order by one-pixel data.

The transmission unit 22-1 allocates the data of each pixel supplied from the imaging unit 21-1 to a plurality of lanes, for example, in an order of the supplement from the imaging unit 21-1 and transmits the data to the DSP 12 via the plurality of lanes in parallel.

The imaging unit 21-2 of the image sensor 11-2 outputs pixel data included in the one-frame image acquired by imaging to the transmission unit 22-2 in order by one-pixel data.

The transmission unit 22-2 allocates the data of each pixel supplied from the imaging unit 21-2 to a plurality of lanes, for example, in an order of the supplement from the imaging unit 21-2 and transmits the data to the DSP 12 via the plurality of lanes in parallel.

In the example in FIG. 3, the image sensor side is connected to the DSP 12 via the eight lanes. Four lanes are allocated to each of the image sensors 11-1 and 11-2, and each of the transmission units 22-1 and 22-2 transmits the pixel data by using the four lanes.

The reception unit 31-1 of the DSP 12 receives the pixel data transmitted from the transmission unit 22-1 of the image sensor 11-1 via the four lanes and outputs the data of each pixel to the image processing unit 32 in order. The reception unit 31-2 similarly receives the pixel data transmitted from the transmission unit 22-2 of the image sensor 11-2 via the four lanes and outputs the data of each pixel to the image processing unit 32 in order.

The image processing unit 32 generates one-frame image on the basis of the pixel data supplied from the reception unit 31-1 and generates one-frame image on the basis of the pixel data supplied from the reception unit 31-2. The image processing unit 32 executes various image processing by using the generated images.

By providing the two image sensors as illustrated in FIG. 3, a single DSP 12 can process a 3D image including an image for a left eye imaged by the image sensor 11-1 and an image for a right eye imaged by the image sensor 11-2, for example. There is a parallax between the image for the left eye and the image for the right eye.

As described above, in the image sensor of the transmission system 1, one or the plurality transmission units that transmits the imaged one-frame image data is provided. On the other hand, in the DSP, one or the plurality of reception units that receives the data transmitted from the image sensor is provided in correspondence with the transmission unit of the image sensor.

Hereinafter, data transmission in the transmission system 1 in FIG. 1 in which the one transmission unit is provided in the image sensor 11 and the one reception unit is provided in the DSP 12 will be described. Data is similarly transmitted between the transmission unit 22-1 and the reception unit 31-1 and between the transmission unit 22-2 and the reception unit 31-2 in FIGS. 2 and 3.

[Frame Format]

Figure 4:
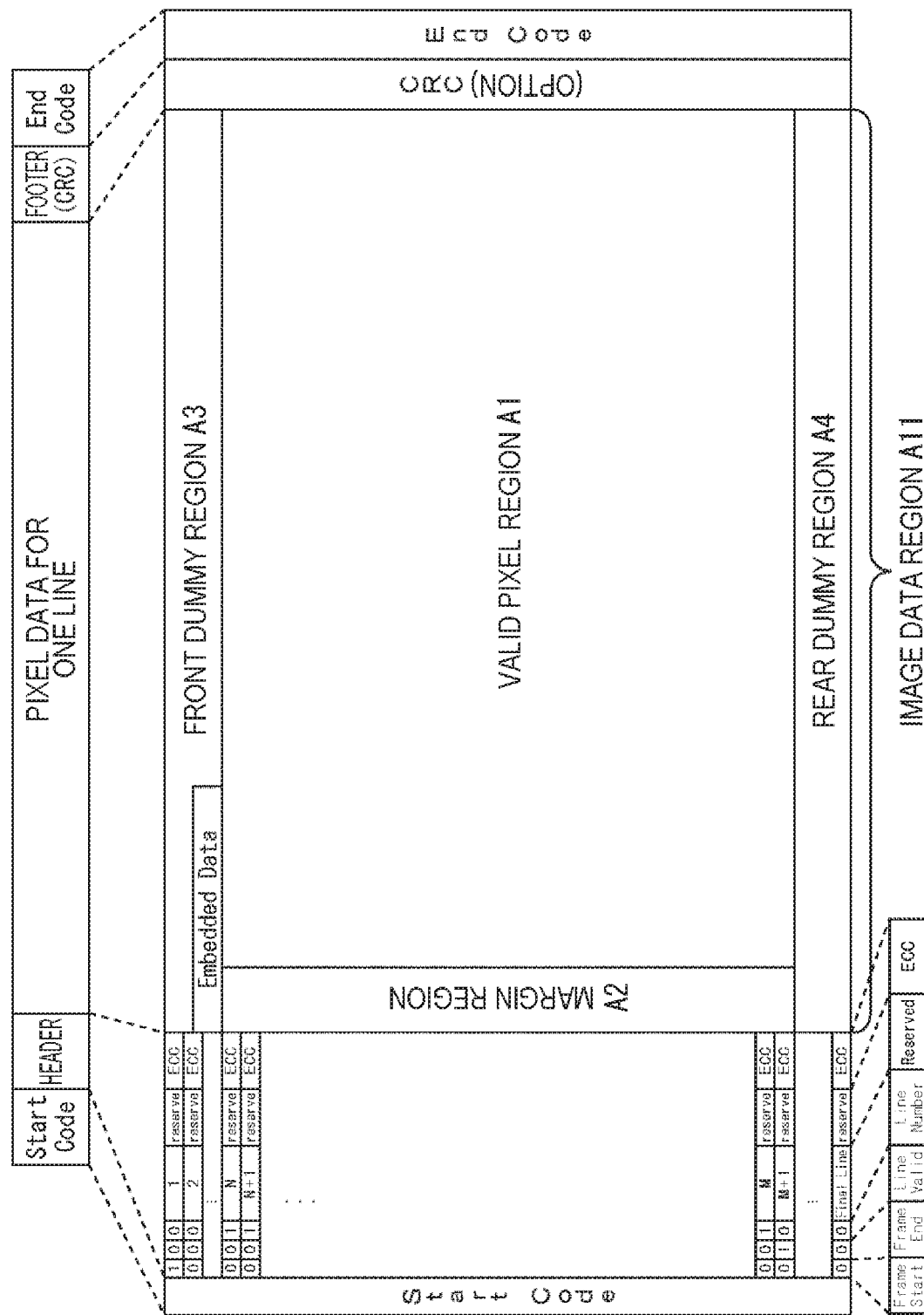
FIG. 4 is a diagram illustrating an example of a frame format.

FIG. 4 is a diagram illustrating an example of a format used to transmit the one-frame image data between the image sensor 11 and the DSP 12.

An valid pixel region A1 is a region of a valid pixel of a one-frame image imaged by the imaging unit 21. On the left side of the valid pixel region A1, a margin region A2, of which the number of pixels arranged in the vertical direction is the same as the number of pixels of the valid pixel region A1 in the vertical direction, is set.

On the upper side of the valid pixel region A1, a front dummy region A3, of which the number of pixels in the horizontal direction is the same as the number of pixels of an entire region including the valid pixel region A1 and the margin region A2 in the horizontal direction, is set. In the example in FIG. 4, Embedded Data is inserted in the front dummy region A3. Embedded Data includes information regarding a setting value regarding imaging by the imaging unit 21 such as a shutter speed, an aperture value, and a gain. Embedded data may be inserted into a rear dummy region A4.

On the lower side of the valid pixel region A1, the rear dummy region A4, of which the number of pixels in the horizontal direction is the same as the number of pixels of an entire region including the valid pixel region A1 and the margin region A2 in the horizontal direction, is set.

The valid pixel region A1, the margin region A2, the front dummy region A3, and the rear dummy region A4 constitute an image data region A11.

A header is added before each line included in the image data region A11, and Start Code is added before the header. Furthermore, a footer is optionally added after each line included in the image data region A11, and a control code as described later such as End Code is added after the footer. In a case where no footer is added, the control code such as End Code is added after each line included in the image data region A11.

Each time when the one-frame image imaged by the imaging unit 21 is transmitted from the image sensor 11 to the DSP 12, entire data of the format illustrated in FIG. 4 is transmitted as transmission data.

An upper band in FIG. 4 indicates a packet structure used for transmission of the transmission data illustrated on the lower side. When arrangement of the pixels in the horizontal direction is assumed as a line, data of pixels included in a single line of the image data region A11 is stored in a payload of a packet. The entire one-frame image data is transmitted by using packets more than the number of pixels of the image data region A11 in the vertical direction.

A header and a footer are added to the payload storing pixel data for one line so as to form a single packet. As will be described in detail later, the header includes additional information of the pixel data stored in the payload such as Frame Start, Frame End, Line Valid, Line Number, and ECC. At least Start Code and End Code which are the control codes are added to each packet.

In this way, by adopting a format in which the pixel data included in the one-frame image is transmitted for each line, it is possible to transmit the additional information such as the header and the control code such as Start Code and End Code in a blanking interval of each line.

[Configuration of Transmission Unit 22 and Reception Unit 31]

Figure 5:
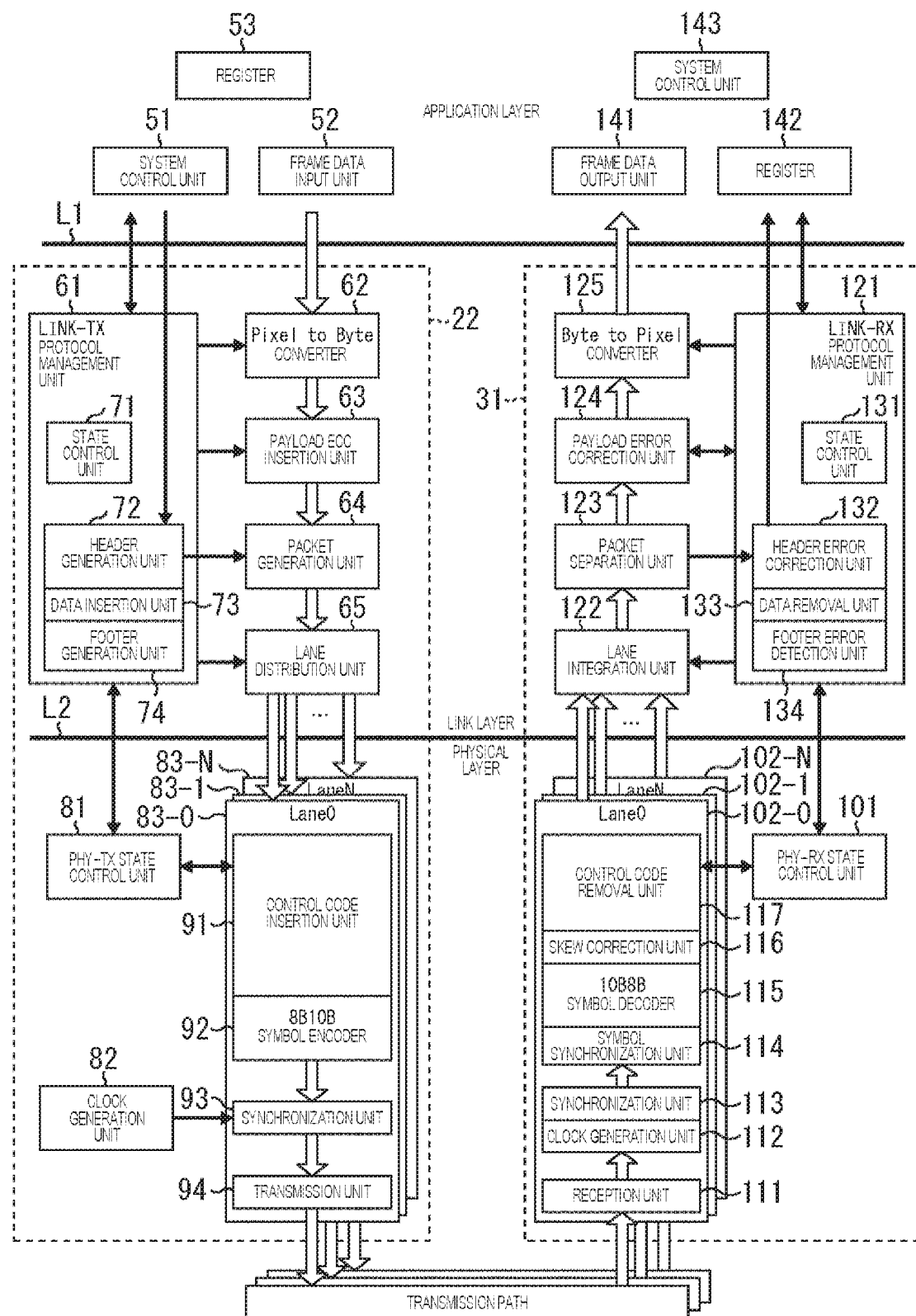
FIG. 5 is a diagram illustrating an exemplary configuration of a transmission unit and a reception unit.

FIG. 5 is a diagram illustrating an exemplary configuration of the transmission unit 22 and the reception unit 31.

A configuration illustrated on the left side of FIG. 5 surrounded by a broken line is a configuration of the transmission unit 22, and a configuration illustrated on the right side surrounded by a broken line is a configuration of the reception unit 31. The transmission unit 22 and the reception unit 31 respectively have a link layer configuration and a physical layer configuration. A configuration illustrated above a solid line L2 is a link layer configuration, and a configuration illustrated below the solid line L2 is a physical layer configuration.

Note that a configuration illustrated above a solid line L1 is an application layer configuration. A system control unit 51, a frame data input unit 52, and a register 53 are realized in the imaging unit 21. The system control unit 51 communicates with a LINK-TX protocol management unit 61 of the transmission unit 22 and controls the transmission of the image data, for example, by providing information regarding the frame format. The frame data input unit 52 performs imaging in response to an instruction by a user and the like and supplies the data of each pixel included in the image acquired by imaging to a Pixel to Byte converter 62 of the transmission unit 22. The register 53 stores information such as the bit length, the number of Lanes, and the like of the Pixel to Byte conversion. Image data transmission processing is executed according to information stored in the register 53.

Furthermore, a frame data output unit 141, a register 142, and a system control unit 143 in the configuration of the application layer are realized in the image processing unit 32. The frame data output unit 141 generates and outputs a one-frame image on the basis of the pixel data of each line supplied from the reception unit 31. Various processing is executed by using the image output from the frame data output unit 141. The register 142 stores various setting values regarding the reception of the image data such as the bit length, the number of Lanes, and the like of the Byte to Pixel conversion. Image data reception processing is executed according to information stored in the register 142. The system control unit 143 communicates with a LINK-RX protocol management unit 121 and controls a sequence such as a mode change.

[Configuration of Link Layer of Transmission Unit 22]

First, the configuration of the link layer of the transmission unit 22 will be described.

The transmission unit 22 includes the LINK-TX protocol management unit 61, the Pixel to Byte converter 62, a payload ECC insertion unit 63, a packet generation unit 64, and a lane distribution unit 65 as the configuration of the link layer. The LINK-TX protocol management unit 61 includes a state control unit 71, a header generation unit 72, a data insertion unit 73, and a footer generation unit 74.

The state control unit 71 of the LINK-TX protocol management unit 61 manages a state of the link layer of the transmission unit 22.

The header generation unit 72 generates a header to be added to the payload storing the pixel data for one line and outputs the generated header to the packet generation unit 64.

Figure 6:
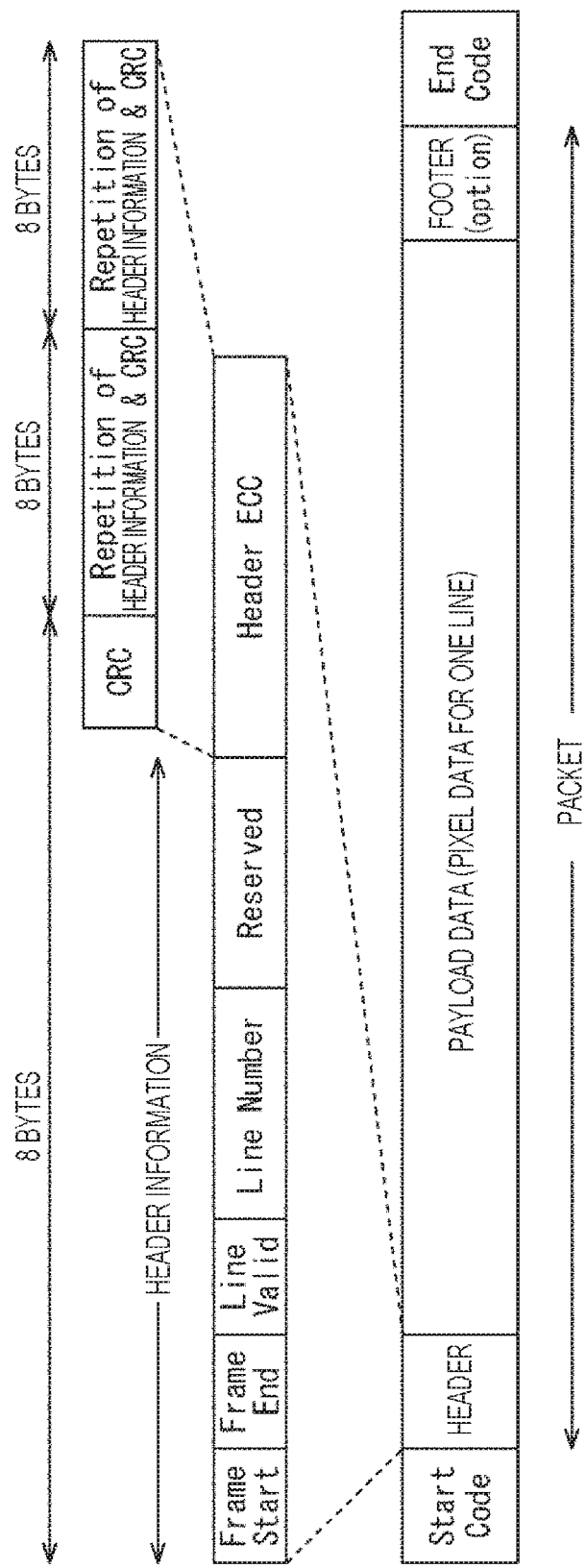
FIG. 6 is a diagram illustrating a header structure.

FIG. 6 is a diagram illustrating a structure of the header generated by the header generation unit 72.

As described above, an entire packet includes a header and payload data that is pixel data for one line. A footer may be added to the packet. The header includes header information and Header ECC.

The header information includes Frame Start, Frame End, Line Valid, Line Number, and Reserved. Contents and an amount of each piece of the information are illustrated in FIG. 7.

Frame Start is one-bit information indicating a head of a frame. A value of one is set to Frame Start of the header of the packet used for transmission of pixel data in a first line of the image data region A11 in FIG. 4, and a value of zero is set to Frame Start of the header of the packet used for transmission of pixel data in other line.

Frame End is one-bit information indicating an end of the frame. A value of one is set to Frame End of the header of the packet including pixel data in an end line in the valid pixel region A1 in the payload, and a value of zero it set to Frame End of the header of the packet used for the transmission of the pixel data in the other line.

Frame Start and Frame End are frame information that is information regarding the frame.

Line Valid is one-bit information indicating whether or not a line of pixel data stored in the payload is a line of a valid pixel. A value of one is set to Line Valid of the header of the packet used for the transmission of the pixel data in a line in the valid pixel region A1, and a value of zero is set to Line Valid of the header of the packet used for the transmission of the pixel data in the other line.

Line Number is 13-bit information indicating a line number of a line including the pixel data stored in the payload.

Line Valid and Line Number are line information that is information regarding the line.

Reserved is a 32-bit region for extension. A total data amount of the header information is six bytes.

As illustrated in FIG. 6, Header ECC arranged after the header information includes a Cyclic Redundancy Check (CRC) code that is a two-byte error detection code that is calculated on the basis of six-byte header information. Furthermore, Header ECC includes two pieces of information same as eight-byte information that is a pair of the header information and the CRC code, subsequent to the CRC code.

In other words, the header of the single packet includes three same pairs of the header information and the CRC code. A total data amount of the header includes eight bytes of the first pair of the header information and the CRC code, eight bytes of the second pair of the header information and the CRC code, and eight bytes of the third pair of the header information and the CRC code, that is, 24 bytes in total.

FIG. 8 is a diagram illustrating an example of an eight-byte bit arrangement configuring a single pair of the header information and the CRC code.

A byte H7 that is a first one byte of eight bytes included in the header includes each of one bit of Frame Start, one bit of Frame End, one bit of Line Valid, and first to fifth bits of the 13 bits of Line Number in an order from the first bit. Furthermore, a byte H6 that is a second one byte includes sixth to 13th bits of the 13 bits of Line Number.

Bytes from a byte H5 that is a third one byte to a byte H2 that is a sixth one byte are Reserved. Each of a byte H1 that is a seventh one byte and a byte H0 that is an eighth one byte includes each bit of the CRC code.

Returning to the description of FIG. 5, the header generation unit 72 generates the header information according to control by the system control unit 51. For example, the system control unit 51 supplies the information indicating the line number of the pixel data output from the frame data input unit 52 and the information indicating the head and the end of the frame.

Furthermore, the header generation unit 72 calculates the CRC code by applying the header information to a generator polynomial. The generator polynomial of the CRC code added to the header information is expressed by, for example, the following formula (1).

[Formula 1]

$$CRC16 = X^{16} + X^{15} + X^2 + 1 \tag{1}$$

The header generation unit 72 generates a pair of the header information and the CRC code by adding the CRC code to the header information and generates a header by repeatedly arranging the three same pairs of the header information and the CRC code. The header generation unit 72 outputs the generated header to the packet generation unit 64.

The data insertion unit 73 generates data used for stuffing and outputs the generated data to the Pixel to Byte converter 62 and the lane distribution unit 65. Payload stuffing data that is stuffing data supplied to the Pixel to Byte converter 62 is added to the pixel data on which the Pixel to Byte conversion has been performed and is used to adjust a data amount of the pixel data to be stored in the payload. Furthermore, lane stuffing data that is stuffing data supplied to the lane distribution unit 65 is added to data after lane allocation and is used to adjust data amounts of the lanes.

The footer generation unit 74 appropriately applies the payload data to the generator polynomial to calculate a 32-bit CRC code according to the control by the system control unit 51 and outputs the CRC code acquired by calculation to the packet generation unit 64 as a footer. The generator polynomial of the CRC code added as a footer is expressed by, for example, the following formula (2).

[Formula 2]

$$CRC32 = X^{32} + X^{31} + X^4 + X^3 + X + 1 \quad (2)$$

The Pixel to Byte converter 62 acquires the pixel data supplied from the frame data input unit 52 and performs the Pixel to Byte conversion that converts data of each pixel into data in units of one byte. For example, a pixel value (RGB) of each pixel of an image imaged by the imaging unit 21 is represented by any one of eight bits, 10 bits, 12 bits, 14 bits, and 16 bits.

Figure 9:
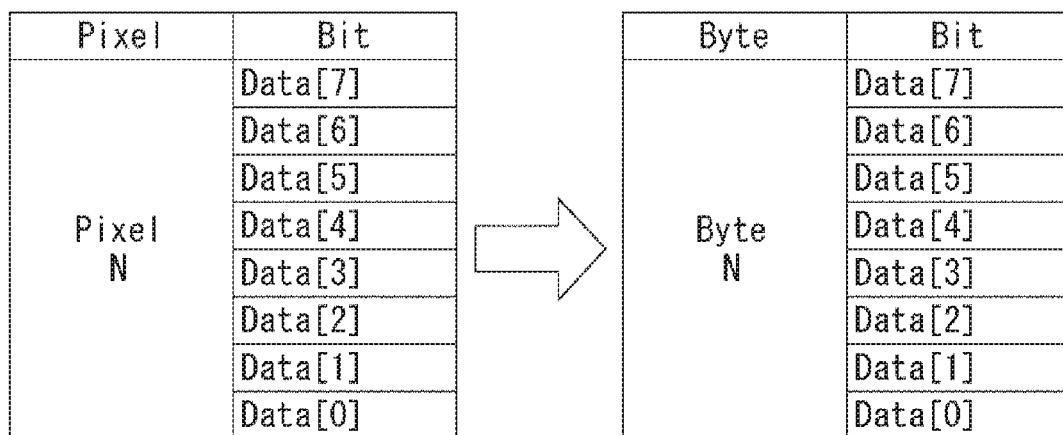
FIG. 9 is a diagram illustrating an example of Pixel to Byte conversion in a case where a pixel value of each pixel is represented by eight bits.

FIG. 9 is a diagram illustrating an example of the Pixel to Byte conversion in a case where the pixel value of each pixel is represented by eight bits.

Data[0] indicates LSB, and Data[7] having the largest number indicates MSB. As indicated by an outline arrow, in this case, eight bits of Data[7] to [0] indicating a pixel value of a pixel N are converted into Byte N including Data[7] to [0]. In a case where the pixel value of each pixel is represented by eight bits, the number of pieces of data in byte unit after the Pixel to Byte conversion is the same as the number of pixels.

Figure 10:
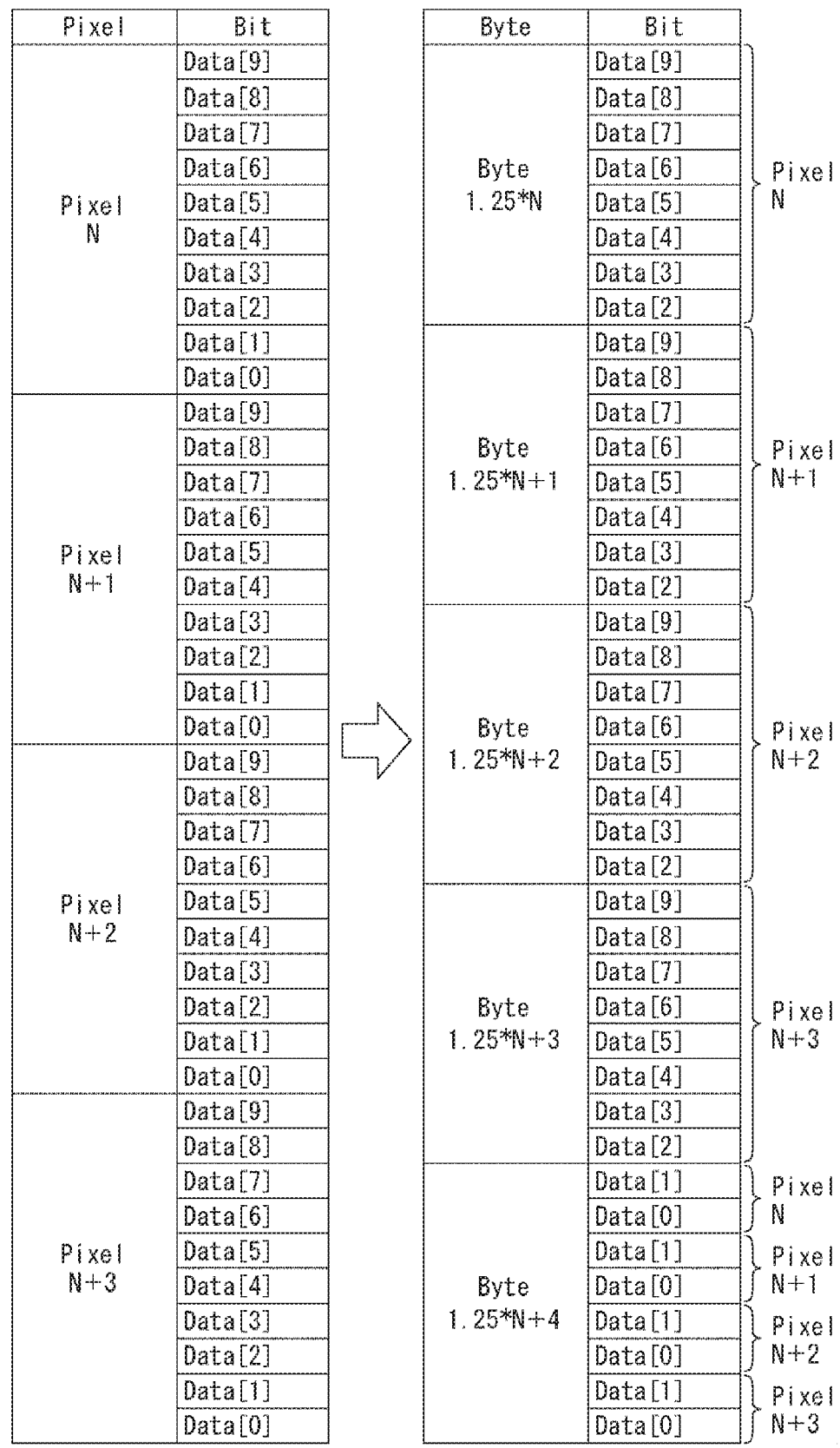
FIG. 10 is a diagram illustrating an example of Pixel to Byte conversion in a case where a pixel value of each pixel is represented by 10 bits.

FIG. 10 is a diagram illustrating an example of the Pixel to Byte conversion in a case where the pixel value of each pixel is represented by 10 bits.

In this case, 10 bits of Data[9] to [0] indicating the pixel value of the pixel N are converted into Byte 1.25*N including Data[9] to [2].

Similarly, regarding pixels N+1 to N+3, 10 bits of Data[9] to [0] indicating the pixel value are converted into Byte 1.25*N+1 to Byte 1.25*N+3 including Data[9] to [2]. Furthermore, Data[1] and Data[0] which are lower bits of the pixels N to N+3 are collected and are converted into Byte 1.25*N+4. In a case where the pixel value of each pixel is represented by 10 bits, the number of pieces of data in byte unit after the Pixel to Byte conversion is 1.25 times of the number of pixels.

Figure 11:
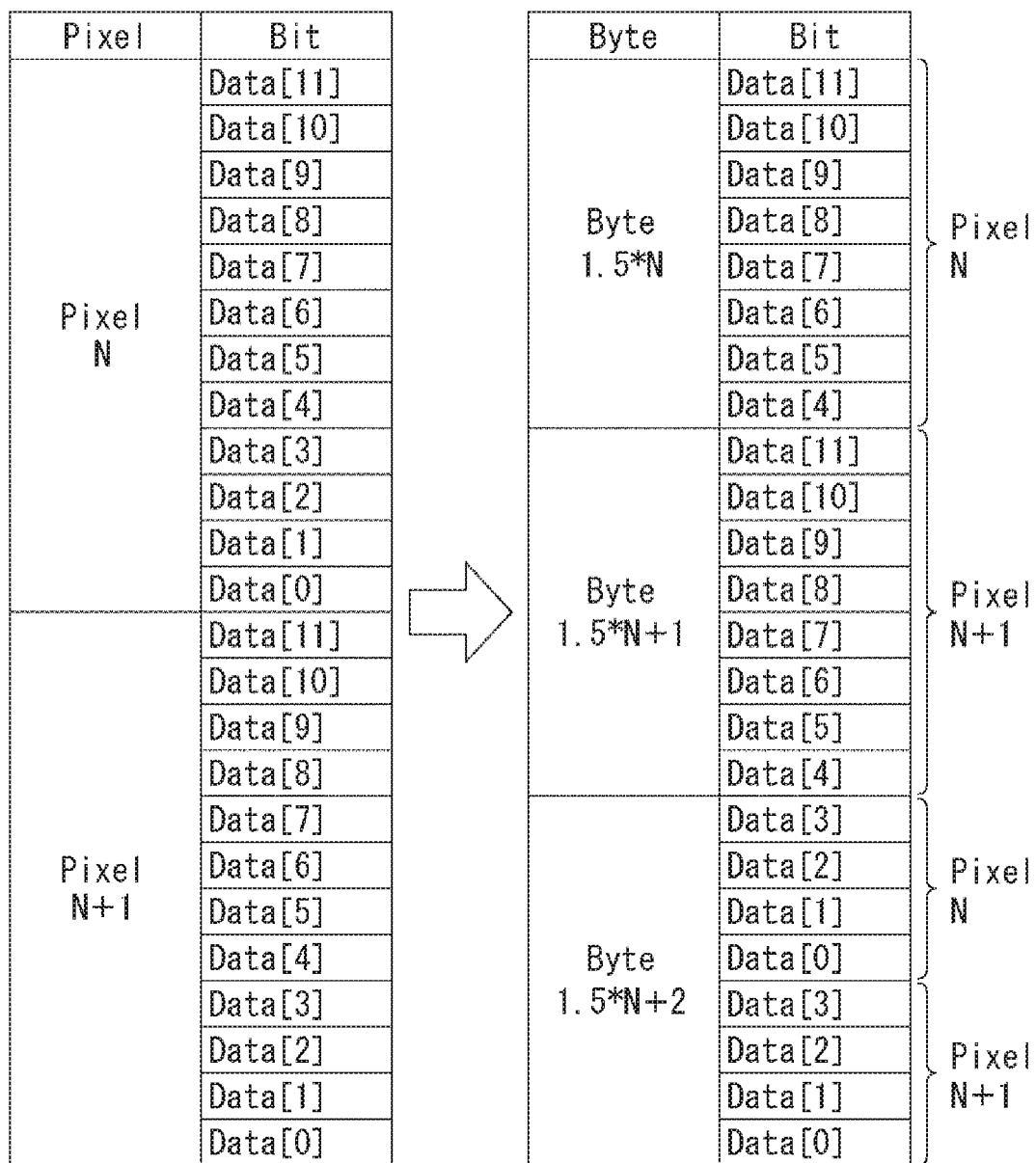
FIG. 11 is a diagram illustrating an example of Pixel to Byte conversion in a case where a pixel value of each pixel is represented by 12 bits.

FIG. 11 is a diagram illustrating an example of the Pixel to Byte conversion in a case where the pixel value of each pixel is represented by 12 bits.

In this case, 12 bits of Data[11] to [0] indicating the pixel value of the pixel N are converted into Byte 1.5*N including Data[11] to [4].

Similarly, regarding the pixel N+1, 12 bits of Data[11] to [0] indicating a pixel value of the pixel N+1 are converted into Byte 1.5*N+1 including Data[11] to [4]. Furthermore, Data[3] to [0] which are lower bits of each of the pixels N and N+1 are collected and are converted into Byte 1.5*N+2. In a case where the pixel value of each pixel is represented by 12 bits, the number of pieces of data in byte unit after the Pixel to Byte conversion is 1.5 times the number of pixels.

FIG. 12 is a diagram illustrating an example of Pixel to Byte conversion in a case where the pixel value of each pixel is represented by 14 bits.

In this case, 14 bits of Data[13] to [0] indicating the pixel value of the pixel N are converted into Byte 1.75*N including Data[13] to [6].

Similarly, regarding pixels N+1 to N+3, 14 bits of Data [13] to [0] indicating the respective pixel values are converted into Byte 1.75*N+1 to Byte 1.75*N+3 including Data[13] to [6]. Furthermore, remaining bits of the bits of the pixels N to N+3 are collected from the lower bits in order, and for example, Data[5] to [0] that is the bits of the pixel N and Data[5] and [4] that is bits of the pixel N+1 are converted into Byte 1.75*N+4.

Similarly, Data[3] to [0] that is the bits of the pixel N+1 and Data[5] to [2] that is bits of the pixel N+2 are converted into Byte 1.75*N+5, and Data[1] and [0] that is bits of pixel N+2 and Data[5] to [0] that is bits of the pixel N+3 are converted into Byte 1.75*N+6. In a case where the pixel value of each pixel is represented by 14 bits, the number of pieces of data in byte unit after the Pixel to Byte conversion is 1.75 times of the number of pixels.

Figure 13:
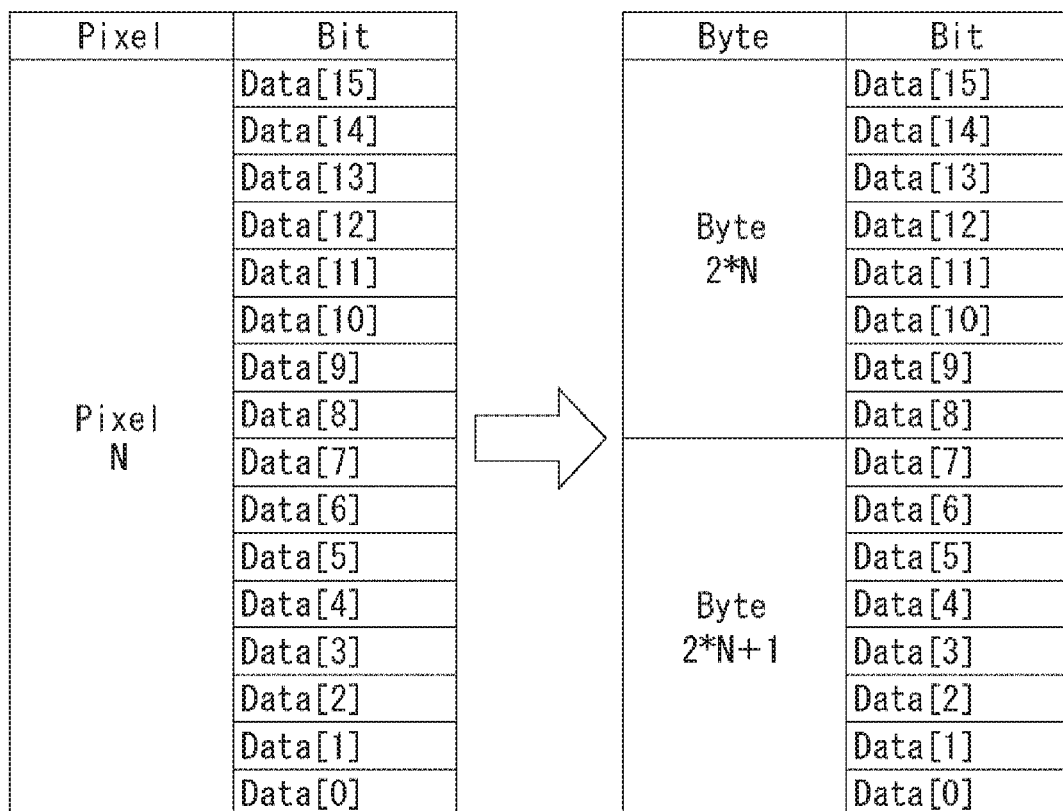
FIG. 13 is a diagram illustrating an example of Pixel to Byte conversion in a case where a pixel value of each pixel is represented by 16 bits.

FIG. 13 is a diagram illustrating an example of Pixel to Byte conversion in a case where the pixel value of each pixel is represented by 16 bits.

In this case, 16 bits of Data[15] to [0] indicating the pixel value of the pixel N are converted into Byte 2*N including Data[15] to [8] and Byte 2*N+1 including Data[7] to [0]. In a case where the pixel value of each pixel is represented by 16 bits, the number of pieces of data in byte unit after the Pixel to Byte conversion is twice of the number of pixels.

The Pixel to Byte converter 62 in FIG. 5 performs such Pixel to Byte conversion on each pixel, for example, in order from the pixel at the left end of the line. Furthermore, the Pixel to Byte converter 62 generates the payload data by adding payload stuffing data supplied from the data insertion unit 73 to the pixel data in byte unit acquired by the Pixel to Byte conversion and outputs the generated data to the payload ECC insertion unit 63.

Figure 14:
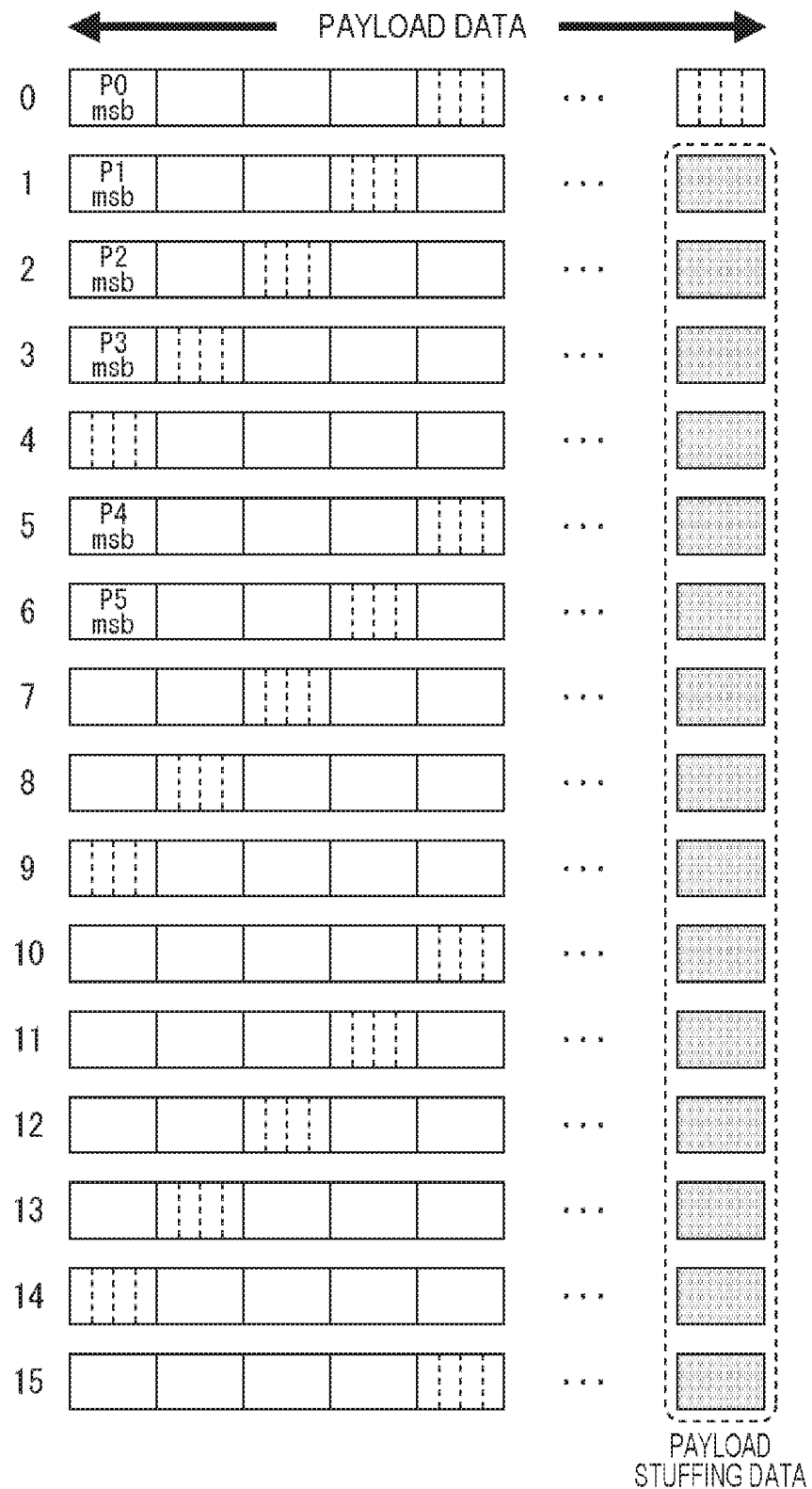
FIG. 14 is a diagram illustrating an example of payload data.

FIG. 14 is a diagram illustrating an example of the payload data.

FIG. 14 illustrates payload data including the pixel data acquired by the Pixel to Byte conversion in a case where the pixel value of each pixel is represented by 10 bits. One block with no color represents the pixel data in byte unit after the Pixel to Byte conversion. Furthermore, each colored block represents the payload stuffing data generated by the data insertion unit 73.

The pixel data after the Pixel to Byte conversion is grouped into a predetermined number of groups in order of acquisition by the conversion. In the example in FIG. 14, each pixel data is grouped into 16 groups including groups 0 to 15. Pixel data including MSB of a pixel P0 is allocated to the group 0, and pixel data including MSB of a pixel P1 is allocated to the group 1. Furthermore, pixel data including MSB of a pixel P2 is allocated to the group 2, pixel data including MSB of a pixel P3 is allocated to the group 3, and pixel data including LSBs of the pixels P0 to P3 is allocated to the group 4.

Pixel data after pixel data including MSB of a pixel P4 is allocated to each of the group 5 and the groups subsequent to the group 5 in order. When a certain piece of the pixel data is allocated to the group 15, subsequent pieces of pixel data are allocated to the group 0 and the groups subsequent to the group 0 in order. Note that a block in which three broken lines are added of blocks indicating the pixel data represents pixel data in byte unit that is generated at the time of the Pixel to Byte conversion so as to include LSBs of the pixels N to N+3.

In the link layer of the transmission unit 22, after grouping is performed in this way, processing is executed on the pixel data provided at the same positions of the respective groups in parallel for each period defined by a clock signal. In other words, in a case where the pixel data is allocated to 16 groups as illustrated in FIG. 14, 16 pieces of the pixel data aligned in each column are processed in the same period so that the pixel data is processed.

As described above, the payload of the single packet includes one line of pixel data. The entire pixel data illustrated in FIG. 14 is the pixel data configuring one line. Here, the processing on the pixel data in the valid pixel region A1 in FIG. 4 is described. However, the pixel data in the other region such as the margin region A2 is processed together with the pixel data in the valid pixel region A1.

After the pixel data for one line is grouped, the payload stuffing data is added so that each of the groups has the same data length. The payload stuffing data is one-byte data.

In the example in FIG. 14, the payload stuffing data is added to the pixel data of the group 0, and one piece of payload stuffing data is added at the end of each pixel data of each of the groups 1 to 15 as illustrated by surrounding by a broken line. A data length (Byte) of the payload data including the pixel data and the stuffing data is expressed by the following formula (3).

[Formula 3]

$$PayloadLength = LineLength \times \frac{BitPix}{8} + PayloadStuffing \quad (3)$$

In the formula (3), LineLength indicates the number of pixels in a line, and BitPix indicates the bit length representing a pixel value of one pixel. PayloadStuffing indicates the number of pieces of payload stuffing data.

As illustrated in FIG. 14, in a case where the pixel data is allocated to 16 groups, the number of pieces of payload stuffing data is expressed by the following formula (4). A symbol % in the formula (4) represents remainder.

[Formula 4]

$$PayloadStuffing = 16 - \left(\left(LineLength \times \frac{BitPix}{8}\right) \% 16\right) \quad (4)$$

Figure 15:
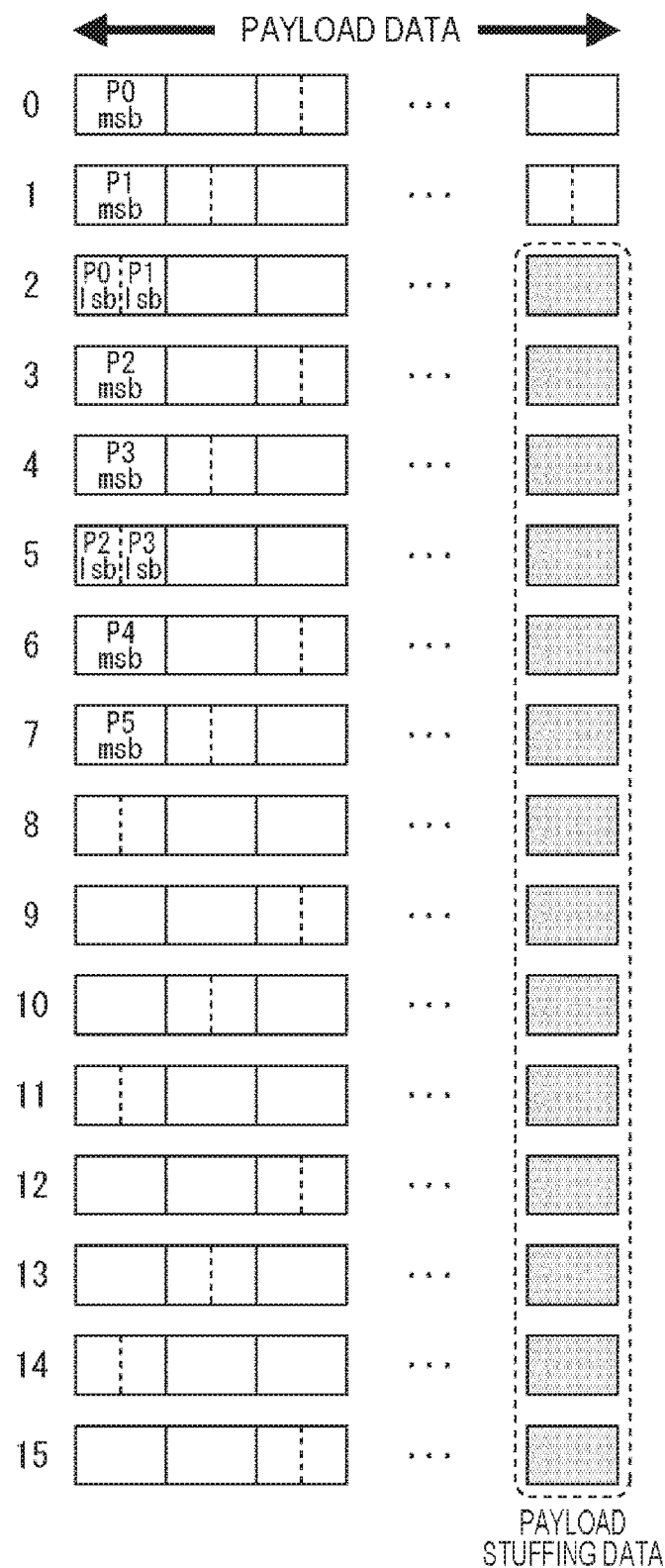
FIG. 15 is a diagram illustrating another example of the payload data.

FIG. 15 is a diagram illustrating another example of the payload data.

FIG. 15 illustrates payload data including the pixel data acquired by the Pixel to Byte conversion in a case where the pixel value of each pixel is represented by 12 bits.

In the example in FIG. 15, the pixel data including the MSB of the pixel P0 is allocated to the group 0, the pixel data including the MSB of the pixel P1 is allocated to the group 1, and the pixel data including the LSBs of the pixels P0 and P1 is allocated to the group 2. The pixel data after the pixel data including the MSB of the pixel P2 is allocated to each of the group 3 and the groups subsequent to the group 3 in order. A block in which a broken line is added of blocks indicating the pixel data represents pixel data in byte unit generated at the time of the Pixel to Byte conversion so as to include the LSBs of the pixels N and N+1.

In the example in FIG. 15, the payload stuffing data is not added to the pixel data of the groups 0 and 1, and one piece of the payload stuffing data is added at the end of the pixel data of each of the groups 2 to 15.

The payload data having such a configuration is supplied from the Pixel to Byte converter 62 to the payload ECC insertion unit 63.

The payload ECC insertion unit 63 calculates an error correction code which is used to correct an error in the payload data on the basis of the payload data supplied from the Pixel to Byte converter 62 and inserts a parity which is the error correction code obtained by the above calculation into the payload data. For example, a Reed-Solomon code is used as the error correction code. Note that, the insertion of the error correction code is optional, and for example, only one of the insertion of the parity by the payload ECC insertion unit 63 and the addition of the footer by the footer generation unit 74 can be performed.

Figure 16:
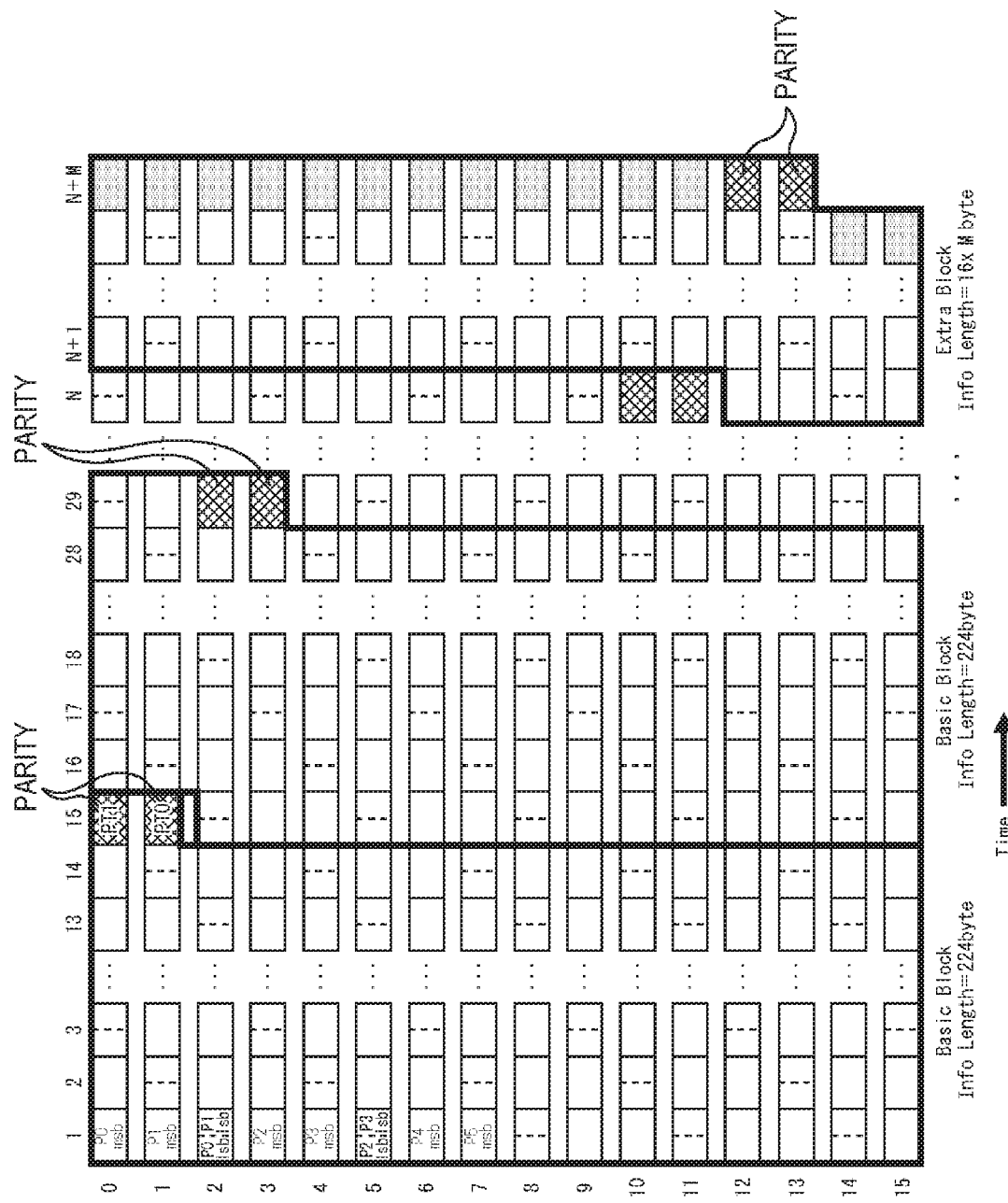
FIG. 16 is a diagram illustrating an example of payload data to which a parity is inserted.

FIG. 16 is a diagram illustrating an example of the payload data to which the parity is inserted.

The payload data illustrated in FIG. 16 is the payload data, described with reference to FIG. 15, including the pixel data acquired by the Pixel to Byte conversion in a case where the pixel value of each pixel is represented by 12 bits. A block in which diagonal lines are illustrated represents a parity.

In the example in FIG. 16, 14 pieces of pixel data are selected in order from the head pixel data in each of the groups 0 to 15, and two-byte parity is obtained on the basis of the selected 224 pieces (224 bytes) of pixel data. The two-byte parity is inserted subsequent to the 224 pieces of pixel data used for the calculation as 15th data of the groups 0 and 1, and the 224 pieces of pixel data and the two-byte parity form a first Basic Block.

In this way, the payload ECC insertion unit 63 basically generates the two-byte parity on the basis of the 224 pieces of pixel data and inserts the two-byte parity subsequent to the 224 pieces of pixel data.

Furthermore, in the example in FIG. 16, the 224 pieces of pixel data subsequent to the first Basic Block is selected from each group in order, and two-byte parity is obtained on the basis of the selected 224 pieces of pixel data. The two-byte parity is inserted subsequent to the 224 pieces of pixel data used for the calculation as 29th data of the groups 2 and 3, and the 224 pieces of pixel data and the two-byte parity form a second Basic Block.

In a case where a number 16×M, which is the number of pieces of pixel data and payload stuffing data subsequent to a certain Basic Block, is less than 224, a two-byte parity is obtained on the basis of remaining 16×M blocks (pixel data and payload stuffing data). Furthermore, the obtained two-byte parity is inserted subsequent to the payload stuffing data, and the 16×M blocks and the two-byte parity form an Extra Block.

The payload ECC insertion unit 63 outputs the payload data to which the parity is inserted to the packet generation unit 64. In a case where the parity is not inserted, the payload data supplied from the Pixel to Byte converter 62 to the payload ECC insertion unit 63 is output to the packet generation unit 64 as it is.

The packet generation unit 64 adds the header generated by the header generation unit 72 to the payload data supplied from the payload ECC insertion unit 63 so as to generate a packet. In a case where the footer generation unit 74 generates a footer, the packet generation unit 64 adds the footer to the payload data.

Figure 17:
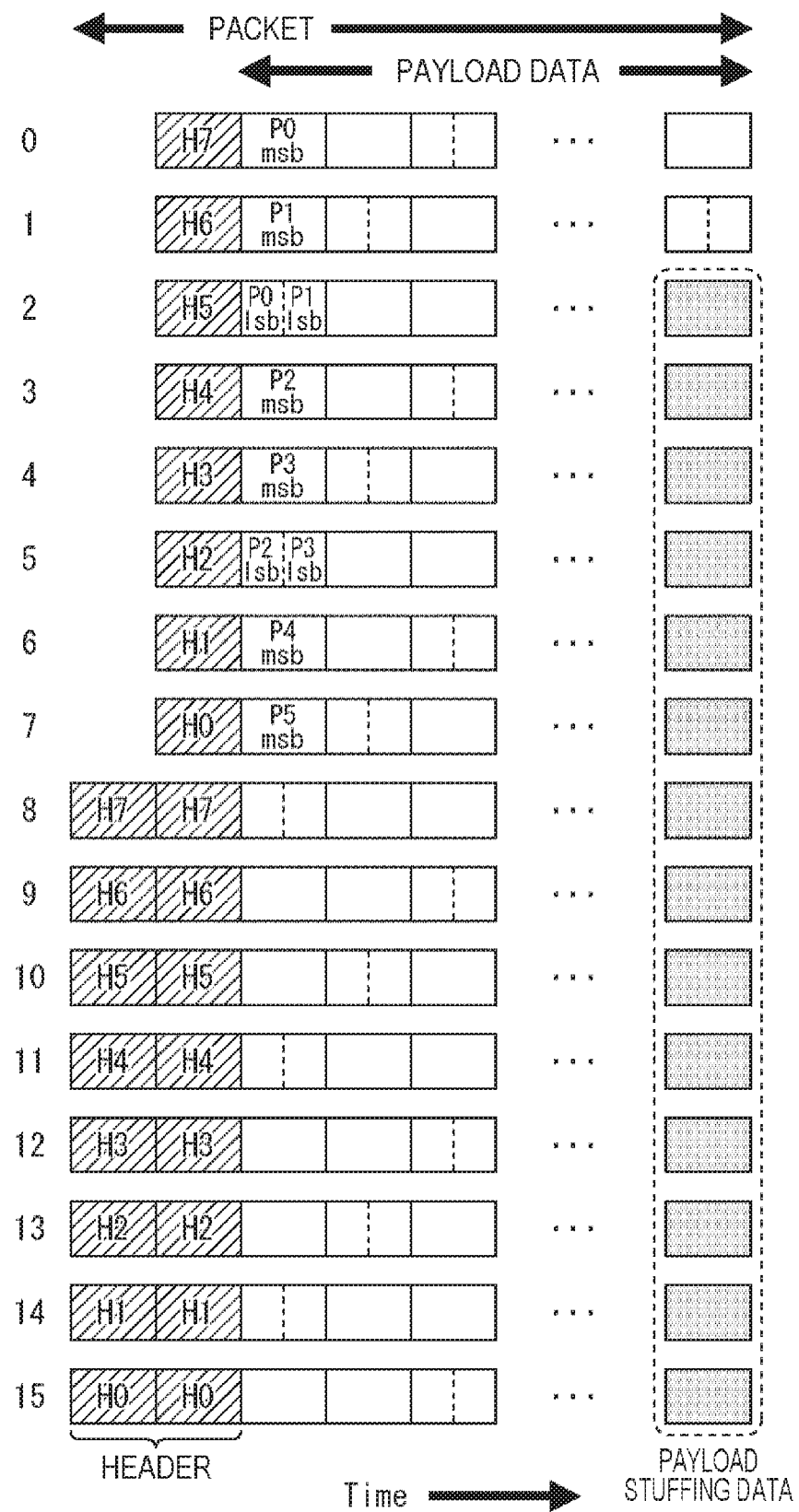
FIG. 17 is a diagram illustrating a state where a header is added to the payload data.

FIG. 17 is a diagram illustrating a state where the header is added to the payload data.

Header data in byte unit that is the header or the CRC code of the header information is represented by 24 blocks indicated with characters of H7 to H0. As described with reference to FIG. 6, the header of the single packet includes three pairs of the header information and the CRC code.

For example, the header data H7 to H2 is the header information (six bytes), and the header data H1 and H0 is the CRC code (two bytes).

In the example in FIG. 17, one piece of the header data H7 is added to the payload data of the group 0, and one piece of the header data H6 is added to the payload data of the group 1. One piece of the header data H5 is added to the payload data of the group 2, and one piece of the header data H4 is added to the payload data of the group 3. One piece of the header data H3 is added to the payload data of the group 4, and one piece of the header data H2 is added to the payload data of the group 5. One piece of the header data H1 is added to the payload data of the group 6, and one piece of the header data H0 is added to the payload data of the group 7.

Furthermore, in the example in FIG. 17, two pieces of the header data H7 are added to the payload data of the group 8, and two pieces of the header data H6 are added to the payload data of the group 9. Two pieces of the header data H5 are added to the payload data of the group 10, and two pieces of the header data H4 are added to the payload data of the group 11. Two pieces of the header data H3 are added to the payload data of the group 12, and two pieces of the header data H2 are added to the payload data of the group 13. Two pieces of the header data H1 are added to the payload data of the group 14, and two pieces of the header data H0 are added to the payload data of the group 15.

Figure 18:
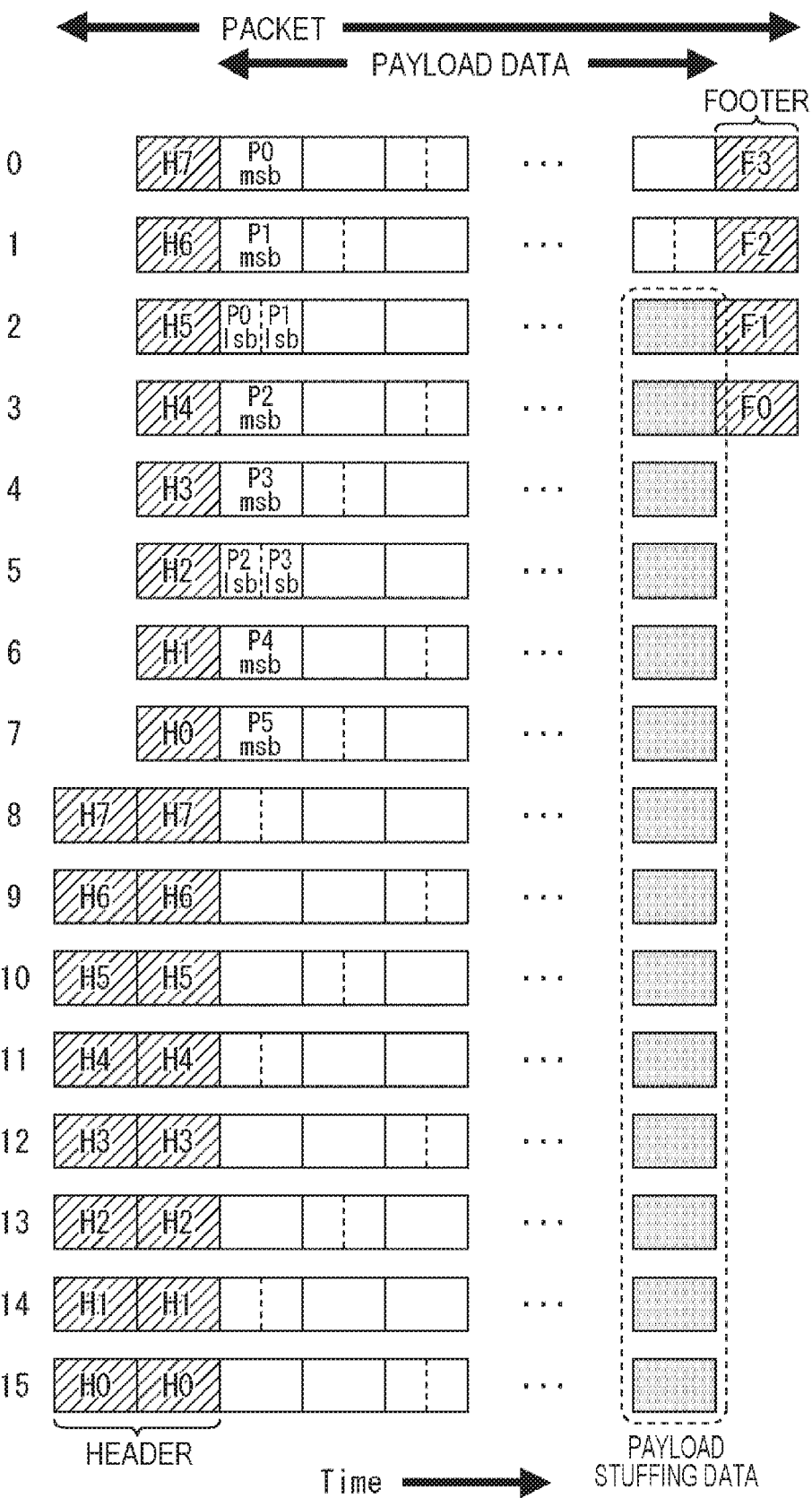
FIG. 18 is a diagram illustrating a state where a header and a footer are added to the payload data.

FIG. 18 is a diagram illustrating a state where the header and the footer are added to the payload data.

Footer data that is a four-byte CRC code generated as a footer is represented by four blocks indicated with characters of F3 to F0. In the example in FIG. 18, pieces of the footer data F3 to F0 are respectively added to the pieces of the payload data of the groups 0 to 3.

Figure 19:
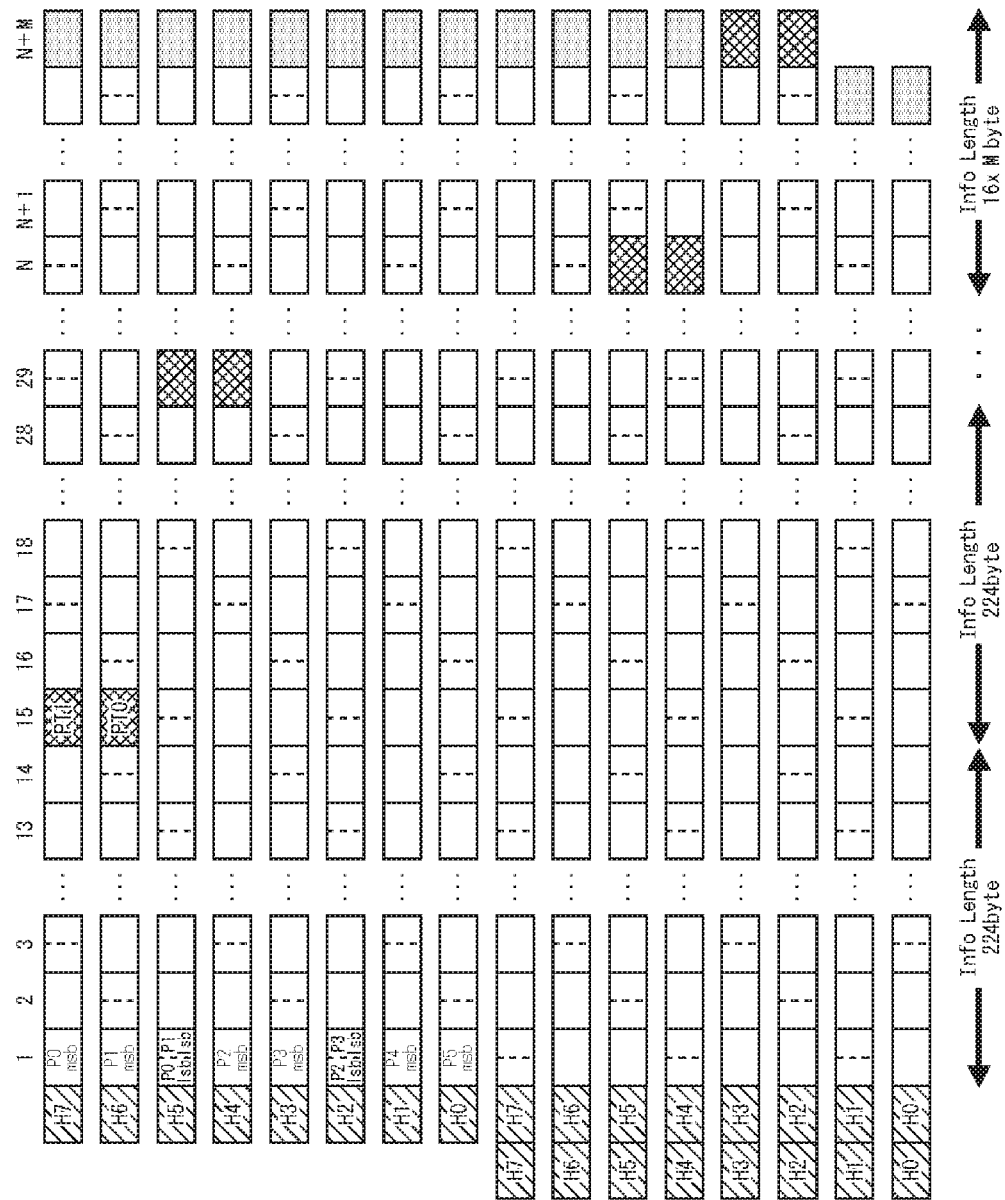
FIG. 19 is a diagram illustrating a state where a header is added to the payload data to which the parity is inserted.

FIG. 19 is a diagram illustrating a state where the header is added to the payload data to which the parity is inserted.

In the example in FIG. 19, as in a case of FIGS. 17 and 18, the header data H7 to H0 is added to the payload data in FIG. 16 to which the parity is inserted.

The packet generation unit 64 outputs packet data that is data constituting one packet generated in this way to the lane distribution unit 65. The packet data including the header data and the payload data, the packet data including the header data, the payload data, and the footer data, or the packet data including the header data and the payload data to which the parity is inserted is supplied to the lane distribution unit 65. The packet structure in FIG. 6 is a logical structure, and data of the packet having the structure in FIG. 6 is processed in byte unit in the link layer and the physical layer.

The lane distribution unit 65 allocates the packet data supplied from the packet generation unit 64 to each lane used for data transmission of Lanes 0 to 7 in order from the head data.

Figure 20:
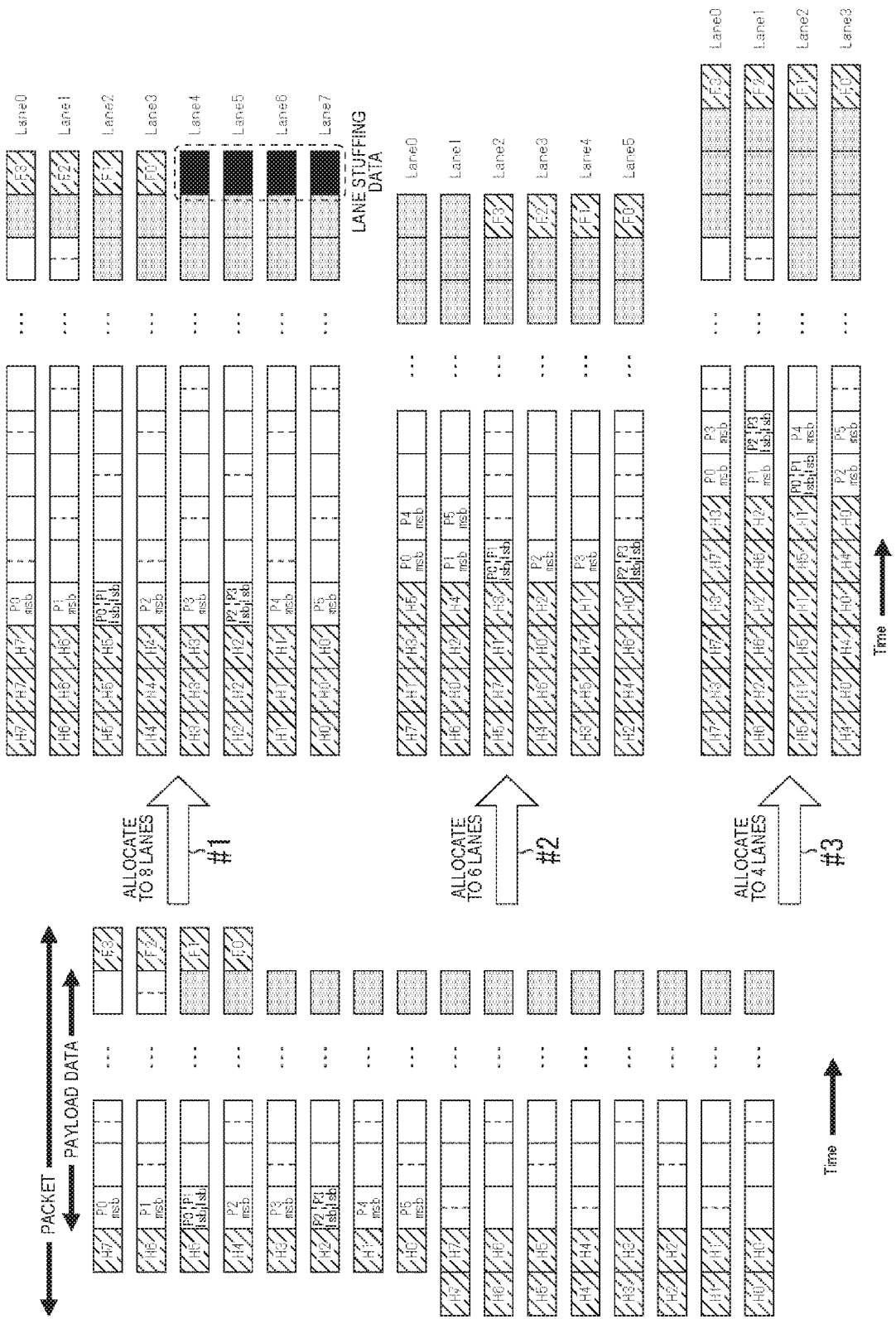
FIG. 20 is a diagram illustrating an example of packet data allocation.

FIG. 20 is a diagram illustrating an example of packet data allocation.

Here, allocation of the packet data including the header data, the payload data, and the footer data (FIG. 18) will be described. An example of packet data allocation in a case where data is transmitted by using eight lanes including Lanes 0 to 7 is illustrated in a portion pointed by an outline arrow #1.

In this case, each piece of the header data including three repetitions of each piece of the header data H7 to H0 is allocated to Lanes 0 to 7 in order from the head header data. When a certain piece of the header data is allocated to Lane 7, the subsequent pieces of the header data are allocated to each lane after Lane 0 in order. Three pieces of the same header data are allocated to each of Lanes 0 to 7.

Furthermore, the payload data is allocated to each of Lanes 0 to 7 in order from the head piece of the payload data. When a certain piece of the payload data is allocated to Lane 7, the subsequent pieces of the payload data are allocated to each lane after Lane 0 in order.

The footer data F3 to F0 is allocated to each lane in order from the head piece of the footer data. In the example in FIG. 20, the final piece of the payload stuffing data included in the payload data is allocated to Lane 7, each piece of the footer data F3 to F0 is allocated to Lanes 0 to 3.

A block colored with black represents lane stuffing data generated by the data insertion unit 73. After the packet data for one packet is allocated to each lane, the lane stuffing data is allocated to a lane having a small number of pieces of data so that the data lengths allocated to the respective lanes are the same. The lane stuffing data is one-byte data. In the example in FIG. 20, one piece of the lane stuffing data is allocated to each of Lanes 4 to 7 of which the number of allocated pieces of data is small.

The number of pieces of the lane stuffing data in a case where the packet data includes the header data, the payload data, and the footer data is expressed by the following formula (5).

[Formula 5]

$$\text{LaneStuffing} = \text{LaneNum} - ((\text{PayloadLength} + \text{FooterLength})\ \%\ \text{LaneNum}) \quad (5)$$

LaneNum in the formula (5) indicates the number of lanes, and PayloadLength indicates the length of the payload data (byte). Furthermore, FooterLength indicates the length of the footer (byte).

Furthermore, the number of pieces of lane stuffing data in a case where the packet data includes the header data and the payload data to which the parity is inserted is expressed by the following formula (6). ParityLength in the following formula (6) indicates the total number of bytes of the parity included in the payload.

[Formula 6]

$$\text{LaneStuffing} = \text{LaneNum} - ((\text{PayloadLength} + \text{ParityLength})\ \%\ \text{LaneNum}) \quad (6)$$

An example of allocation of the packet data in a case where data is transmitted by using six lanes including Lanes 0 to 5 is illustrated in a portion pointed by an outline arrow #2.

In this case, each piece of the header data including three repetitions of each piece of the header data H7 to H0 is allocated to Lanes 0 to 5 in order from the head piece of the header data. When a certain piece of the header data is allocated to Lane 5, the subsequent pieces of header data are allocated to each lane after Lane 0 in order. Four pieces of the same header data are allocated to each of Lanes 0 to 5.

Furthermore, the payload data is allocated to each of Lanes 0 to 5 in order from the head piece of the payload data. When a certain piece of the payload data is allocated to Lane 5, the subsequent pieces of payload data are allocated to each lane after Lane 0 in order.

The footer data F3 to F0 is allocated to each lane in order from the head piece of the footer data. In the example in FIG. 20, the final piece of the payload stuffing data included in the payload data is allocated to Lane 1, each piece of the footer data F3 to F0 is allocated to each of Lanes 2 to 5. Since the numbers of pieces of the packet data in Lanes 0 to 5 are the same, in this case, the lane stuffing data is not used.

An example of allocation of the packet data in a case where data is transmitted by using four lanes including Lanes 0 to 3 is illustrated in a portion pointed by an outline arrow #3.

In this case, each piece of the header data including three repetitions of each piece of the header data H7 to H0 is allocated to Lanes 0 to 3 in order from the head piece of the header data. When a certain piece of the header data is allocated to Lane 3, the subsequent pieces of header data are allocated to each lane after Lane 0 in order. Six pieces of the header data are allocated to each of Lanes 0 to 3.

Furthermore, the payload data is allocated to each of Lanes 0 to 3 in order from the head piece of the payload data. When a certain piece of the payload data is allocated to Lane 3, the subsequent pieces of payload data are allocated to each lane after Lane 0 in order.

The footer data F3 to F0 is allocated to each lane in order from the head piece of the footer data. In the example in FIG. 20, the final piece of the payload stuffing data included in the payload data is allocated to Lane 3, each piece of the footer data F3 to F0 is allocated to each of Lanes 0 to 3. Since the numbers of pieces of the packet data in Lanes 0 to 3 are the same, in this case, the lane stuffing data is not used.

The lane distribution unit 65 outputs the packet data allocated to each lane in this way to the physical layer. Hereinafter, a case where data is transmitted by using eight lanes including Lanes 0 to 7 will be mainly described. However, even in a case where the number of lanes used for data transmission is different, similar processing is executed.

[Configuration of Physical Layer of Transmission Unit 22]

Next, a configuration of the physical layer of the transmission unit 22 will be described.

The transmission unit 22 includes a PHY-TX state control unit 81, a clock generation unit 82, and signal processing units 83-0 to 83-N as the configuration of the physical layer. The signal processing unit 83-0 includes a control code insertion unit 91, an 8B10B symbol encoder 92, a synchronization unit 93, and a transmission unit 94. Packet data that is output from the lane distribution unit 65 and allocated to Lane 0 is input to the signal processing unit 83-0, and packet data allocated to Lane 1 is input to the signal processing unit 83-1. Furthermore, packet data allocated to Lane N is input to the signal processing unit 83-N.

In this way, the signal processing units 83-0 to 83-N as many as the number of lanes are provided in the physical layer of the transmission unit 22, and processing on the packet data transmitted by using each lane is executed by the signal processing units 83-0 to 83-N in parallel. A configuration of the signal processing unit 83-0 will be described. However, the signal processing units 83-1 to 83-N have a similar configuration.

The PHY-TX state control unit 81 controls each of the signal processing units 83-0 to 83-N. For example, a timing of the processing executed by each of the signal processing units 83-0 to 83-N is controlled by the PHY-TX state control unit 81.

The clock generation unit 82 generates a clock signal and outputs the generated clock signal to the synchronization unit 93 of each of the signal processing units 83-0 to 83-N.

The control code insertion unit 91 of the signal processing unit 83-0 adds a control code to the packet data supplied from the lane distribution unit 65. The control code is a code represented by a single symbol selected from among a plurality of kinds of symbols prepared in advance or a combination of the plurality of kinds of symbols. Each symbol inserted by the control code insertion unit 91 is eight-bit data. By performing 8B10B conversion in a post-stage circuit, the single symbol inserted by the control code insertion unit 91 is changed to 10-bit data. On the other hand, in the reception unit 31, 10B8B conversion is performed on reception data as described later. However, each symbol before the 10B8B conversion included in the reception data is 10-bit data, and each symbol after the 10B8B conversion is eight-bit data.

FIG. 21 is a diagram illustrating an example of the control code added by the control code insertion unit 91.

The control codes include Idle Code, Start Code, End Code, Pad Code, Sync Code, Deskew Code, and Standby Code.

Idle Code is a symbol group repeatedly transmitted in a period other than the time when the packet data is transmitted. Idle Code is represented by D00.0(00000000) of D Character which is an 8B10B Code.

Start Code is a symbol group indicating start of a packet. As described above, Start Code is added before the packet. Start Code is represented by four symbols of K28.5, K27.7, K28.2, and K27.7 which are combinations of three kinds of K Characters. Values of K Characters are illustrated in FIG. 22.

End Code is a symbol group indicating end of the packet. As described above, End Code is added after the packet. End Code is represented by four symbols of K28.5, K29.7, K30.7, and K29.7 which are combinations of three kinds of K Characters.

Pad Code is a symbol group that is inserted into the payload data so as to fill a difference between a pixel data band and a PHY transmission band. The pixel data band is a transmission rate of the pixel data that is output from the imaging unit 21 and is input to the transmission unit 22, and the PHY transmission band is a transmission rate of the pixel data that is transmitted from the transmission unit 22 and is input to the reception unit 31. Pad Code is represented by four symbols of K23.7, K28.4, K28.6, and K28.3 which are combinations of four kinds of K Characters.

Figure 23:
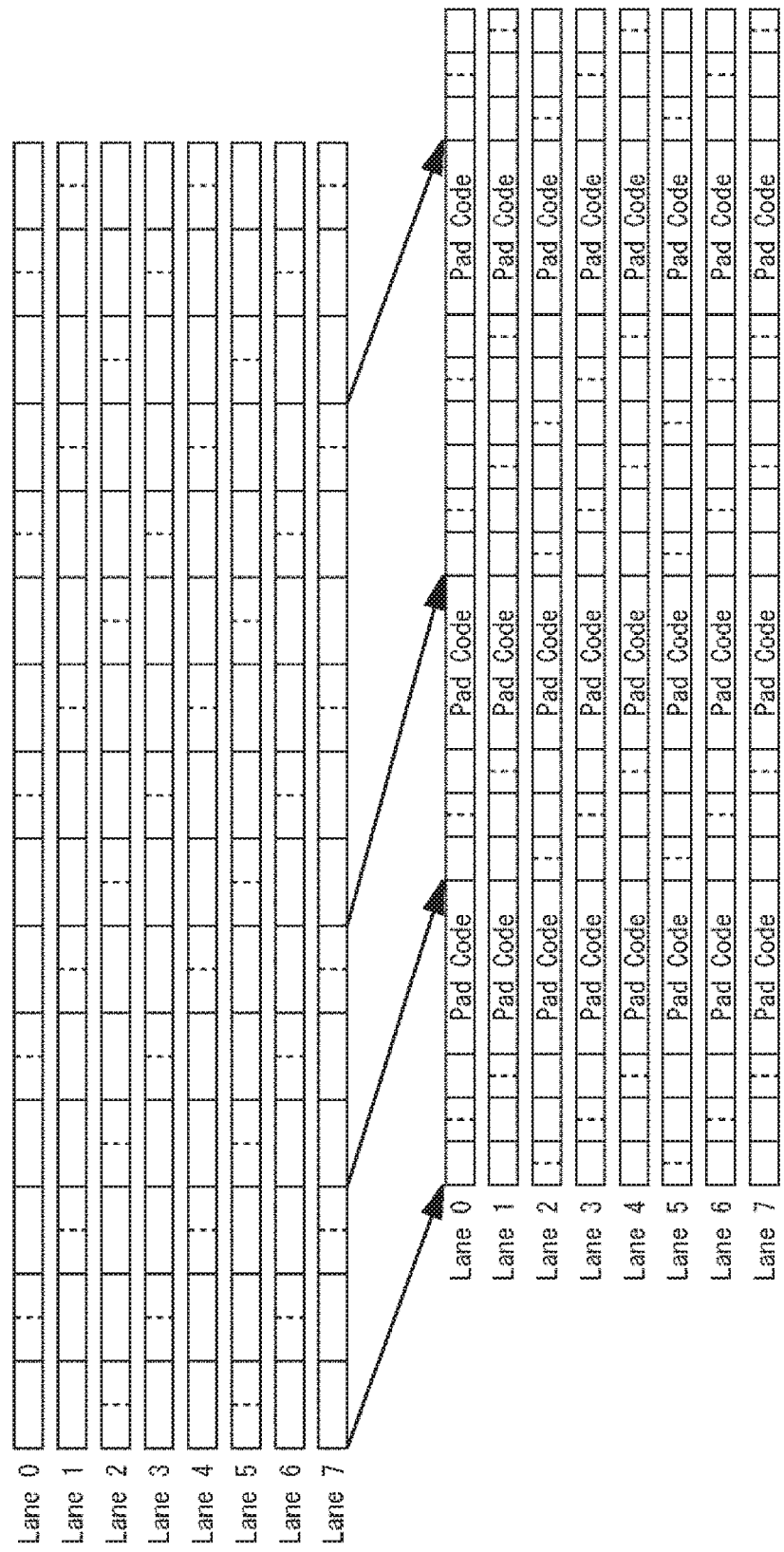
FIG. 23 is a diagram illustrating an example of insertion of Pad Codes.

FIG. 23 is a diagram illustrating an example of insertion of Pad Code.

An upper portion of FIG. 23 illustrates payload data allocated to each lane before Pad Code is inserted, and a lower portion illustrates payload data after Pad Code has been inserted. In the example in FIG. 23, Pad Codes are inserted between third pixel data from the head and fourth pixel data, between sixth pixel data and seventh pixel data, and between 12th pixel data and 13th pixel data. In this way, Pad Code is inserted at the same position of the payload data in each of Lanes 0 to 7.

Pad Code is inserted into the payload data allocated to Lane 0 by the control code insertion unit 91 of the signal processing unit 83-0. Similarly, Pad Codes are respectively inserted into the payload data allocated to the other lanes at the same timing by the signal processing units 83-1 to 83-N. The number of Pad Codes is determined on the basis of the difference between the pixel data band and the PHY transmission band, a frequency of the clock signal generated by the clock generation unit 82, and the like.

In this way, in a case where the pixel data band is narrow and the PHY transmission band is wide, Pad Code is inserted to adjust the difference between the bands. For example, Pad Code is inserted so as to adjust the difference between the pixel data band and the PHY transmission band to be within a certain range.

Returning to the description of FIG. 21, Sync Code is a symbol group used to secure bit synchronization and symbol synchronization between the transmission unit 22 and the reception unit 31. Sync Code is represented by two symbols of K28.5 and Any. Any indicates that any kind of symbol may be used. For example, Sync Code is repeatedly transmitted in a training mode before the transmission of the packet data between the transmission unit 22 and the reception unit 31 is started.

Deskew Code is a symbol group that is used to correct Data Skew between the lanes, in other words, a difference in reception timing of data received in each lane of the reception unit 31. Deskew Code is represented by two symbols of K28.5 and Any**. The correction of Data Skew between the lanes by using Deskew Code will be described later.

Standby Code is a symbol group used to notify the reception unit 31 that a state of an output of the transmission unit 22 becomes High-Z (high impedance) or the like and data is not transmitted. In other words, Standby Code is transmitted to the reception unit 31 when the transmission of the packet data is terminated and Standby state is set. Standby Code is represented by two symbols of K28.5 and Any**.

The control code insertion unit 91 outputs the packet data to which such a control code is added to the 8B10B symbol encoder 92.

Figure 24:
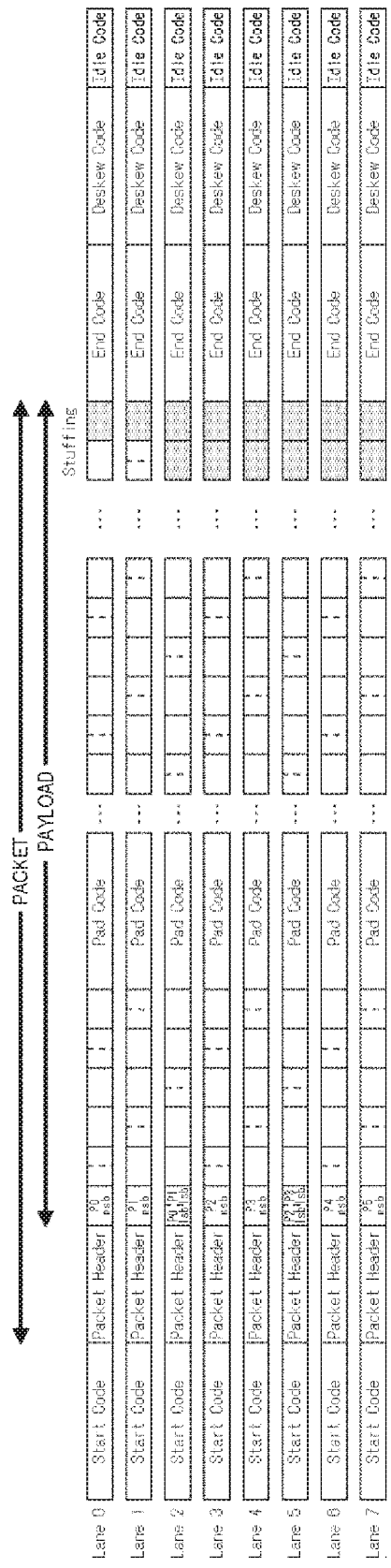
FIG. 24 is a diagram illustrating an example of packet data to which the control code is inserted.

FIG. 24 is a diagram illustrating an example of packet data to which the control code is inserted.

As illustrated in FIG. 24, each of the signal processing units 83-0 to 83-N adds Start Code before the packet data and inserts Pad Code into the payload data. End Code is added after the packet data, and Deskew Code is added after End Code. In the example in FIG. 24, Idle Code is added after Deskew Code.

The 8B10B symbol encoder 92 performs the 8B10B conversion on the packet data supplied from the control code insertion unit 91 (packet data to which control code is added) and outputs the packet data that is converted into data in 10-bit unit to the synchronization unit 93.

The synchronization unit 93 outputs each bit of the packet data supplied from the 8B10B symbol encoder 92 to the transmission unit 94 according to the clock signal generated by the clock generation unit 82. Note that it is not necessary to provide the synchronization unit 93 in the transmission unit 22. In this case, the packet data output from the 8B10B symbol encoder 92 is supplied to the transmission unit 94 as it is.

The transmission unit 94 transmits the packet data supplied from the synchronization unit 93 to the reception unit 31 via a transmission path forming Lane 0. In a case where data is transmitted by using eight lanes, the packet data is transmitted to the reception unit 31 by using transmission paths respectively forming Lanes 1 to 7.

[Configuration of Physical Layer of Reception Unit 31]

Next, a configuration of the physical layer of the reception unit 31 will be described.

The reception unit 31 includes a PHY-RX state control unit 101 and signal processing units 102-0 to 102-N as the configuration of the physical layer. The signal processing unit 102-0 includes a reception unit 111, a clock generation unit 112, a synchronization unit 113, a symbol synchronization unit 114, a 10B8B symbol decoder 115, a skew correction unit 116, and a control code removal unit 117. Packet data transmitted via the transmission path forming Lane 0 is input to the signal processing unit 102-0, and packet data transmitted via the transmission path forming Lane 1 is input to the signal processing unit 102-1. Furthermore, packet data transmitted via the transmission path forming Lane N is input to the signal processing unit 102-N.

In this way, the signal processing units 102-0 to 102-N as many as the number of lanes are provided in the physical layer of the reception unit 31, and processing on the packet data transmitted by using each lane is executed by the signal processing units 102-0 to 102-N in parallel. A configuration of the signal processing unit 102-0 will be described. However, the signal processing units 102-1 to 102-N have a similar configuration.

The reception unit 111 receives a signal indicating the packet data transmitted from the transmission unit 22 via the transmission path forming Lane 0 and outputs the received signal to the clock generation unit 112.

The clock generation unit 112 performs bit synchronization by detecting an edge of the signal supplied from the reception unit 111 and generates a clock signal on the basis of an edge detection period. The clock generation unit 112 outputs the signal supplied from the reception unit 111 and the clock signal to the synchronization unit 113.

The synchronization unit 113 samples the signal received by the reception unit 111 according to the clock signal generated by the clock generation unit 112 and outputs packet data acquired by sampling to the symbol synchronization unit 114. The clock generation unit 112 and the synchronization unit 113 realize a function of Clock Data Recovery (CDR).

The symbol synchronization unit 114 detects the control code included in the packet data or detects some symbols included in the control code so as to perform symbol synchronization. For example, the symbol synchronization unit 114 detects the symbol K28.5 included in each of Start Code, End Code, and Deskew Code and performs the symbol synchronization. The symbol synchronization unit 114 outputs packet data in 10-bit unit representing each symbol to the 10B8B symbol decoder 115.

Furthermore, the symbol synchronization unit 114 performs the symbol synchronization by detecting a symbol boundary included in Sync Code that is repeatedly transmitted from the transmission unit 22 in the training mode before the transmission of the packet data is started.

The 10B8B symbol decoder 115 performs the 10B8B conversion on the packet data in 10-bit unit supplied from the symbol synchronization unit 114 and outputs the packet data converted into data in eight-bit unit to the skew correction unit 116.

The skew correction unit 116 detects Deskew Code from the packet data supplied from the 10B8B symbol decoder 115. Information regarding a detection timing of Deskew Code by the skew correction unit 116 is supplied to the PHY-RX state control unit 101.

Furthermore, the skew correction unit 116 corrects Data Skew between the lanes so as to adjust the timing of Deskew Code to a timing indicated by the information supplied from the PHY-RX state control unit 101. The PHY-RX state control unit 101 supplies information indicating the latest timing among timings of Deskew Code detected by the signal processing units 102-0 to 102-N.

Figure 25:
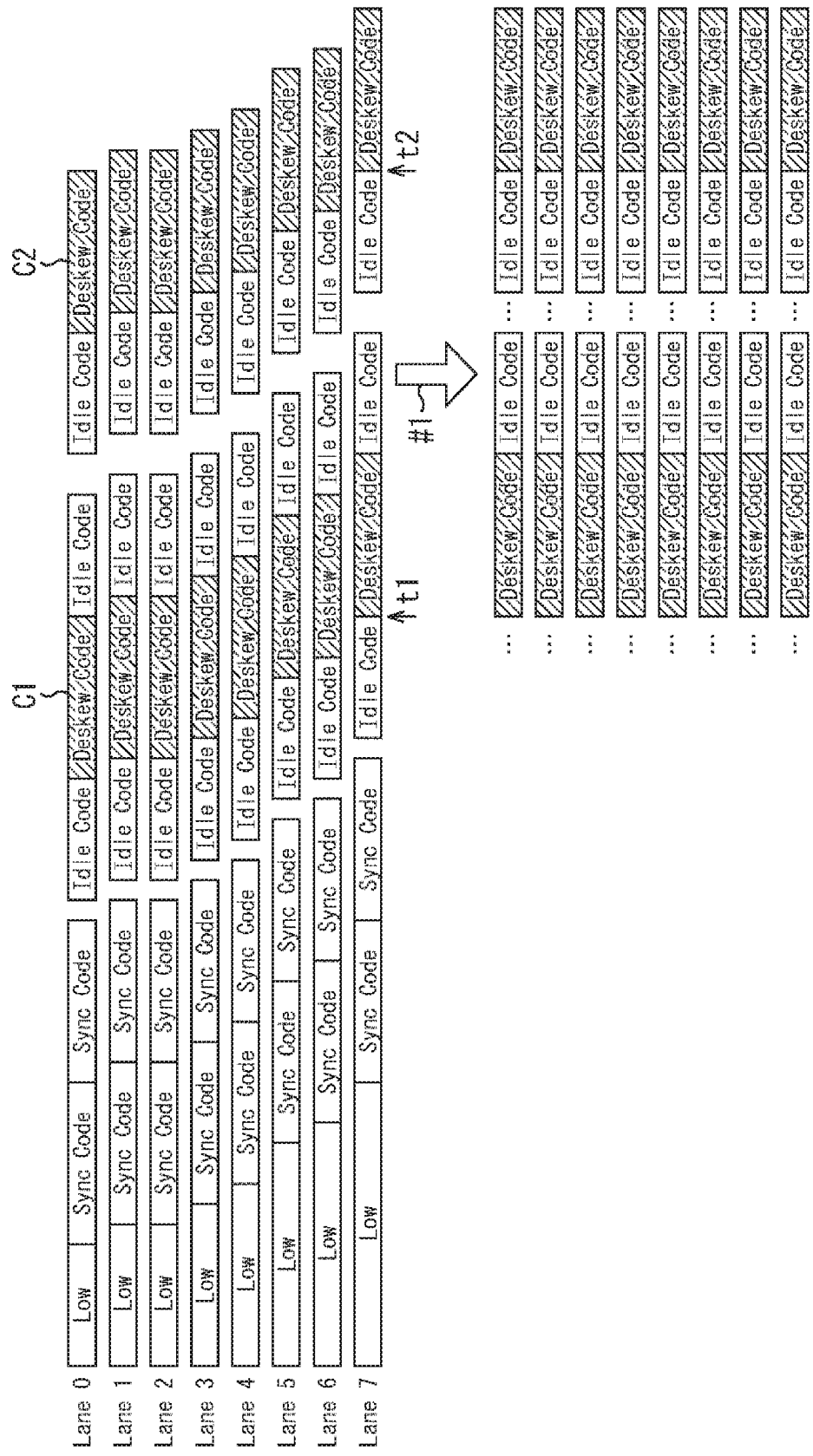
FIG. 25 is a diagram illustrating an example of correction of Data Skew.

FIG. 25 is a diagram illustrating an example of the correction of Data Skew between the lanes by using Deskew Code.

In the example in FIG. 25, Sync Code, Sync Code, . . . , Idle Code, Deskew Code, Idle Code, . . . , Idle Code, and Deskew Code are transmitted in each of Lanes 0 to 7, and the control codes thereof are received by the reception unit 31. Reception timings of the same control code in the lanes are different from each other, and the difference causes Data Skew between the lanes.

In this case, the skew correction unit 116 detects Deskew Code C1 which is a first Deskew Code and corrects a timing of a head of Deskew Code C1 to be a time t1 indicated by the information supplied from the PHY-RX state control unit 101. The PHY-RX state control unit 101 supplies information regarding the time t1 when Deskew Code C1 is detected in Lane 7 at the latest timing among the timings when Deskew Code C1 is detected in respective Lanes 0 to 7.

Furthermore, the skew correction unit 116 detects Deskew Code C2 which is a second Deskew Code and corrects a timing of a head of Deskew Code C2 to be a time t2 indicated by the information supplied from the PHY-RX state control unit 101. The PHY-RX state control unit 101 supplies information regarding the time t2 when Deskew Code C2 is detected in Lane 7 at the latest timing among the timings when Deskew Code C2 is detected in respective Lanes 0 to 7.

By executing the similar processing by the signal processing units 102-1 to 102-N, Data Skew between the lanes is corrected as indicated in a portion pointed by an arrow #1 in FIG. 25.

The skew correction unit 116 outputs the packet data of which Data Skew is corrected to the control code removal unit 117.

The control code removal unit 117 removes the control code added to the packet data and outputs data between Start Code to End Code to the link layer as packet data.

The PHY-RX state control unit 101 controls each of the signal processing units 102-0 to 102-N and causes each signal processing unit to correct Data Skew between the lanes, for example. Furthermore, in a case where a transmission error is caused in a predetermined lane and the control code is lost, the PHY-RX state control unit 101 adds the control code transmitted via the other lane instead of the lost control code so as to correct an error in the control code.

[Configuration of Link Layer of Reception Unit 31]

Next, a configuration of the link layer of the reception unit 31 will be described.

The reception unit 31 includes the LINK-RX protocol management unit 121, a lane integration unit 122, a packet separation unit 123, a payload error correction unit 124, and a Byte to Pixel converter 125 as the configuration of the link layer. The LINK-RX protocol management unit 121 includes a state control unit 131, a header error correction unit 132, a data removal unit 133, and a footer error detection unit 134.

The lane integration unit 122 integrates the packet data supplied from the signal processing units 102-0 to 102-N of the physical layer by rearranging the packet data in order reverse to the distribution order to each lane by the lane distribution unit 65 of the transmission unit 22.

For example, in a case where the lane distribution unit 65 distributes the packet data as illustrated in a portion pointed by the arrow #1 in FIG. 20, packet data on the left side of FIG. 20 is acquired by integrating the packet data in the lanes. At the time when the packet data in the lanes is integrated, the lane integration unit 122 removes the lane stuffing data according to control by the data removal unit 133. The lane integration unit 122 outputs the integrated packet data to the packet separation unit 123.

The packet separation unit 123 separates the packet data for one packet integrated by the lane integration unit 122 into packet data forming the header data and packet data forming the payload data. The packet separation unit 123 outputs the header data to the header error correction unit 132 and outputs the payload data to the payload error correction unit 124.

Furthermore, in a case where the packet includes a footer, the packet separation unit 123 separates data for one packet into the packet data forming the header data, the packet data forming the payload data, and the packet data forming the footer data. The packet separation unit 123 outputs the header data to the header error correction unit 132 and outputs the payload data to the payload error correction unit 124. Furthermore, the packet separation unit 123 outputs the footer data to the footer error detection unit 134.

In a case where the parity is inserted into the payload data supplied from the packet separation unit 123, the payload error correction unit 124 detects an error in the payload data by performing error correction calculation on the basis of the parity and corrects the detected error. For example, in a case where the parity is inserted as illustrated in FIG. 16, the payload error correction unit 124 uses two parities inserted at the end of the first Basic Block so as to correct an error in the 224 pieces of pixel data provided before the parities.

The payload error correction unit 124 outputs the pixel data after the error correction acquired by correcting the error in each of Basic Block and Extra Block to the Byte to Pixel converter 125. In a case where the parity is not inserted into the payload data supplied from the packet separation unit 123, the payload data supplied from the packet separation unit 123 is output to the Byte to Pixel converter 125.

The Byte to Pixel converter 125 removes the payload stuffing data included in the payload data supplied from the payload error correction unit 124 according to the control by the data removal unit 133.

Furthermore, the Byte to Pixel converter 125 performs Byte to Pixel conversion for converting data of each pixel in byte unit acquired by removing the payload stuffing data into pixel data in eight-bit, 10-bit, 12-bit, 14-bit, or 16-bit units. The Byte to Pixel converter 125 performs the conversion reverse to the Pixel to Byte conversion by the Pixel to Byte converter 62 of the transmission unit 22 described with reference to FIGS. 9 to 13.

The Byte to Pixel converter 125 outputs the pixel data in eight-bit, 10-bit, 12-bit, 14-bit, or 16-bit units acquired by the Byte to Pixel conversion to the frame data output unit 141. In the frame data output unit 141, for example, each line of the valid pixel specified by Line Valid of the header information is generated on the basis of the pixel data acquired by the Byte to Pixel converter 125, a one-frame image is generated by arranging each line according to Line Number of the header information.

The state control unit 131 of the LINK-RX protocol management unit 121 manages a state of the link layer of the reception unit 31.

The header error correction unit 132 acquires three pairs of the header information and the CRC code on the basis of the header data supplied from the packet separation unit 123. The header error correction unit 132 performs error detection calculation that is calculation for detecting an error in the header information for each of the pairs of the header information and the CRC code by using the CRC code in the same pair as the header information.

Furthermore, the header error correction unit 132 estimates correct header information on the basis of at least one of the error detection result of the header information of each pair or the comparison result of data acquired by the error detection calculation and outputs the header information that has been estimated as correct header information and a decoding result. The data acquired by the error detection calculation is a value acquired by applying the generator polynomial of the CRC to the header information. Furthermore, the decoding result is information indicating successful decoding or failed decoding.

The three pairs of the header information and the CRC code are referred to as a pair 1, a pair 2, and a pair 3. In this case, the header error correction unit 132 acquires whether or not header information of the pair 1 includes an error (error detection result) by the error detection calculation on the pair 1 and data 1 that is data acquired by the error detection calculation. Furthermore, the header error correction unit 132 acquires whether or not header information of the pair includes an error by the error detection calculation on the pair 2 and data 2 that is data acquired by the error detection calculation. The header error correction unit 132 acquires whether or not header information of the pair 3 includes an error by the error detection calculation on the pair 3 and data 3 that is data acquired by the error detection calculation.

Furthermore, the header error correction unit 132 determines whether or not the data 1 coincides with the data 2, whether or not the data 2 coincides with the data 3, and whether or not the data 3 coincides with the data 1.

For example, in a case where an error is not detected by the error detection calculation on any one of the pairs 1, 2, and 3 and the comparison results of the data acquired by the error detection calculation coincide, the header error correction unit 132 selects information indicating the successful decoding as the decoding result. Furthermore, the header error correction unit 132 estimates that all the pieces of the header information are correct and selects any one of the header information of the pair 1, the header information of the pair 2, and the header information of the pair 3 as output information.

On the other hand, in a case where an error is not detected only in the error detection calculation on the pair 1, the header error correction unit 132 selects the information indicating the successful decoding as the decoding result, estimates that the header information of the pair 1 is correct, and selects the header information of the pair 1 as the output information.

Furthermore, in a case where an error is not detected only in the error detection calculation on the pair 2, the header error correction unit 132 selects the information indicating the successful decoding as the decoding result, estimates that the header information of the pair 2 is correct, and selects the header information of the pair 2 as the output information.

In a case where an error is not detected only in the error detection calculation on the pair 3, the header error correction unit 132 selects the information indicating the successful decoding as the decoding result, estimates that the header information of the pair 3 is correct, and selects the header information of the pair 3 as the output information.

The header error correction unit 132 outputs the decoding result and the output information selected as described above to the register 142 and causes the register 142 to store the output information. In this way, the header error correction unit 132 corrects an error in the header information by detecting header information with no error by using the CRC code from among the plurality of pieces of header information and outputting the detected header information.

The data removal unit 133 removes the lane stuffing data by controlling the lane integration unit 122 and removes the payload stuffing data by controlling the Byte to Pixel converter 125.

The footer error detection unit 134 acquires the CRC code stored in the footer on the basis of the footer data supplied from the packet separation unit 123. The footer error detection unit 134 performs the error detection calculation by using the acquired CRC code and detects an error in the payload data. The footer error detection unit 134 outputs the error detection result and causes the register 142 to store the output result.

[Operation of Image Sensor 11 and DSP 12]

Next, a series of processing of the transmission unit 22 and the reception unit 31 having the above configuration will be described.

Figure 26:
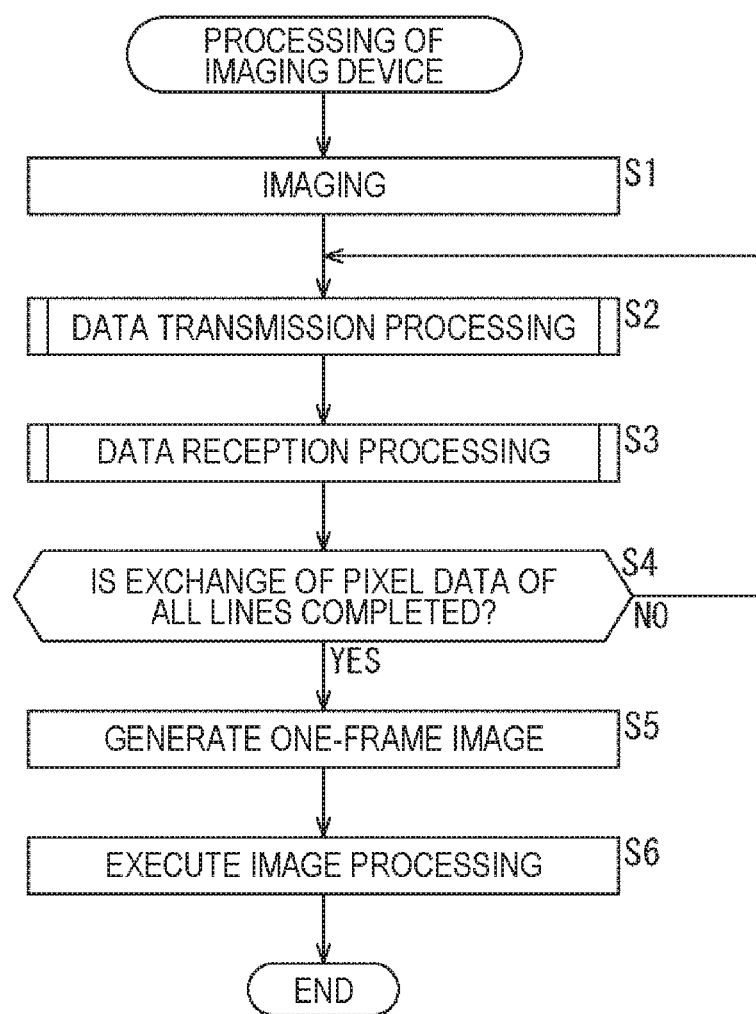
FIG. 26 is a flowchart for explaining processing of an imaging device.

First, an operation of an imaging device including the transmission system 1 will be described with reference to the flowchart in FIG. 26. Processing in FIG. 26 is started when an instruction to start imaging is issued, for example, by pressing a shutter button provided in the imaging device.

In step S1, the imaging unit 21 of the image sensor 11 performs imaging. The frame data input unit 52 (FIG. 5) of the imaging unit 21 sequentially outputs pixel data of the one-frame image acquired by imaging by one-pixel data.

In step S2, the transmission unit 22 executes data transmission processing. According to the data transmission processing, a packet in which pixel data for one line is stored in a payload is generated, and packet data forming the packet is transmitted to the reception unit 31. The data transmission processing will be described later with reference to the flowchart in FIG. 27.

In step S3, the reception unit 31 executes data reception processing. According to the data reception processing, the packet data transmitted from the transmission unit 22 is received, and the pixel data stored in the payload is output to the image processing unit 32. The data reception processing will be described later with reference to the flowchart in FIG. 28.

The data transmission processing executed by the transmission unit 22 in step S2 and the data reception processing executed by the reception unit 31 in step S3 are alternately executed on the pixel data for one line. In other words, when pixel data for one line is transmitted by the data transmission processing, the data reception processing is executed, and when the pixel data for one line is received by the data reception processing, the data transmission processing is executed on pixel data for next one line. The data transmission processing by the transmission unit 22 and the data reception processing by the reception unit 31 may be appropriately executed in parallel in time. In step S4, the frame data output unit 141 of the image processing unit 32 determines whether or not exchange of the pixel data of all the lines included in the one-frame image is terminated. In a case where it is determined that the exchange of the pixel data is not terminated, the frame data output unit 141 repeatedly executes the processing in and after step S2.

In a case where it is determined in step S4 that the exchange of the pixel data of all the lines included in the one-frame image is terminated, the frame data output unit 141 of the image processing unit 32 generates a one-frame image on the basis of the pixel data supplied from the reception unit 31 in step S5.

In step S6, the image processing unit 32 executes image processing by using the one-frame image and terminates the processing.

Figure 27:
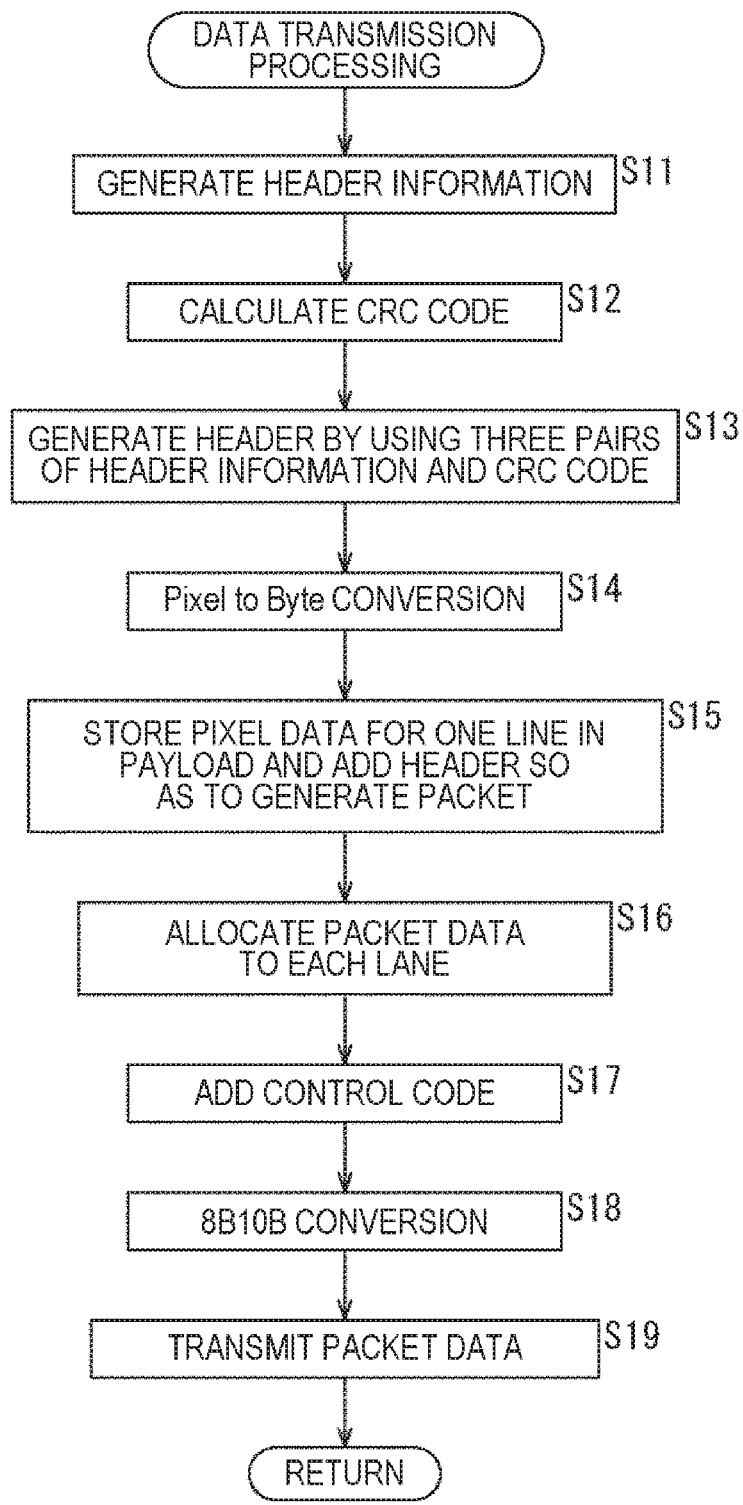
FIG. 27 is a flowchart for explaining data transmission processing executed in step S2 in FIG. 26.

Next, the data transmission processing executed in step S2 in FIG. 26 will be described with reference to the flowchart in FIG. 27.

In step S11, the header generation unit 72 generates header information including Frame Start, Frame End, Line Valid, Line Number, and Reserved.

In step S12, the header generation unit 72 calculates a CRC code by applying the header information to the generator polynomial.

In step S13, the header generation unit 72 generates a pair of the header information and the CRC code by adding the CRC code to the header information and generates a header by repeatedly arranging the three same pairs of the header information and the CRC code.

In step S14, the Pixel to Byte converter 62 acquires the pixel data supplied from the frame data input unit 52 and performs the Pixel to Byte conversion. The Pixel to Byte converter 62 outputs the generated payload data by grouping the pixel data in byte unit acquired by the Pixel to Byte conversion, adding the payload stuffing data, and the like. The payload ECC insertion unit 63 appropriately inserts the parity into the payload data.

In step S15, the packet generation unit 64 generates a packet on the basis of the payload data including the pixel data for one line and the header generated by the header generation unit 72 and outputs packet data constituting one packet.

In step S16, the lane distribution unit 65 allocates the packet data supplied from the packet generation unit 64 to the plurality of lanes used for data transmission.

In step S17, the control code insertion unit 91 adds the control code to the packet data supplied from the lane distribution unit 65.

In step S18, the 8B10B symbol encoder 92 performs the 8B10B conversion on the packet data to which the control code is added and outputs the packet data converted into data in 10-bit unit.

In step S19, the synchronization unit 93 outputs the packet data supplied from the 8B10B symbol encoder 92 according to the clock signal generated by the clock generation unit 82 and makes the transmission unit 94 transmit the packet data. The processing in steps S17 to S19 is executed by the signal processing units 83-0 to 83-N in parallel. When the transmission of the pixel data for one line is completed, the procedure returns to step S2 in FIG. 26, and the subsequent processing is executed.

Figure 28:
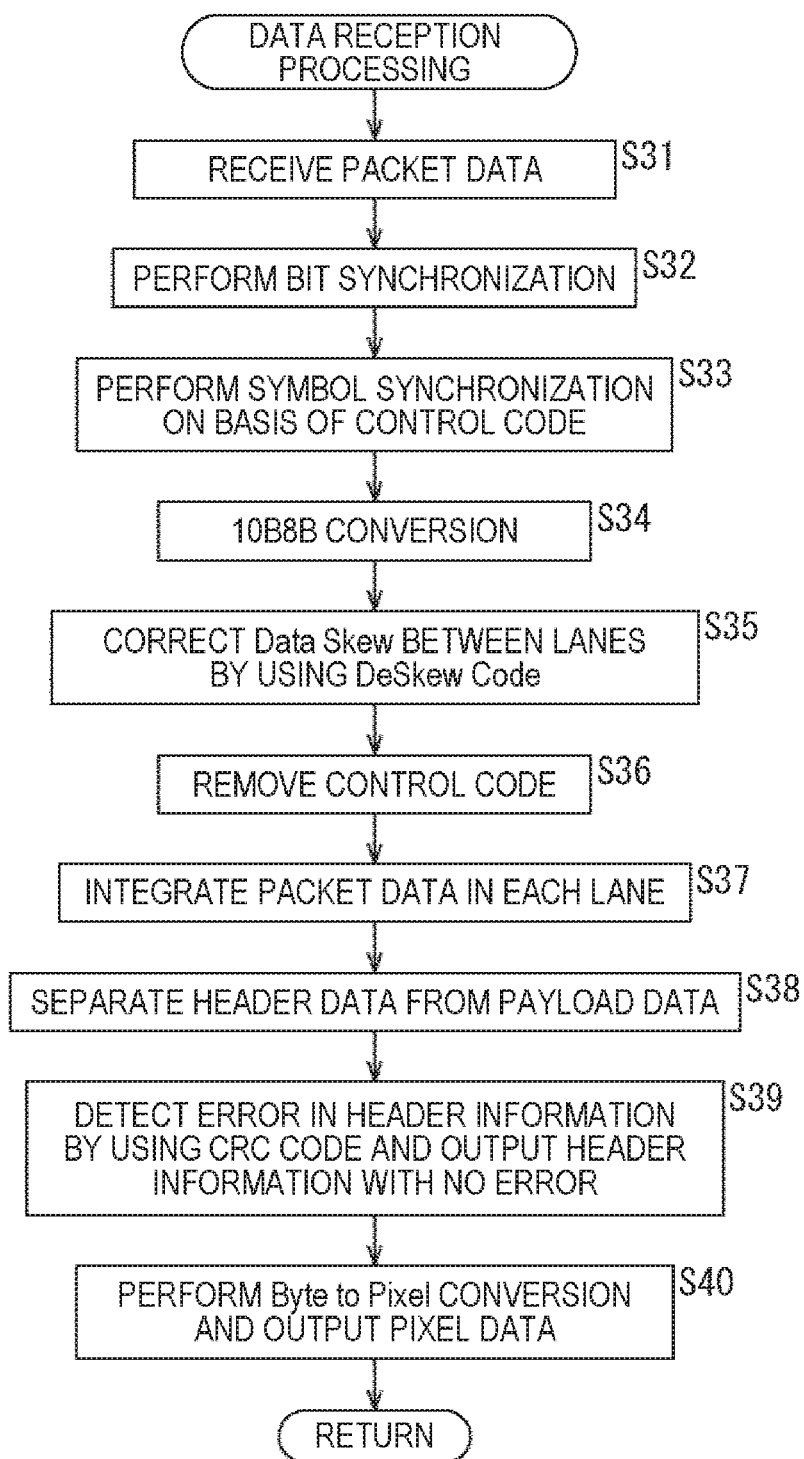
FIG. 28 is a flowchart for explaining data reception processing executed in step S3 in FIG. 26.

Next, the data reception processing executed in step S3 in FIG. 26 will be described with reference to the flowchart in FIG. 28.

In step S31, the reception unit 111 receives a signal indicating the packet data transmitted from the transmission unit 22. The processing in steps S31 to S36 is executed by the signal processing units 102-0 to 102-N in parallel.

In step S32, the clock generation unit 112 performs bit synchronization by detecting the edge of the signal supplied from the reception unit 111. The synchronization unit 113 samples the signal received by the reception unit 111 and outputs the packet data to the symbol synchronization unit 114.

In step S33, the symbol synchronization unit 114 performs symbol synchronization, for example, by detecting the control code included in the packet data.

In step S34, the 10B8B symbol decoder 115 performs the 10B8B conversion on the packet data on which the symbol synchronization has been performed, and outputs the packet data converted into data in eight-bit unit.

In step S35, the skew correction unit 116 detects Deskew Code and corrects Data Skew between the lanes so as to adjust the timing of Deskew Code to a timing indicated by the information supplied from the PHY-RX state control unit 101 as described above.

In step S36, the control code removal unit 117 removes the control code added to the packet data.

In step S37, the lane integration unit 122 integrates the packet data supplied from the signal processing units 102-0 to 102-N.

In step S38, the packet separation unit 123 separates the packet data integrated by the lane integration unit 122 into the packet data forming the header data and the packet data forming the payload data.

In step S39, the header error correction unit 132 performs error detection calculation by using the CRC code on each pair of the header information and the CRC code included in the header data separated by the packet separation unit 123. Furthermore, the header error correction unit 132 selects the header information with no error on the basis of the error detection result of each pair and the comparison result of the data acquired by the error detection calculation and outputs the selected information.

In step S40, the Byte to Pixel converter 125 performs the Byte to Pixel conversion on the payload data and outputs pixel data in eight-bit, 10-bit, 12-bit, 14-bit, or 16-bit units. The payload error correction unit 124 appropriately corrects an error in the payload data, on which the Byte to Pixel conversion is performed, by using the parity.

When the processing on the pixel data for one line is completed, the procedure returns to step S3 in FIG. 26, and the subsequent processing is executed.

Data is transmitted between the image sensor 11 and the DSP 12 by using a packet format in which one line in one frame corresponds to one packet as described above.

It can be said that the packet format used for data transmission between the image sensor 11 and the DSP 12 is a format that minimizes the transmission of the header information and the control codes indicating the packet boundaries such as Start Code, End Code, and the like, and it is possible to prevent a decrease in a transmission efficiency. If a packet format in which the pixel data stored in the payload of one packet is less than one line is adopted, it is necessary to transmit more packets in order to transmit the pixel data for an entire frame. As the numbers of pieces of header information and control codes to be transmitted are increased, the transmission efficiency decreases.

Furthermore, it is possible to suppress transmission latency by preventing the decrease in the transmission efficiency, an interface with a high pixel and a high frame rate that needs to transmit a large amount of image data at high speed can be realized.

By adopting the packet format on the premise of that reliability and redundancy of the transmission are enhanced and the reception unit 31 corrects an error, it is possible to secure countermeasures against a header information transmission error. Since synchronization information of Frame/Line (V/H) and the like is transmitted by using the header information, if the header information was lost due to a transmission error, there is a possibility that this causes a large defect in a system. However, such a problem can be prevented.

Furthermore, it is possible to suppress an increase in mounting cost and power consumption to secure the countermeasures against the header information transmission error. In other words, the CRC code is added to the packet format used for the data transmission between the image sensor 11 and the DSP 12 so that the DSP 12 can detect whether or not the header information includes a transmission error. Furthermore, by transmitting the three pairs of the header information and the CRC code, the DSP 12 can correct the header information to correct header information in a case where the header information includes a transmission error.

In a case where the error correction code is used as the countermeasure against the header information transmission error, it is necessary to prepare a circuit that calculates the error correction code in the transmission unit 22 and a circuit that performs the error correction calculation in the reception unit 31. Since the CRC code that is an error detection code is added to the header information, a circuit size and power consumption can be reduced than a case where the circuit that performs calculation regarding error correction is prepared. Furthermore, in a case where the error in the header information is detected, the reception unit 31 does not request the transmission unit 22 to retransmit the header information. Therefore, it is not necessary to prepare a reverse transmission path used to request retransmission.

By increasing the redundancy and configuring the control code by combining a plurality of K Characters of an 8B10B code, an error probability of the control code can be reduced. With this reduction, it is possible to secure countermeasures against the transmission error in the control code by a relatively simple circuit.

Specifically, four symbols including three kinds of K Characters are used in combination for Start Code. However, if at least symbols other than K28.5 can be detected, the reception unit 31 can specify Start Code, and it can be said that a transmission error resistance is high. The same applies to End Code.

Furthermore, four kinds of K Characters are used in combination for Pad Code. However, by allocating more kinds of K Characters than other control codes, the error resistance can be more increased than the other control codes. In other words, if one of the four kinds of symbols can be detected, the reception unit 31 can specify Pad Code. Since a transmission frequency of Pad Code is higher than Start Code, End Code, and the like, Pad Code has a structure that can more increase the error resistance.

Moreover, by transmitting the same control code at the same timing in each lane, even in a case where a transmission error is caused in one lane and the control code is lost, the control code with an error can be reproduced by using the control code in the other lane.

Furthermore, the number of K Characters is limited. Therefore, minimum K Characters are combined to form each control code. For example, Sync Code, Deskew Code, and Standby Code that can relatively allow transmission errors by repeatedly transmitting the codes have a data structure that does not need to additionally allocate K Character.

Since the control code necessary for resynchronization is allocated for each packet (each line), in a case where bit synchronization is lost due to disturbance such as static electricity, noise, or the like, resynchronization can be quickly made. Furthermore, an effect of the transmission error caused by the lost synchronization can be minimized.

Specifically, bit synchronization can be performed by detecting a transition/edge of 8B10B converted bit data by the CDR realized by the clock generation unit 112 and the synchronization unit 113. If the transmission unit 22 continuously transmitted data, bit synchronization can be performed within a period assumed as a CDR lock time.

Furthermore, even in a case where the symbol synchronization is lost, a specific K Character (K28.5) is detected by the symbol synchronization unit 114 so as to quickly perform resynchronization. Since K28.5 is used for each of Start Code, End Code, and Deskew Code, symbol synchronization can be performed at three positions during a transmission period of packet data for one packet.

Furthermore, Data Skew between the lanes can be corrected by using Deskew Code so that the lanes can be synchronized.

In the link layer, pieces of packet data in group unit, for example, 16 pieces (in case of example in FIG. 14, 16-bit unit) are processed in parallel. With this operation, it is possible to reduce the circuit size and a memory amount than a case where a single piece of packet data is processed in one clock period. In terms of mounting, the circuit size and the like can be reduced in a case where the pieces of the packet data in a predetermined unit is collectively processed than that in a case where the pieces of packet data are processed one by one. By reducing the circuit size, it is possible to reduce the power consumption.

Furthermore, at the time of lane allocation, the error resistance can be increased by allocating continuous pieces of packet data to different lanes. Even in a case where errors occur across continuous packet data in a certain lane and the number of pieces of the packet data exceeds an error correction capability of the parity, by combining the lanes by the reception unit 31, the positions of the packet data where the errors occur are dispersed, and there may be a case where the error can be corrected by using the parity. The error correction capability of the parity is determined by a length of the parity.

Moreover, when it is assumed that a lane closer to the physical layer is a lower level, ECC processing is executed in an upper level than lane distribution and lane integration so that it is possible to reduce the circuit sizes of the transmission unit 22 and the reception unit 31. For example, in the transmission unit 22, in a case where the parity of the ECC is inserted into the payload after the packet data is allocated to each lane, it is necessary to prepare the payload ECC insertion unit for each lane, and the circuit size is increased. However, such a problem can be prevented.

In the physical layer, the parallel processing on the packet data is executed by the plurality of circuits. However, by sharing the PHY-TX state control unit 81 and the clock generation unit 82, a circuit can be simplified than a case where these circuits are prepared for each lane. Furthermore, by using a protocol that does not transmit different control codes for respective lanes, a circuit that processes the packet data in each lane can be simplified.

[Switching the Number of Lanes]

The same control codes are transmitted at the same timing in the respective lanes not only when normal data is transmitted but also, for example, in a case where the number of lanes is switched. Even in a case where the number of lanes is switched, states of all active lanes (lanes used for data transmission) are the same.

Figure 29:
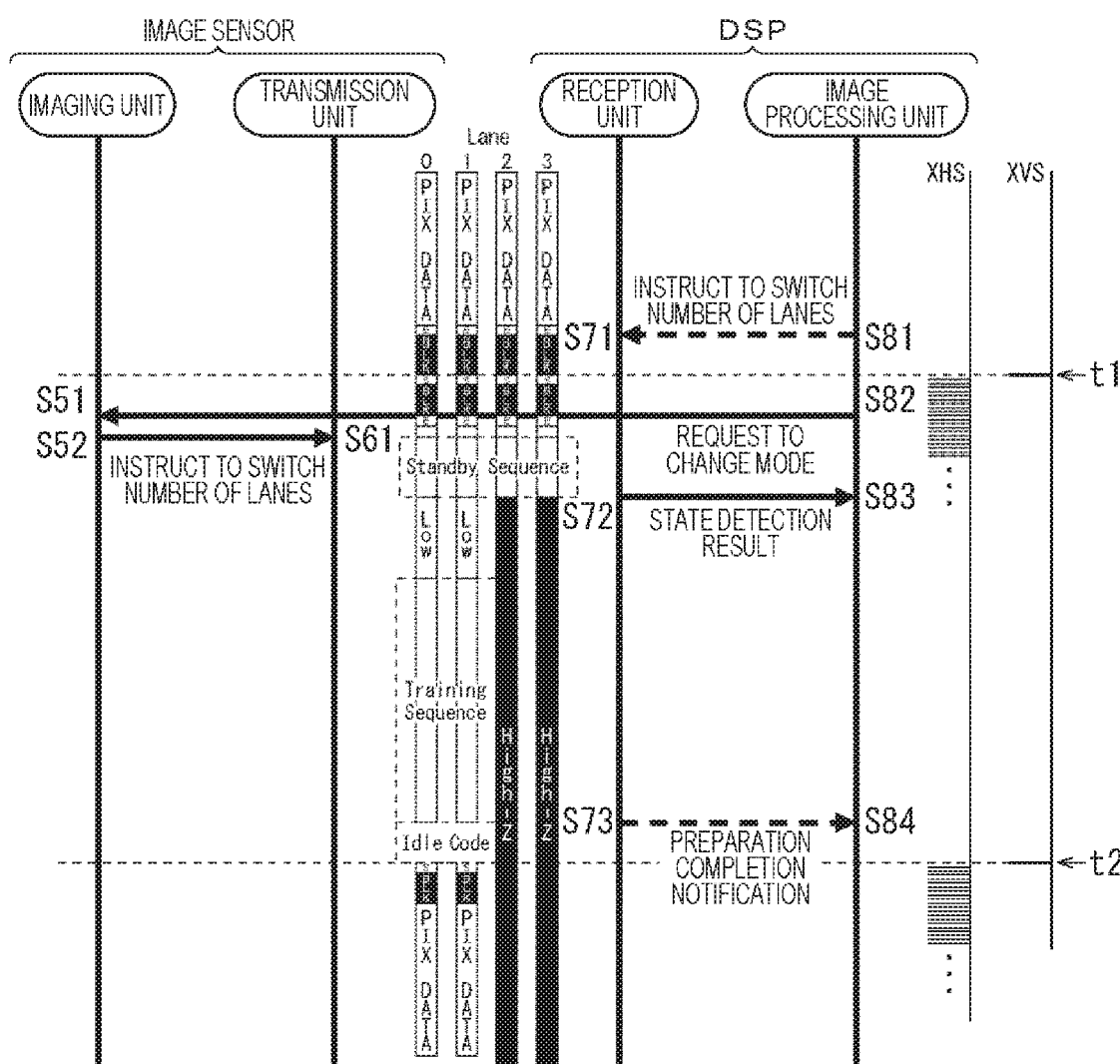
FIG. 29 is a diagram illustrating a control sequence in a case where the number of lanes is switched.

FIG. 29 is a diagram illustrating a control sequence in a case where the number of lanes is switched.

On the right side in FIG. 29, timings of a vertical synchronization signal (XVS) and a horizontal synchronization signal (XHS) are illustrated. A case will be described where the pixel data of each line forming a one-frame image is transmitted according to the horizontal synchronization signal before a time t1 when the vertical synchronization signal is detected and the number of active lanes is changed from four to two at the timing of the time t1. Before the time t1, data is transmitted by using four lanes.

Approximately at the center of FIG. 29, a state of each lane is vertically illustrated. "PIX DATA" represents that the pixel data is transmitted in a lane to which the characters of PIX DATA are added. "E", "BLK", and "S" subsequent to "PIX DATA" respectively represent Frame End, a blanking interval, and Frame Start.

In a case where the transmission of the pixel data of the frame to be transmitted is completed in one frame period before the time t1, the image processing unit 32 instructs the reception unit 31 to switch the number of lanes from four to two in step S81. The instruction from the image processing unit 32 is received by the reception unit 31 in step S71.

At the time t1, in step S82, the image processing unit 32 requests the imaging unit 21 of the image sensor 11 to change a mode. The mode change request to be transmitted to the imaging unit 21 includes information indicating switching the number of lanes from four to two. Although not illustrated in FIG. 1 and the like, between the imaging unit 21 and the image processing unit 32, a transmission path used to transmit information regarding a setting value with respect to imaging such as a shutter speed, a gain, and the like by the image processing unit 32 to the imaging unit 21 is provided. The mode change request is transmitted to the imaging unit 21 via this transmission path.

In step S51, the imaging unit 21 receives the mode change request from the image processing unit 32, and in step S52, the imaging unit 21 instructs the transmission unit 22 to switch the number of lanes from four to two. The instruction by the imaging unit 21 is received by the transmission unit 22 in step S61.

Standby Sequence is performed between the transmission unit 22 and the reception unit 31, and Standby Code is repeatedly transmitted from the transmission unit 22 to the reception unit 31 by using Lanes 0 to 3. When Standby Sequence ends, a detection result of a state is output from the reception unit 31 in step S72 and is received by the image processing unit 32 in step S83. Furthermore, states of Lanes 0 and 1 that maintain an active state become Low, and states of Lanes 2 and 3 in which data transmission is terminated become High-Z.

Training Sequence is performed between the transmission unit 22 and the reception unit 31, and Sync Code is repeatedly transmitted from the transmission unit 22 to the reception unit 31 by using Lanes 0 and 1. In the reception unit 31, the bit synchronization is secured, and the symbol synchronization is secured by detecting Sync Code.

When Training Sequence ends, the reception unit 31 notifies the image processing unit 32 that preparation is completed in step S73. The notification made by the reception unit 31 is received by the image processing unit 32 in step S84, and the series of control sequence in a case where the number of lanes is switched is terminated.

In this way, in the control sequence for switching the number of lanes, Standby Code is transmitted in Lanes 2 and 3, in which the data transmission is terminated, at the time of Standby Sequence so as to be in the state same as those of Lanes 0 and 1 that are continuously used for data transmission. For example, it is considered that the states of Lanes 2 and 3 are maintained to be High-Z without transmitting Standby Code. However, the states of Lanes 2 and 3 are different from the state of lane that is continuously used for data transmission, and complicated control is needed.

[Modification of Frame Format]

Figure 30:
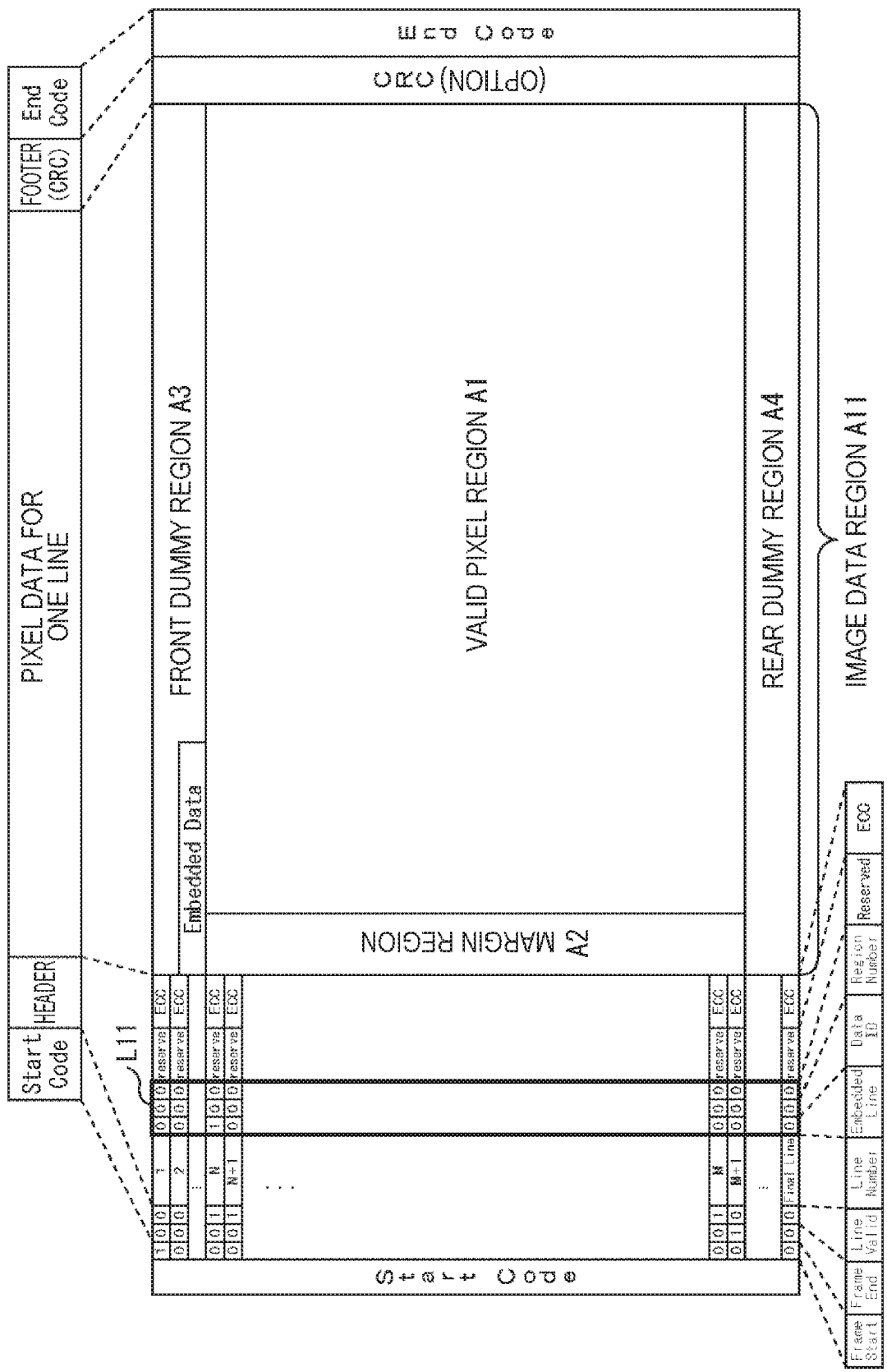
FIG. 30 is a diagram illustrating another example of the frame format.

FIG. 30 is a diagram illustrating another example of a frame format used to transmit data between the image sensor 11 and the DSP 12. The description overlapping with the above description will be omitted as appropriate.

The frame format illustrated in FIG. 30 is different from the format in FIG. 4 in that three pieces of data including Embedded Line, Data ID, and Region Number surrounded by a thick line L11 are added to the header which is added to the image data of each line. These pieces of information are generated by the header generation unit 72 in FIG. 5 and are added to the header.

Figure 31:
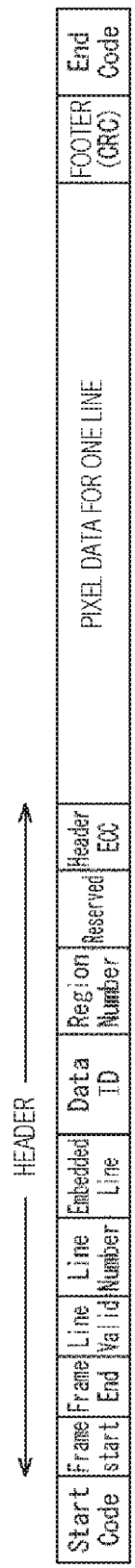
FIG. 31 is an enlarged view illustrating one packet in the frame format in FIG. 30.

FIG. 31 is an enlarged view illustrating one packet in the frame format in FIG. 30. The one packet includes a header and payload data that is pixel data for one line. A footer may be added to the packet. Start Code is added to the head of each packet, and End Code is added after the packet.

Header information includes Embedded Line as line information, Data ID as data identification, and Region Number as region information in addition to Frame Start, Frame End, Line Valid, and Line Number described above. Content of each piece of information is illustrated in FIG. 32.

Embedded Line is one-bit information indicating whether or not the packet is a packet used for transmission of a line into which Embedded Data is inserted. For example, a value of one is set to Embedded Line of a header of a packet used for transmission of a line including Embedded Data, and a value of zero is set to Embedded Line of a header of a packet used for transmission of another line. As described above, the information regarding the setting value with respect to imaging is inserted into a predetermined line in the front dummy region A3 and the rear dummy region A4 as Embedded Data.

Data ID is P-bit information indicating a data ID and a data type in multi-stream transmission. The P bit represents a predetermined number of bits equal to or more than one bit. The multi-stream transmission is data transmission performed by using a plurality of pairs of one transmission unit and one reception unit.

Region Number is one-bit information indicating data in which region of the imaging unit 21 is the pixel data stored in the payload. Reserved becomes 30–P bits by adding three pieces of data.

2. Second Embodiment (Example in which Predetermined Data is Transmitted as Well as Pixel Data)

The data transmission between chips using the plurality of lanes described above can be used for transmission of various data in addition to the image data.

Hereinafter, as appropriate, an I/F used for transmission of the pixel data output from an image sensor such as a CMOS is referred to as a CMOS Image Sensor (CIS) I/F, and an IF used for transmission of various data is referred to as a general-purpose I/F. By using the general-purpose I/F, not only the image data but also various data such as audio data, text data, and the like are transmitted from a transmission-side chip to a reception-side chip.

[Exemplary Configuration of Transmission System]

FIG. 33 is a diagram illustrating a first exemplary configuration of a transmission system using the general-purpose I/F.

A transmission system 301 in FIG. 33 includes a transmission-side LSI 311 and a reception-side LSI 312. For example, the transmission-side LSI 311 and the reception-side LSI 312 are provided in the same device. The transmission-side LSI 311 includes an information processing unit 321 and a single transmission unit 322, and the reception-side LSI 312 includes a single reception unit 331 and an information processing unit 332.

The information processing unit 321 of the transmission-side LSI 311 executes various data processing and outputs data to be transmitted to the transmission unit 322. The information processing unit 321 outputs data having various bit widths such as eight, 10, 12, 14, 16, 20, 24, 28, 32, 40, 48, 56, 64, 80, 96, 112, 128, and 144 bits.

The transmission unit 322 allocates the data supplied from the information processing unit 321 to a plurality of lanes, for example, in order of the supply from the information processing unit 321 and transmits the data to the reception-side LSI 312 in parallel. In the example in FIG. 33, data is transmitted by using eight lanes. A transmission path between the transmission-side LSI 311 and the reception-side LSI 312 may be a wired or wireless transmission path.

The reception unit 331 of the reception-side LSI 312 receives the data transmitted from the transmission unit 322 via eight lanes and outputs the data to the information processing unit 332.

The information processing unit 332 generates data selected as a transmission target by the transmission-side LSI 311 on the basis of the data supplied from the reception unit 331 and executes various processing by using the generated data. In a case where the data to be transmitted is, for example, audio data, processing such as reproduction, compression, and the like on the audio data is executed.

Figure 34:
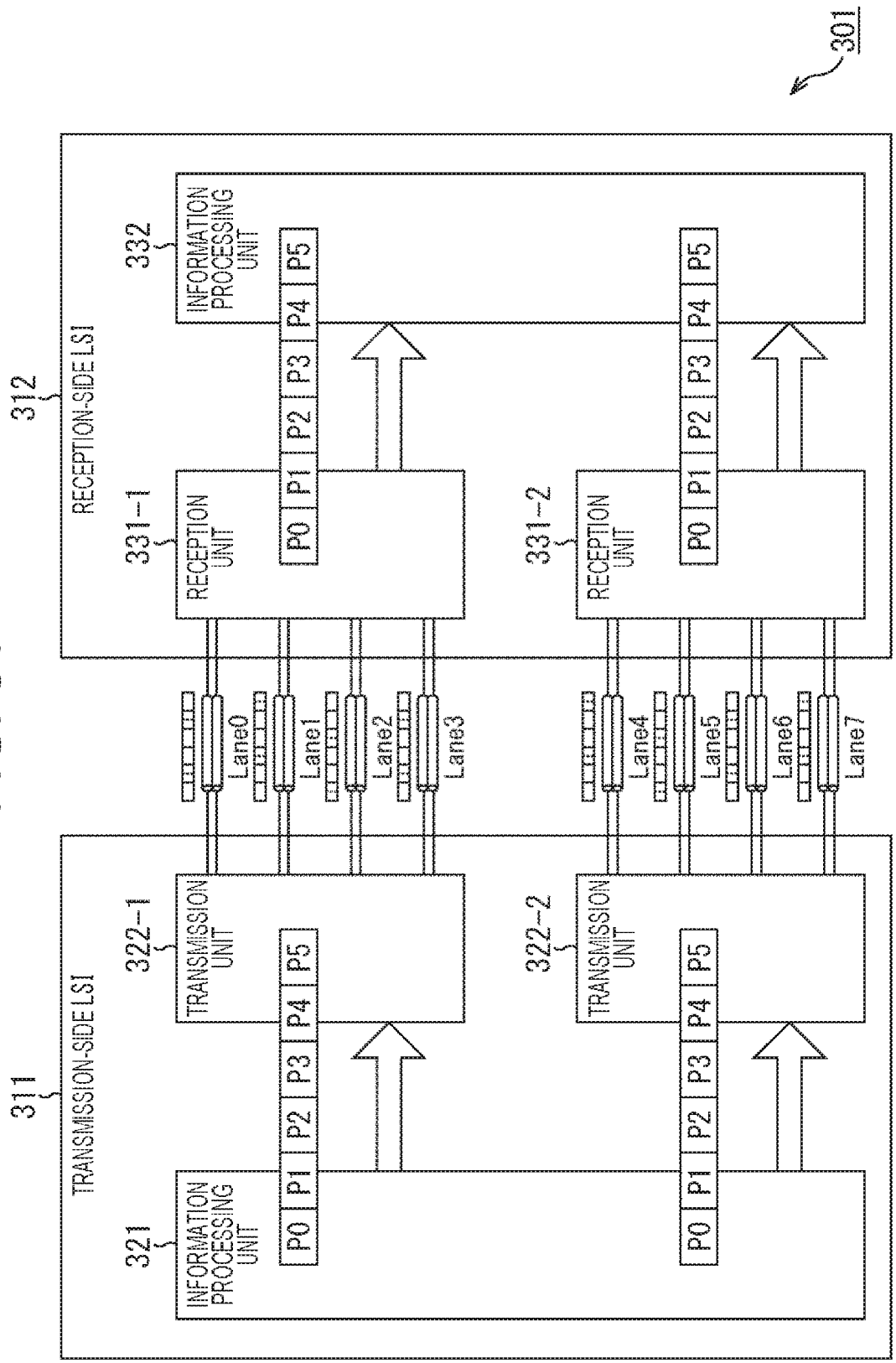
FIG. 34 is a diagram illustrating a second exemplary configuration of the transmission system using the general-purpose I/F.

FIG. 34 is a diagram illustrating a second exemplary configuration of the transmission system 301. Components illustrated in FIG. 34 same as the components illustrated in FIG. 33 are respectively denoted with the same reference numerals. The overlapped description will be appropriately omitted.

The transmission-side LSI 311 of the transmission system 301 in FIG. 34 includes the information processing unit 321 and transmission units 322-1 and 322-2 that are two transmission units, and the reception-side LSI 312 includes reception units 331-1 and 331-2 that are two reception units and the information processing unit 332.

The information processing unit 321 divides data to be transmitted and outputs the data to the transmission units 322-1 and 322-2.

The transmission unit 322-1 allocates the data supplied from the information processing unit 321 to a plurality of lanes, for example, in order of the supply from the information processing unit 321 and transmits the data to the reception-side LSI 312. Similarly, the transmission unit 322-2 allocates the data supplied from the information processing unit 321 to a plurality of lanes, for example, in order of the supply from the information processing unit 321 and transmits the data to the reception-side LSI 312.

In the example in FIG. 34, the transmission-side LSI 311 and the reception-side LSI 312 are connected to each other via eight lanes. Each of the transmission units 322-1 and 322-2 transmits data by using four lanes.

The reception unit 331-1 of the reception-side LSI 312 receives the data transmitted from the transmission unit 322-1 via the four lanes and outputs the data to the information processing unit 332. Similarly, the reception unit 331-2 receives the data transmitted from the transmission unit 322-2 via the four lanes and outputs the data to the information processing unit 332.

The information processing unit 332 generates data to be transmitted on the basis of the data supplied from the reception unit 331-1 and the data supplied from the reception unit 331-2 and executes various processing on the generated data.

As illustrated in FIG. 34, by providing the two transmission units in the transmission-side LSI 311 and the two reception units in the reception-side LSI 312 in correspondence with the transmission units, even in a case where a transmission rate of the data output from the information processing unit 321 is high, the data can be transmitted to the reception-side LSI 312.

Figure 35:
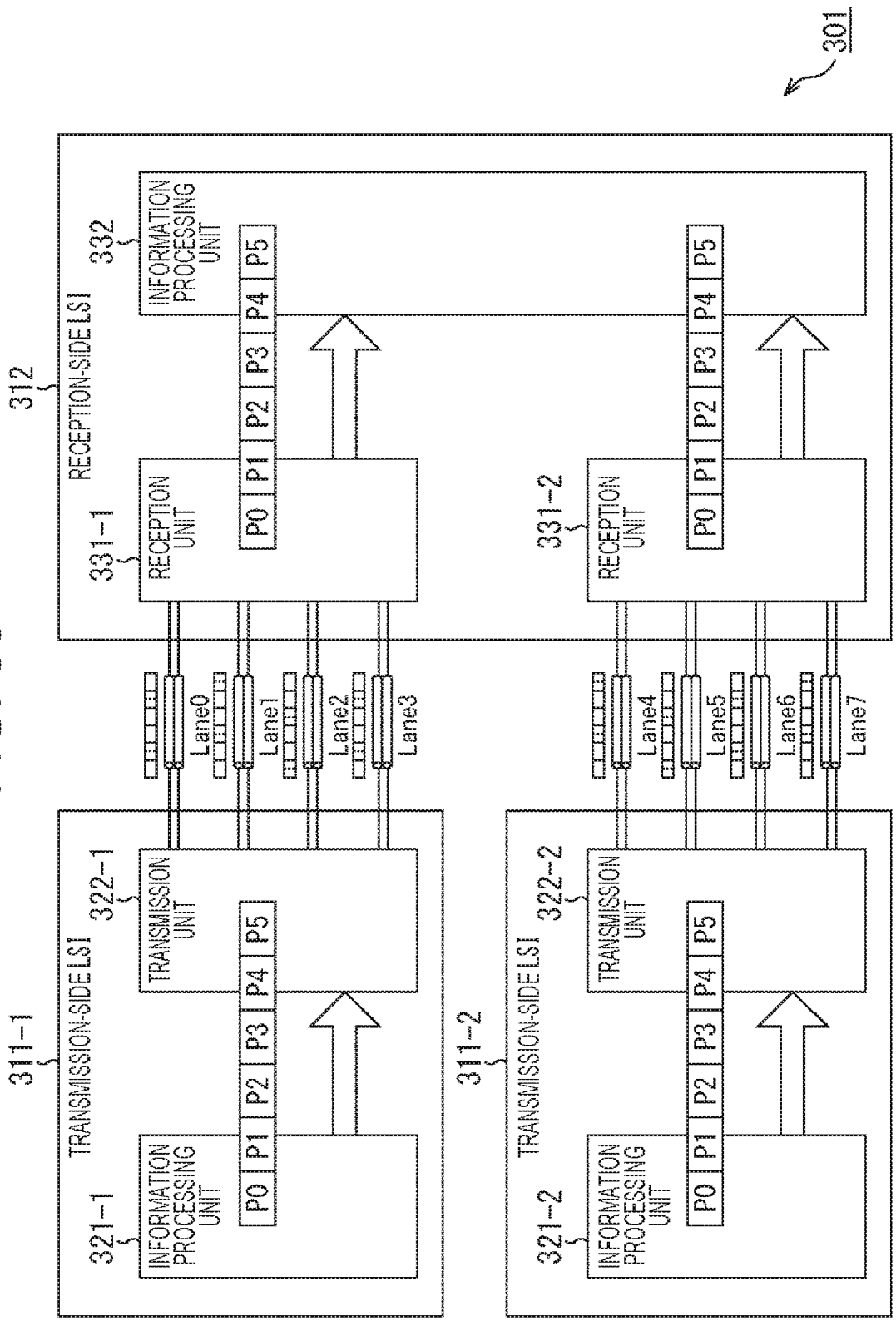
FIG. 35 is a diagram illustrating a third exemplary configuration of the transmission system using the general-purpose I/F.

FIG. 35 is a diagram illustrating a third exemplary configuration of the transmission system 301. Components illustrated in FIG. 35 same as the components illustrated in FIG. 33 are respectively denoted with the same reference numerals. The overlapped description will be appropriately omitted.

In the transmission system 301 in FIG. 35, two LSIs that are transmission-side LSIs 311-1 and 311-2 are provided as transmission-side LSIs. The transmission-side LSI 311-1 includes an information processing unit 321-1 and a transmission unit 322-1 that is a single transmission unit, and the transmission-side LSI 311-2 includes an information processing unit 321-2 and a transmission unit 322-2 that is a single transmission unit. As in a case of FIG. 34, the reception-side LSI 312 includes reception units 331-1 and 331-2 that are two reception units and the information processing unit 332.

The information processing unit 321-1 of the transmission-side LSI 311-1 outputs data to be transmitted to the transmission unit 322-1.

The transmission unit 322-1 allocates the data supplied from the information processing unit 321-1 to a plurality of lanes and transmits the data to the reception-side LSI 312.

The information processing unit 321-2 of the transmission-side LSI 311-2 outputs the data to be transmitted to the transmission unit 322-2.

The transmission unit 322-2 allocates the data supplied from the information processing unit 321-2 to a plurality of lanes and transmits the data to the reception-side LSI 312.

In the example in FIG. 35, the transmission-side LSI 311 that is a LSI on the transmission side is connected to the reception-side LSI 312 that is a LSI on the reception side via eight lanes. Four lanes are allocated to each of the transmission-side LSIs 311-1 and 311-2, and each of the transmission units 322-1 and 322-2 transmits data by using the four lanes.

The reception unit 331-1 of the reception-side LSI 312 receives the data transmitted from the transmission unit 322-1 of the transmission-side LSI 311-1 via the four lanes and outputs the received data to the information processing unit 332. Similarly, the reception unit 331-2 receives the data transmitted from the transmission unit 322-2 of the transmission-side LSI 311-2 via the four lanes and outputs the received data to the information processing unit 332.

The information processing unit 332 generates data selected as a transmission target by the transmission-side LSI 311-1 on the basis of the data supplied from the reception unit 331-1. Furthermore, the transmission unit 322 generates data selected as a transmission target by the transmission-side LSI 311-2 on the basis of the data supplied from the reception unit 331-2. The image processing unit 332 executes various processing by using the generated data.

As described above, in the LSI on the transmission side of the transmission system 301, one or the plurality of transmission units that transmits data is provided. On the other hand, in the LSI on the reception side, one or the plurality of reception units that receives data is provided corresponding to the transmission units in the LSI on the transmission side.

Hereinafter, data transmission in the transmission system 301 in FIG. 33 in which the transmission-side LSI 311 includes a single transmission unit and the reception-side LSI 312 includes a single reception unit will be described. Data is similarly transmitted between the transmission unit 322-1 and the reception unit 331-1 and between the transmission unit 322-2 and the reception unit 331-2 in FIGS. 34 and 35.

[Example of Data Structure of Packet]

Figure 36:
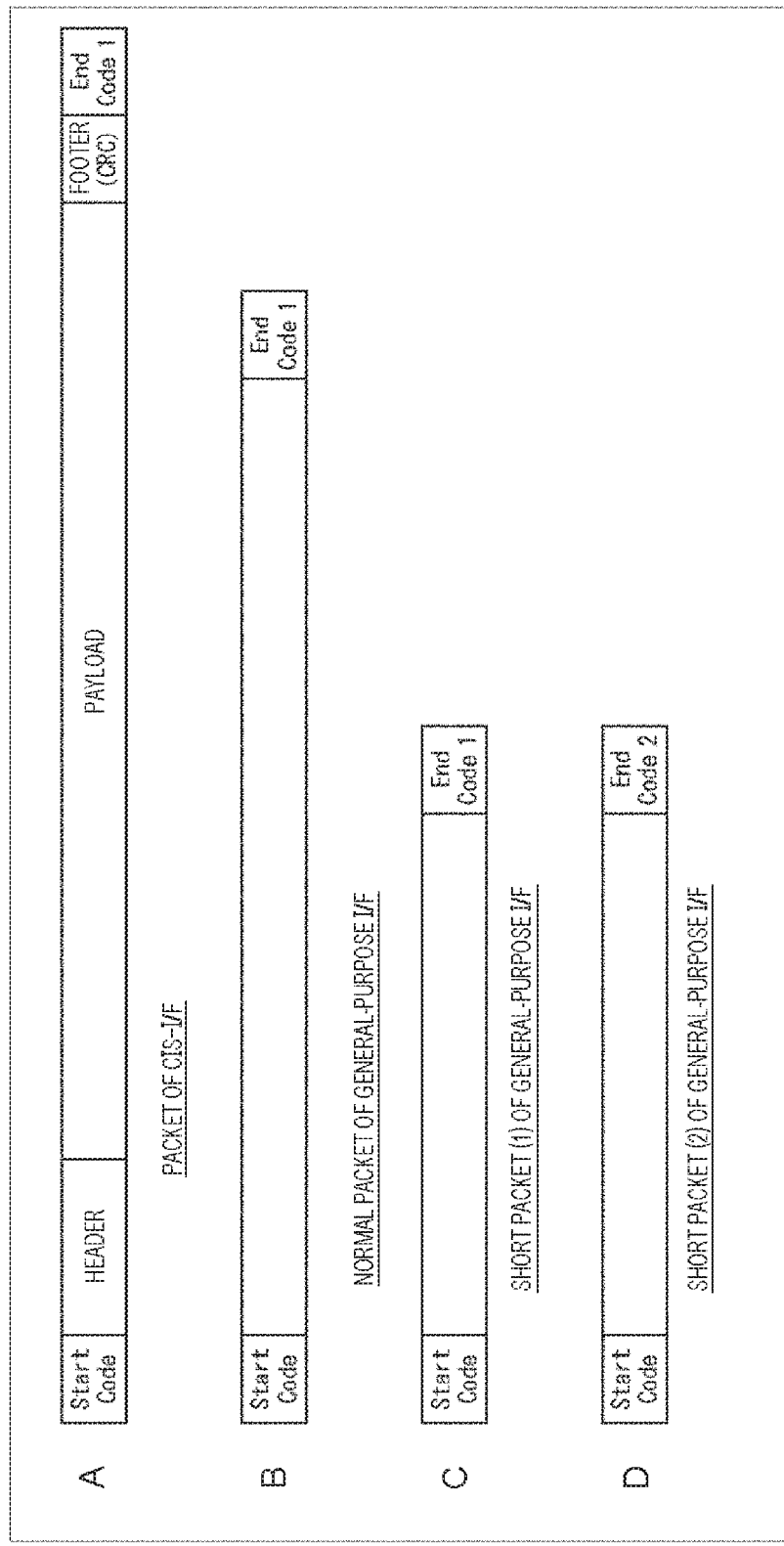
FIG. 36 is a diagram illustrating an example of a data structure of a packet.

A to D of FIG. 36 are diagrams illustrating examples of a data structure of a packet used for data transmission.

A of FIG. 36 is a diagram illustrating an example of a packet used to transmit pixel data by the CIS IF. One packet of the CIS IF includes a header, a payload including pixel data for one line, and a footer which is appropriately added. Start Code is added to the head of the one packet of the CIS IF, and End Code is added after the footer.

B to D of FIG. 36 are diagrams illustrating examples of the packet used for transmission of various data in the general-purpose I/F. One packet of the general-purpose I/F includes only the payload. As described later, the transmission unit 322 generates payload data by dividing data to be transmitted in eight-bit to 144-bit unit supplied from the information processing unit 321 into pieces of the data having a predetermined size. The packet size is a bit length that is a common multiple of eight to 144 bits that is the bit width of the input data and 128 bits and is specified by a value set to Configuration Register.

In a case where a packet having a size same as the packet size specified by the value set to Configuration Register is generated and data is transmitted, a normal packet illustrated in B of FIG. 36 is used.

Furthermore, in a case where a packet having a size shorter than the packet size specified by the value set to Configuration Register is generated and data is transmitted, a short packet illustrated in C or D of FIG. 36 is used. For example, in a case where the payload length is a multiple of 128 bits, a short packet (1) in C of FIG. 36 is used, and in a case where the payload length is not the multiple of 128 bits, a short packet (2) in D of FIG. 36 is used. The short packet in C of FIG. 36 and the short packet in D of FIG. 36 are identified by End Code to be added at the end.

[Configuration of Transmission-Side LSI 311 and Reception-Side LSI 312]

Figure 37:
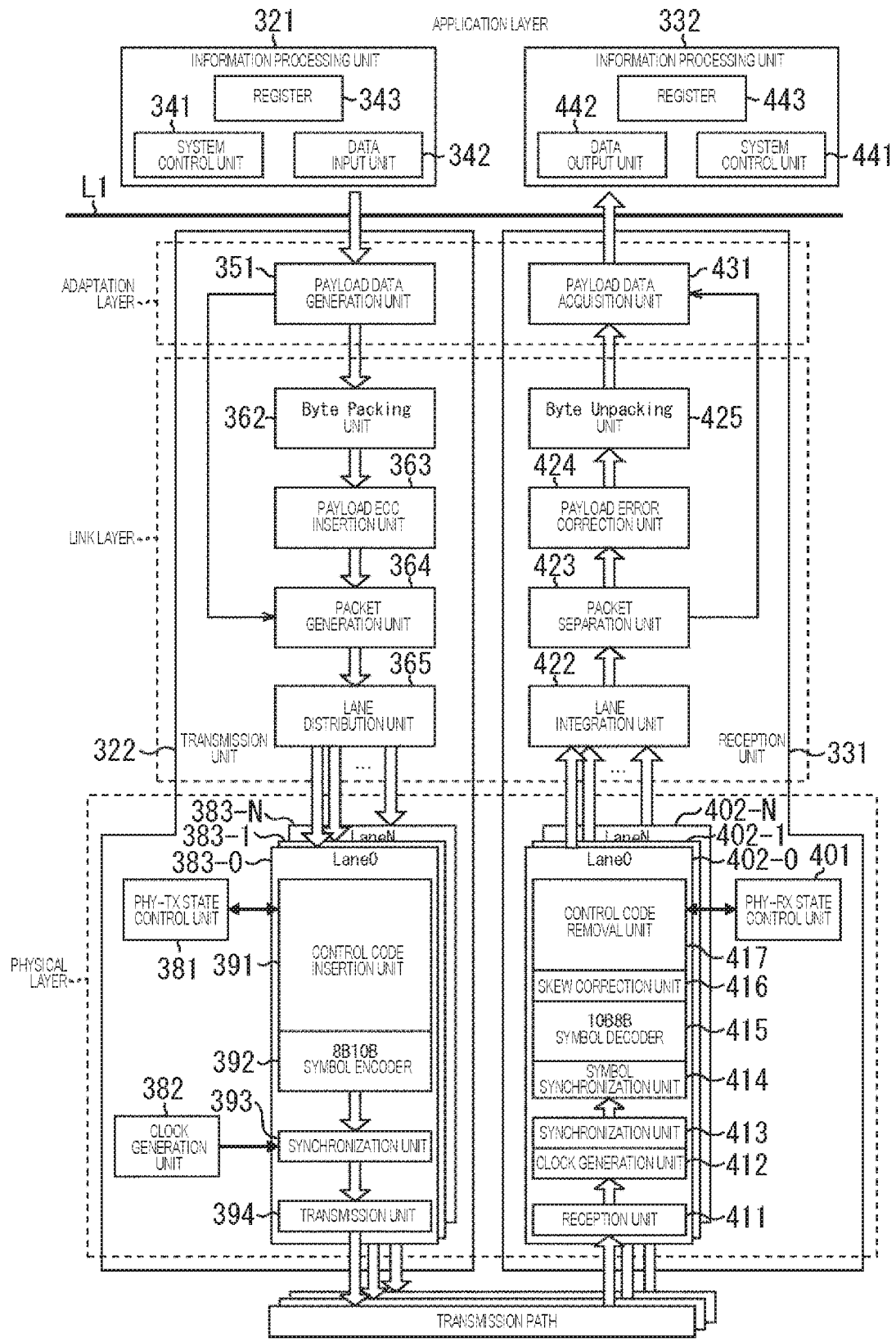
FIG. 37 is a diagram illustrating an exemplary configuration of a transmission-side LSI and a reception-side LSI.

FIG. 37 is a diagram illustrating an exemplary configuration of the transmission-side LSI 311 and the reception-side LSI 312.

The configuration illustrated on the left side of FIG. 37 is a configuration of the transmission-side LSI 311, and the configuration illustrated on the right side of FIG. 37 is a configuration of the reception-side LSI 312. Data transmission of the general-purpose I/F is realized by a configuration of each of an application layer, an adaptation layer, a link layer, and a physical layer.

A configuration illustrated above a solid line L1 is the configuration of the application layer. A system control unit 341, a data input unit 342, and a register 343 are realized in the information processing unit 321.

The system control unit 341 controls data transmission by the general-purpose I/F. For example, while the data input unit 342 outputs data to be transmitted, the system control unit 341 outputs a control signal indicating that the input data is valid to a payload data generation unit 351 of the transmission unit 322. The data input unit 342 outputs the data to be transmitted to the payload data generation unit 351 in a predetermined bit unit of eight to 144 bits. The register 343 is Configuration Register described above and stores various information such as a packet size, the number of Lanes, and the like.

On the other hand, a system control unit 441, a data output unit 442, and a register 443 are realized in the information processing unit 332.

The system control unit 441 controls data reception by the general-purpose I/F. For example, the system control unit 441 outputs information regarding a packet size specified by a value set to the register 443 to a payload data acquisition unit 431. The data output unit 442 acquires the data supplied from the payload data acquisition unit 431 and outputs the data to a data processing unit which is not illustrated. The register 443 stores various information such as a packet size, the number of Lanes, and the like.

[Configuration of Adaptation Layer of Transmission Unit 322]

The configuration of the adaptation layer of the transmission-side LSI 311 will be described. The transmission unit 322 includes the payload data generation unit 351 as the configuration of the adaptation layer.

The payload data generation unit 351 divides the data to be transmitted supplied from the data input unit 342 in a predetermined bit unit into pieces of data having a size same as the packet size and outputs the divided data to a Byte Packing unit 362. The payload data generation unit 351 outputs the data in the predetermined bit unit included in the data to be transmitted divided in the size same as the packet size to the Byte Packing unit 362. The payload data generation unit 351 outputs, for example, a final piece of the data to be transmitted of which the size is smaller than the packet size to the Byte Packing unit 362 as it is.

Furthermore, in a case where the payload data generation unit 351 detects that the control signal is turned off and the data is not input for equal to or longer than a predetermined period of time, the payload data generation unit 351 outputs a Packet End signal that is a timing signal indicating an input timing of the final piece of data included in the packet to the Byte Packing unit 362. Note that, in a case of transmitting the header information described with reference to FIGS. 7, 32, and the like to the reception-side LSI 312, the payload data generation unit 351 outputs the header information to a packet generation unit 364. The general-purpose I/F transmits the header information as payload data.

[Configuration of Link Layer of Transmission Unit 322]

The transmission unit 322 includes the Byte Packing unit 362, a payload ECC insertion unit 363, the packet generation unit 364, and a lane distribution unit 365 as the configuration of the link layer.

The Byte Packing unit 362 converts the data supplied from the payload data generation unit 351 into packing data in a predetermined unit such as 16 bytes that is a processing unit of each processor after the Byte Packing unit 362. The Byte Packing unit 362 outputs the packing data acquired by the conversion to the payload ECC insertion unit 363.

Figure 38:
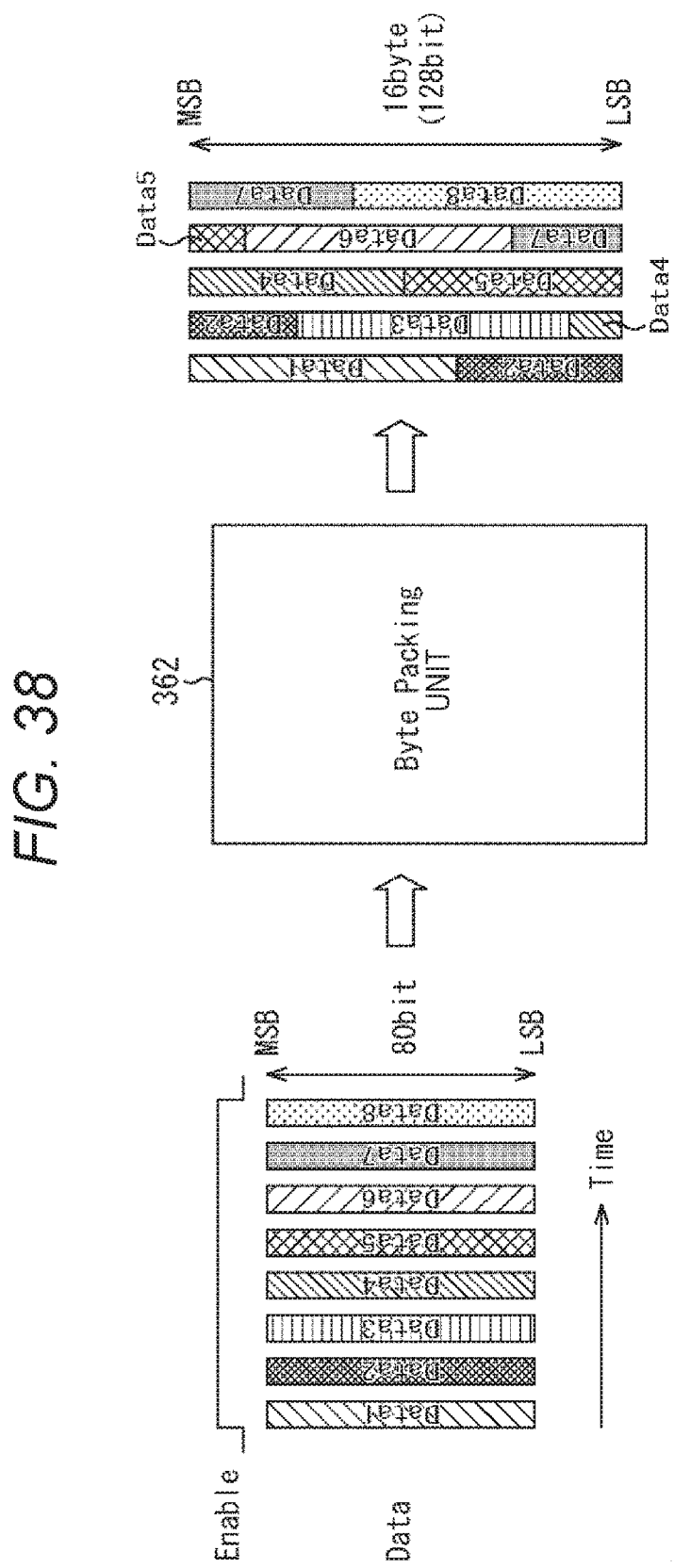
FIG. 38 is a diagram illustrating an example of Byte Packing.

FIG. 38 is a diagram illustrating an example of Byte Packing that is data conversion by the Byte Packing unit 362.

In the example in FIG. 38, Data1 to Data8 that are divided by the payload data generation unit 351 according to the control signal as the data forming one packet are input to the Byte Packing unit 362. It is assumed that the data input unit 342 input data in 80-bit unit to the payload data generation unit 351.

In this case, the Byte Packing unit 362 generates five pieces of packing data by allocating each bit of Data1 to Data8 to each bit of the packing data in 16-byte unit (128 bit) in input order. For example, a first piece of the packing data is data including one to 80 bits of Data1 and one to 48 bits of Data2.

Figure 39:
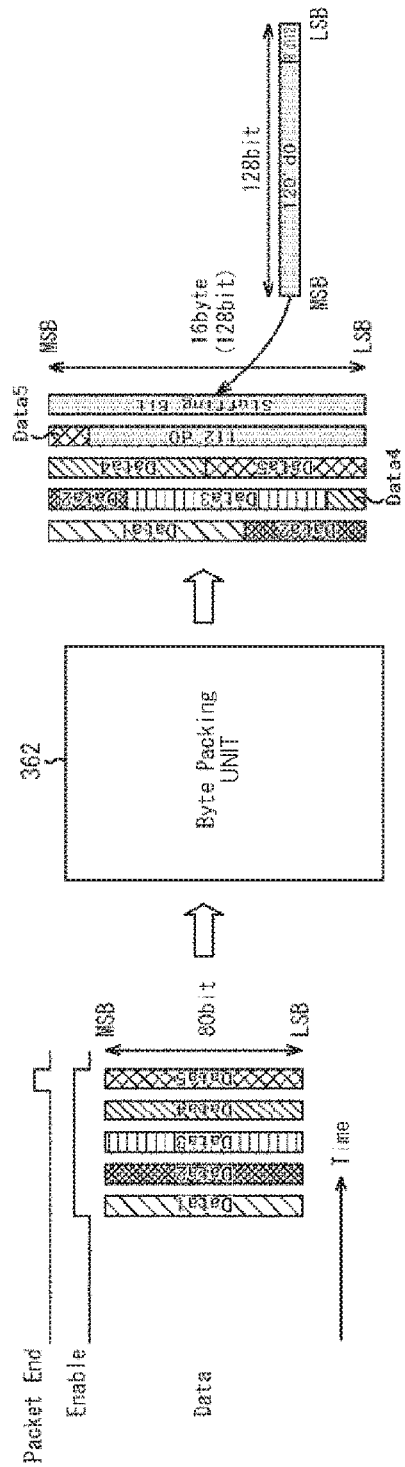
FIG. 39 is a diagram illustrating another example of Byte Packing.

FIG. 39 is a diagram illustrating another example of the Byte Packing by the Byte Packing unit 362.

In the example in FIG. 39, Data1 to Data5 that are divided by the payload data generation unit 351 according to the control signal as the data forming one packet are input to the Byte Packing unit 362. The payload data generation unit 351 inputs a Packet End signal to the Byte Packing unit 362 in accordance with an input timing of Data5. In response to the supply of the Packet End signal, the Byte Packing unit 362 can recognize that Data5 is the final piece of the data forming one packet.

In this case, the Byte Packing unit 362 generates a first piece of the packing data including data of the entire Data1 and Data2 from the head to the middle by allocating each bit of Data1 to Data5 to each bit of the packing data in input order. Furthermore, the Byte Packing unit 362 generates a second piece of the packing data including data of Data2 from the middle to the end, the entire Data3, and data of Data4 from the head to the middle. The Byte Packing unit 362 generates a third piece of the packing data including data of Data4 from the middle to the end and data of Data5 from the head to the middle.

When allocating 80th bit that is the final bit of Data5 to a fourth piece of the packing data, after that, the Byte Packing unit 362 generates the fourth piece of the packing data of 16 bytes by inserting dummy data. In other words, for a portion of the packing data less than 16 bytes, the dummy data (dummy bit) is added so as to generate the packing data. The dummy data is, for example, a bit of which all the values are zero.

Furthermore, the Byte Packing unit 362 generates packing data including eight bits indicating a bit length of the dummy data included in the fourth piece of the packing data on the side of the LSB as a fifth piece of the packing data subsequent to the fourth piece of the packing data to which the dummy data is added. The dummy data is included in a first bit to a 120th bit of the fifth piece of the packing data.

On the basis of that the fifth piece of the packing data includes 120-bit dummy data, the reception unit 331 that receives such data can specify that the dummy data is added to the fourth piece of the packing data that is the previous packing data. Furthermore, on the basis of the bit length indicated by eight bits subsequent to the 120-bit dummy data, the reception unit 331 can specify the bit length of the dummy data added to the fourth piece of the packing data and extract only valid data.

Figure 40:
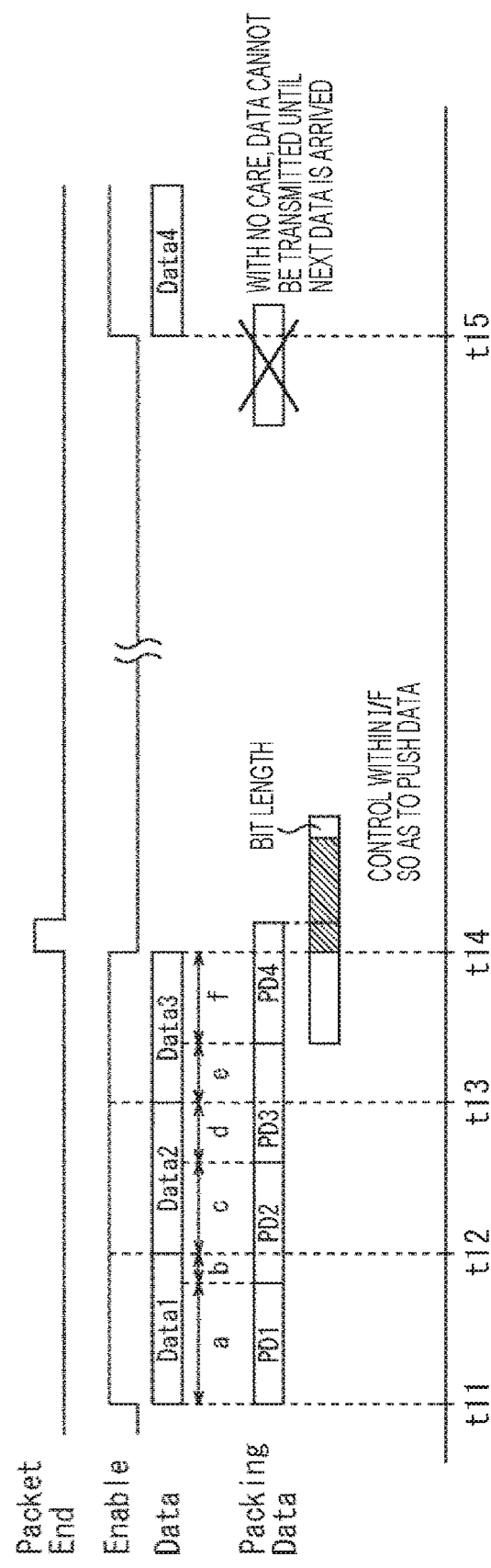
FIG. 40 is a diagram illustrating a sequence of Byte Packing processing.

FIG. 40 is a diagram illustrating a sequence of Byte Packing processing.

In the example in FIG. 40, in a period from a time t11 to t14 and after a time t15, the control signal supplied from the system control unit 341 of the information processing unit 321 is turned on. Furthermore, in response to that the control signal is turned on, the data input unit 342 supplies Data1 to Data4 that are the data to be transmitted in a predetermined bit unit. Focusing on Data1 to Data3, Data1 is supplied in a period from the time t11 to t12, Data2 is supplied in a period from the time t12 to t13, and Data3 is supplied in a period from the time t13 to t14. The Packet End signal indicating the final piece of data forming the packet is input at a timing when the input of Data3 is completed. Each piece of Data1 to Data4 is data having a size equal to or more than 16 bytes.

In this case, the Byte Packing unit 362 generates packing data PD1 including data in a range a from the head to the middle of Data1. Furthermore, the Byte Packing unit 362 generates packing data PD2 including data in a range b from the middle of Data1 to the end of Data1 and data in a range c from the head to the middle of Data2.

The Byte Packing unit 362 generates packing data PD3 including data in a range d from the middle of Data2 to the end of Data2 and data in a range e from the head to the middle of Data3. The byte Packing unit 362 adds dummy data to data in a range f from the middle of Data3 to the end of Data3 and generates 16-byte packing data PD4. Data in a range indicated by hatching in FIG. 40 is the dummy data.

Furthermore, the Byte Packing unit 362 generates 16-byte packing data including a bit representing the bit length of the dummy data added to the packing data PD4 at the end, subsequent to the packing data PD4.

For example, a packet including the packing data PD1 to PD4 including the packing data PD4 into which the dummy data is added is transmitted as the short packet in C or D of FIG. 36. The short packet includes the packing data to which the bit representing the bit length of the dummy data is added at the end.

A case is considered in which only valid data input in the period when the control signal is turned on is included in the packing data without including the dummy data and the packing data is transmitted as a normal packet. In this case, when it is not possible to fill the packing data with valid data at the timing when the Packet End signal is supplied, it is not possible to output the data in the range f of Data3 that is not included in the packing data until Data4 is input. In a case where it is not possible to fill the packing data with the valid data at the timing when the Packet End signal is supplied, it is possible to prevent a delay in the output of the data by adding the dummy data and outputting the data.

The data including the packing data generated in this way is supplied from the Byte Packing unit 362 to the payload ECC insertion unit 363 in FIG. 37 as the payload data.

The payload ECC insertion unit 363 calculates an error correction code used to correct an error in the payload data on the basis of the payload data supplied from the Byte Packing unit 362 and inserts a parity obtained by the calculation into the payload data. For example, a Reed-Solomon code is used as the error correction code. Note that the insertion of the error correction code is optional.

Figure 41:
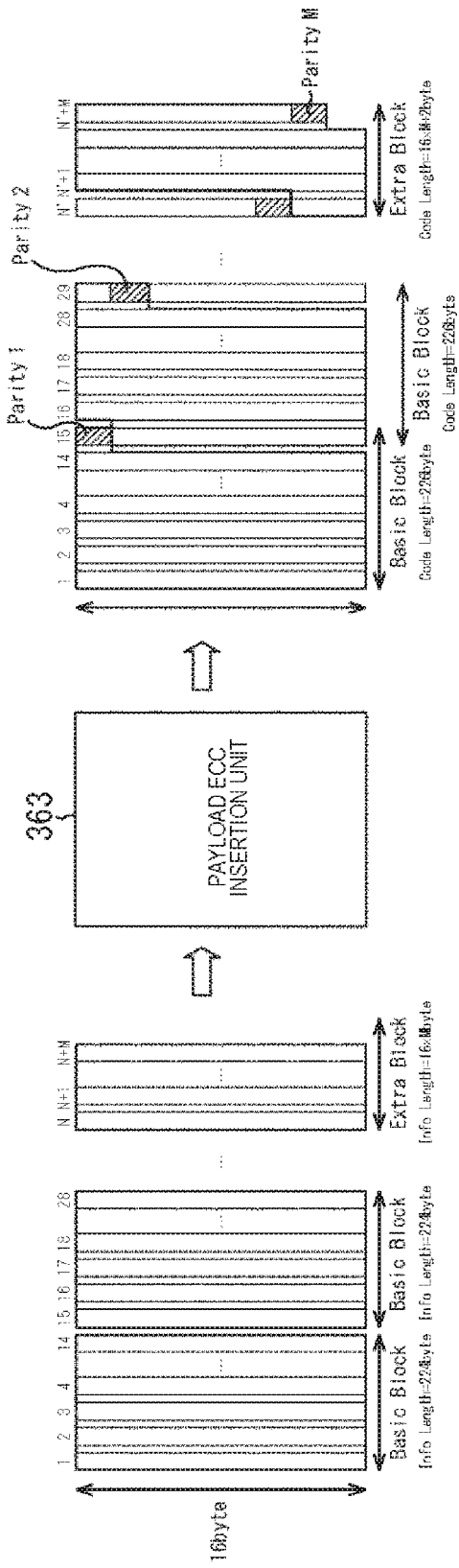
FIG. 41 is a diagram illustrating an example of the insertion of the parity.

FIG. 41 is a diagram illustrating an example of the insertion of the parity into the payload data.

The payload ECC insertion unit 363 collects 14 pieces of packing data in order of the supply from the Byte Packing unit 362 so as to generate 224-byte Basic Block. Furthermore, the payload ECC insertion unit 363 generates a parity of two to four bytes on the basis of the 224-byte payload data and inserts the parity into the payload data so as to generate 226-byte to 228-byte Basic Block to which the parity is inserted.

In the example in FIG. 41, Parity 1 is generated and added to payload data including a first to 14th pieces of packing data. In FIG. 41, data indicated by hatching is the parity.

In a case where a size of payload data subsequent to a certain Basic Block is less than 224 bytes, the payload ECC insertion unit 363 generates Extra Block on the basis of the remaining payload data. By inserting the dummy data as described above, an information length of Extra Block is constantly a multiple of 16 bytes. Furthermore, the payload ECC insertion unit 363 generates a parity of two to four bytes on the basis of the payload data included in Extra Block and inserts the parity into the payload data so as to generate Extra Block to which the parity is inserted.

In the example in FIG. 41, Parity M is generated and added to a Nth to N+Mth pieces of payload data.

The payload ECC insertion unit 363 outputs the payload data to which the parity is inserted to the packet generation unit 364. In a case where the parity is not inserted, the payload data supplied from the Byte Packing unit 362 to the payload ECC insertion unit 363 is output to the packet generation unit 364 as it is.

The packet generation unit 364 generates a packet using the data supplied from the payload ECC insertion unit 363 as payload data. The packet generation unit 364 outputs the data of the generated packet to the lane distribution unit 365.

The lane distribution unit 365 subsequently allocates the packet data supplied from the packet generation unit 364 to each lane used for data transmission such as Lane 0, Lane 1, ..., Lane (Lane Num−1), Lane 1, ... from the first byte in byte unit. There is a case where the data cannot be evenly distributed to each lane depending on the packet length and the number of Lanes. In this case, the lane distribution unit 365 inserts 00h as Lane Stuffing so that the data is evenly distributed to each lane.

The lane distribution unit 365 outputs the packet data allocated to each lane in this way to the physical layer. Hereinafter, a case where data is transmitted by using eight lanes including Lanes 0 to 7 will be mainly described. However, even in a case where the number of lanes used for data transmission is different, similar processing is executed.

[Configuration of Physical Layer of Transmission Unit 322]

The transmission unit 322 includes a PHY-TX state control unit 381, a clock generation unit 382, and signal processing units 383-0 to 383-N as the configuration of the physical layer. The configuration of the physical layer of the transmission unit 322 is the same as the configuration of the physical layer of the transmission unit 22 in the CIS-IF described with reference to FIG. 5. The overlapped description will be appropriately omitted.

The signal processing unit 383-0 includes a control code insertion unit 391, an 8B10B symbol encoder 392, a synchronization unit 393, and a transmission unit 394. Packet data that is output from the lane distribution unit 365 and allocated to Lane 0 is input to the signal processing unit 383-0, and packet data allocated to Lane 1 is input to the signal processing unit 383-1. Furthermore, packet data allocated to Lane N is input to the signal processing unit 383-N.

The PHY-TX state control unit 381 controls each of the signal processing units 383-0 to 383-N.

The clock generation unit 382 generates a clock signal and outputs the generated clock signal to the synchronization unit 393 of each of the signal processing units 383-0 to 383-N.

The control code insertion unit 391 of the signal processing unit 383-0 adds a control code such as Start Code, End Code, and the like to the packet data supplied from the lane distribution unit 365. The control code insertion unit 391 outputs the packet data to which the control code is added to the 8B10B symbol encoder 392.

The 8B10B symbol encoder 392 performs the 8B10B conversion on the packet data supplied from the control code insertion unit 391 (packet data to which control code is added) and outputs the packet data that is converted into data in 10-bit unit to the synchronization unit 393.

The synchronization unit 393 outputs each bit of the packet data supplied from the 8B10B symbol encoder 392 to the transmission unit 394 according to the clock signal generated by the clock generation unit 382. Note that it is not necessary to provide the synchronization unit 393 in the transmission unit 322. In this case, the packet data output from the 8B10B symbol encoder 392 is supplied to the transmission unit 394 as it is.

The transmission unit 394 transmits the packet data supplied from the synchronization unit 393 to the reception unit 331 via a transmission path forming Lane 0. In a case where data is transmitted by using eight lanes, the packet data is transmitted to the reception unit 331 by using transmission paths respectively forming Lanes 1 to 7.

[Configuration of Physical Layer of Reception Unit 331]

Next, a configuration of the physical layer of the reception unit 331 of the reception-side LSI 312 will be described. The reception unit 331 includes a PHY-RX state control unit 401 and signal processing units 402-0 to 402-N as the configuration of the physical layer. The configuration of the physical layer of the reception unit 331 is the same as the configuration of the physical layer of the reception unit 31 in the CIS-IF described with reference to FIG. 5. The overlapped description will be appropriately omitted.

The signal processing unit 402-0 includes a reception unit 411, a clock generation unit 412, a synchronization unit 413, a symbol synchronization unit 414, a 10B8B symbol decoder 415, a skew correction unit 416, and a control code removal unit 417. Packet data transmitted via the transmission path forming Lane 0 is input to the signal processing unit 402-0, and packet data transmitted via the transmission path forming Lane 1 is input to the signal processing unit 402-1. Furthermore, packet data transmitted via the transmission path forming Lane N is input to the signal processing unit 402-N.

The reception unit 411 receives a signal indicating the packet data transmitted from the transmission unit 322 via the transmission path forming Lane 0 and outputs the received signal to the clock generation unit 412.

The clock generation unit 412 performs bit synchronization by detecting an edge of the signal supplied from the reception unit 411 and generates a clock signal on the basis of an edge detection period. The clock generation unit 412 outputs the signal supplied from the reception unit 411 and the clock signal to the synchronization unit 413.

The synchronization unit 413 samples the signal received by the reception unit 411 according to the clock signal generated by the clock generation unit 412 and outputs packet data acquired by sampling to the symbol synchronization unit 414.

For example, the symbol synchronization unit 414 detects the symbol K28.5 included in each of Start Code, End Code, and Deskew Code and performs the symbol synchronization. The symbol synchronization unit 414 outputs packet data in 10-bit unit representing each symbol to the 10B8B symbol decoder 415.

The 10B8B symbol decoder 415 performs the 10B8B conversion on the packet data in 10-bit unit supplied from the symbol synchronization unit 414 and outputs the packet data converted into data in eight-bit unit to the skew correction unit 416.

The skew correction unit 416 detects Deskew Code from the packet data supplied from the 10B8B symbol decoder 415. Information regarding a detection timing of Deskew Code by the skew correction unit 416 is supplied to the PHY-RX state control unit 401. Furthermore, the skew correction unit 416 corrects Data Skew between the lanes so as to adjust the timing of Deskew Code to a timing indicated by the information supplied from the PHY-RX state control unit 401.

By executing similar processing by the signal processing units 402-1 to 402-N, Data Skew between the lanes is corrected as described with reference to FIG. 25.

The skew correction unit 416 outputs the packet data of which Data Skew is corrected to the control code removal unit 417.

The control code removal unit 417 removes the control code added to the packet data and outputs data between Start Code to End Code to the link layer as packet data.

The PHY-RX state control unit 401 controls each of the signal processing units 402-0 to 402-N and causes each signal processing unit to correct Data Skew between the lanes, for example.

[Configuration of Link Layer of Reception Unit 331]

The reception unit 331 includes a lane integration unit 422, a packet separation unit 423, a payload error correction unit 424, and a Byte Unpacking unit 425 as the configuration of the link layer.

The lane integration unit 422 integrates the data supplied from the signal processing units 402-0 to 402-N of the physical layer by rearranging the packet data in order reverse to the distribution order to each lane by the lane distribution unit 365 of the transmission unit 322. The lane integration unit 422 outputs the packet data acquired by the integration to the packet separation unit 423.

The packet separation unit 423 outputs the packet data integrated by the lane integration unit 422 to the payload error correction unit 424 as payload data. In a case where header information is included as the payload data, the packet separation unit 423 outputs the header information extracted from the payload to the payload data acquisition unit 431.

In a case where the parity is inserted into the payload data supplied from the packet separation unit 423, the payload error correction unit 424 detects an error in the payload data by performing error correction calculation on the basis of the parity and corrects the detected error. For example, in a case where the parity is inserted as illustrated in FIG. 41, the payload error correction unit 424 uses the parity inserted at the end of the first Basic Block to correct an error in 224-byte data provided before the parity.

The payload error correction unit 424 outputs the data after error correction acquired by correcting an error in each of Basic Block and Extra Block to the Byte Unpacking unit 425. In a case where the parity is not inserted into the payload data supplied from the packet separation unit 423, the payload data supplied from the packet separation unit 423 is output to the Byte Unpacking unit 425.

The Byte Unpacking unit 425 performs Byte Unpacking that is conversion processing reverse to the processing by the Byte Packing unit 362 of the transmission unit 322 on the 16-byte packing data supplied from the payload error correction unit 424. The Byte Unpacking unit 425 outputs the data acquired by Byte Unpacking to the payload data acquisition unit 431. The Byte Unpacking unit 425 outputs the data in a predetermined bit unit for one packet to the payload data acquisition unit 431, similarly to the output of the payload data generation unit 351 of the transmission unit 322.

Furthermore, when the packing data included in the payload data includes dummy data, the Byte Unpacking unit 425 removes the dummy data and performs Byte Unpacking on the data other than the dummy data. When the packing data includes the dummy data, for example, the dummy data is specified on the basis of a method such that 120-bit continuous dummy data is detected as described above. Furthermore, a bit length of the dummy data included in the packing data is specified by eight bits subsequent to the 120-bit dummy data.

[Configuration of Adaptation Layer of Reception Unit 331]

The reception unit 331 includes the payload data acquisition unit 431 as the configuration of the adaptation layer.

The payload data acquisition unit 431 acquires the data supplied from the Byte Unpacking unit 425 and outputs the data to the information processing unit 332 in unit of a bit width same as that of the data input from the data input unit 342 to the payload data generation unit 351 in the transmission-side LSI 311.

[Operations of Transmission-Side LSI 311 and Reception-side LSI 312]

Next, a series of processing of the transmission-side LSI 311 and the reception-side LSI 312 having the above configuration will be described.

Figure 42:
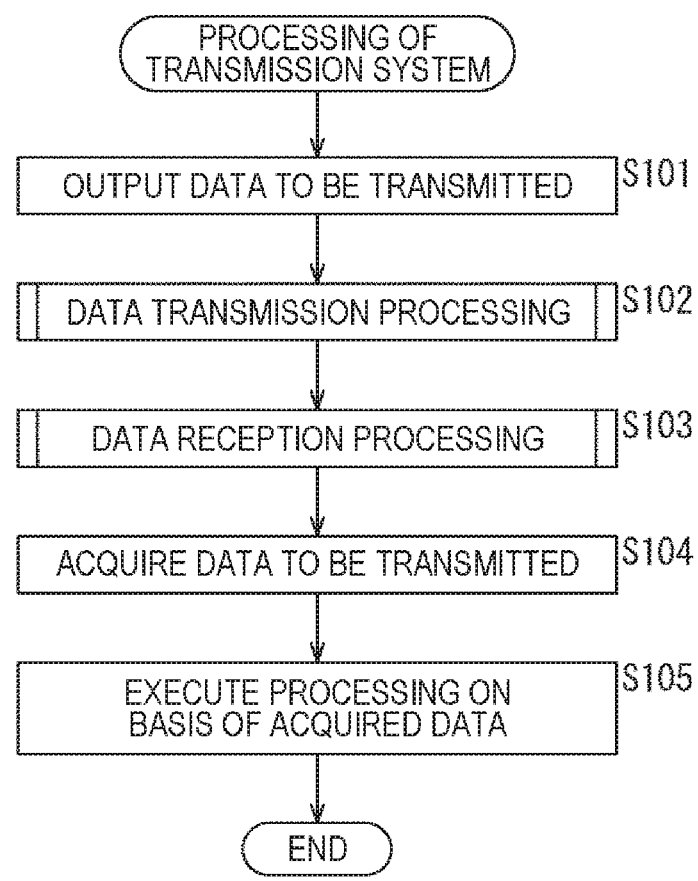
FIG. 42 is a flowchart for explaining an operation of the transmission system.

First, an operation of the transmission system 301 will be described with reference to the flowchart in FIG. 42. The processing in each step in FIG. 42 is appropriately executed in parallel to the other processing or before or after the other processing.

In step S101, the information processing unit 321 of the transmission-side LSI 311 executes various data processing and outputs data to be transmitted to the transmission unit 322 in units of a predetermined bit width of eight to 144 bits.

In step S102, the transmission unit 322 executes data transmission processing. According to the data transmission processing, a packet in which the data to be transmitted is stored in a payload is generated, and the packet data is transmitted to the reception unit 331. The data transmission processing will be described later with reference to the flowchart in FIG. 43.

In step S103, the reception unit 331 of the reception-side LSI 312 executes data reception processing. According to the data reception processing, the data transmitted from the transmission unit 322 is received, and data selected as the data to be transmitted by the transmission-side LSI 311 is output to the information processing unit 332. The data reception processing will be described later with reference to the flowchart in FIG. 44.

In step S104, the information processing unit 332 acquires the data supplied from the reception unit 331.

In step S105, the information processing unit 332 executes various processing on the basis of the acquired data and terminates the processing.

Figure 43:
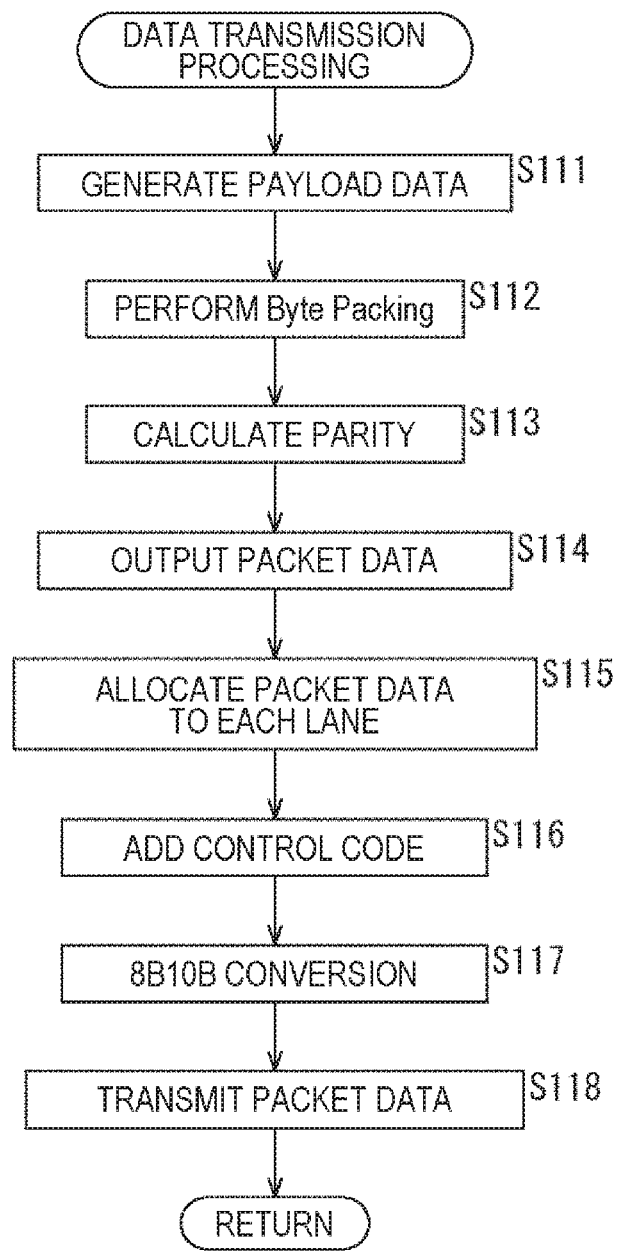
FIG. 43 is a flowchart for explaining data transmission processing executed in step S102 in FIG. 42.

Next, the data transmission processing executed in step S102 in FIG. 42 will be described with reference to the flowchart in FIG. 43.

In step S111, the payload data generation unit 351 generates payload data by dividing the data to be transmitted supplied from the data input unit 342 into pieces of data having a predetermined size.

In step S112, the Byte Packing unit 362 converts the payload data supplied from the payload data generation unit 351 into packing data in a predetermined unit such as 16 bytes.

In step S113, the payload ECC insertion unit 363 calculates an error correction code on the basis of Basic Block or Extra Block configured from the payload data and inserts a parity acquired by the calculation into the payload data.

In step S114, the packet generation unit 364 outputs the data supplied from the payload ECC insertion unit 363 to the lane distribution unit 365 as packet data.

In step S115, the lane distribution unit 365 allocates the packet data supplied from the packet generation unit 364 to the plurality of lanes used for data transmission.

In step S116, the control code insertion unit 391 adds the control code to the packet data supplied from the lane distribution unit 365.

In step S117, the 8B10B symbol encoder 392 performs the 8B10B conversion on the packet data to which the control code is added and outputs the packet data converted into data in 10-bit unit.

In step S118, the synchronization unit 393 outputs the packet data supplied from the 8B10B symbol encoder 392 according to the clock signal generated by the clock generation unit 382 and makes the transmission unit 394 transmit the packet data. The processing in steps S116 to S118 is executed by the signal processing units 383-0 to 383-N in parallel. After the packet data is transmitted, the procedure returns to step S102 in FIG. 42, and the subsequent processing is executed.

Figure 44:
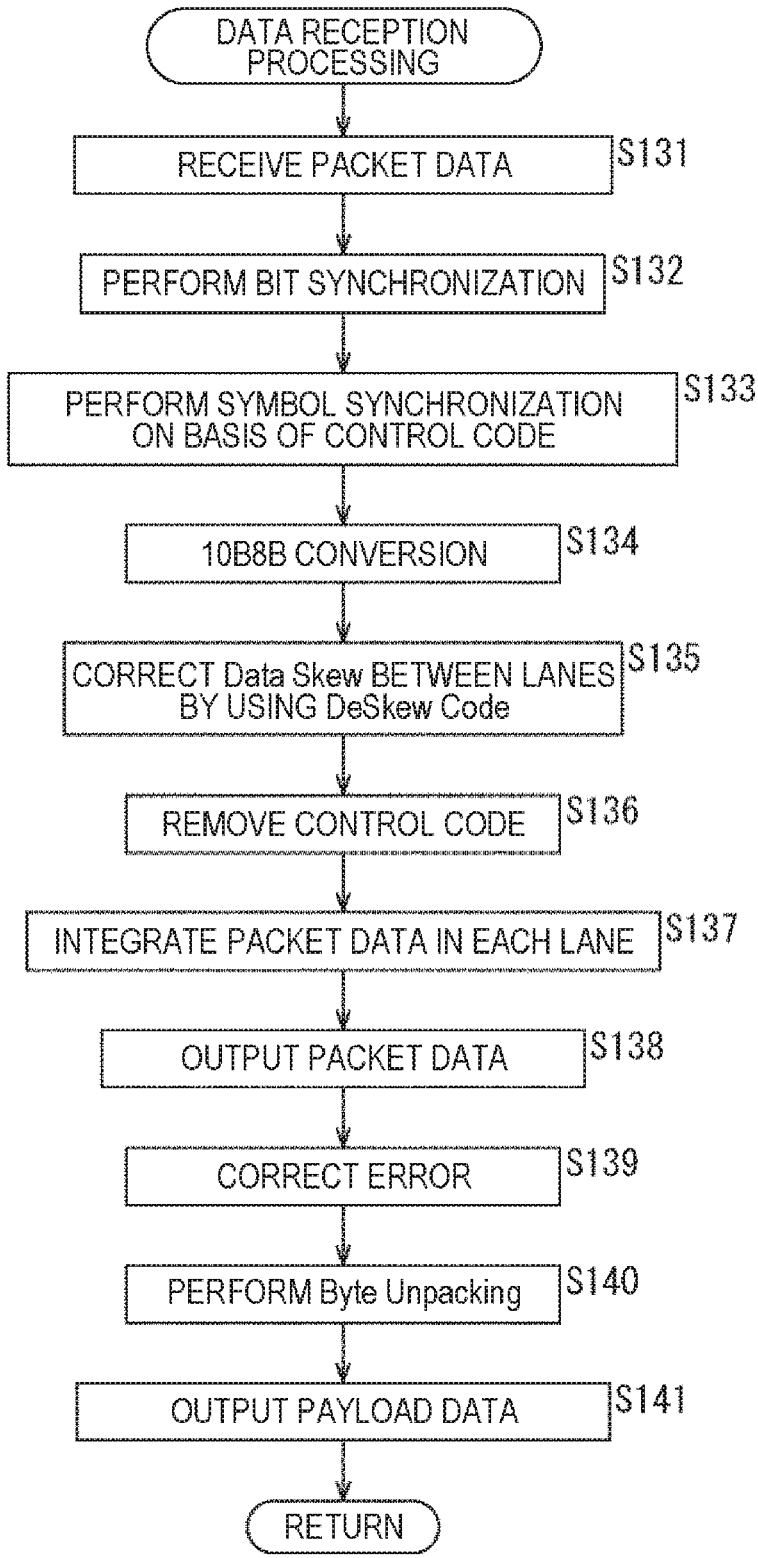
FIG. 44 is a flowchart for explaining data reception processing executed in step S103 in FIG. 42.

Next, the data reception processing executed in step S103 in FIG. 42 will be described with reference to the flowchart in FIG. 44.

In step S131, the reception unit 411 receives a signal indicating the packet data transmitted from the transmission unit 322. The processing in steps S131 to S136 is executed by the signal processing units 402-0 to 402-N in parallel.

In step S132, the clock generation unit 412 performs bit synchronization by detecting an edge of the signal supplied from the reception unit 411. The synchronization unit 413 samples the signal received by the reception unit 411 and outputs the packet data to the symbol synchronization unit 414.

In step S133, the symbol synchronization unit 414 performs symbol synchronization, for example, by detecting the control code included in the packet data.

In step S134, the 10B8B symbol decoder 415 performs the 10B8B conversion on the packet data on which the symbol synchronization has been performed, and outputs the packet data converted into data in eight-bit unit.

In step S135, the skew correction unit 416 detects Deskew Code and corrects Data Skew between the lanes so as to adjust the timing of Deskew Code to a timing indicated by the information supplied from the PHY-RX state control unit 401.

In step S136, the control code removal unit 417 removes the control code added to the packet data.

In step S137, the lane integration unit 422 integrates the packet data supplied from the signal processing units 402-0 to 402-N.

In step S138, the packet separation unit 423 outputs the packet data integrated by the lane integration unit 422 to the payload error correction unit 424 as payload data.

In step S139, the payload error correction unit 424 corrects an error in the payload data on the basis of the parity inserted into the payload data supplied from the packet separation unit 423.

In step S140, the Byte Unpacking unit 425 executes conversion processing reverse to Byte Packing on the payload data supplied from the payload error correction unit 424. The Byte Unpacking unit 425 outputs the acquired data to the payload data acquisition unit 431.

In step S141, the payload data acquisition unit 431 outputs the data supplied from the Byte Unpacking unit 425 to the information processing unit 332 in a predetermined bit width unit. Thereafter, the procedure returns to step S103 in FIG. 42, and the subsequent processing is executed.

The data transmission between the transmission-side LSI 311 and the reception-side LSI 312 by using the general-purpose I/F is performed as described above. Various types of data can be transmitted by using the general-purpose I/F.

3. Correction of Data Skew Between Communication Links

[(1) Data Skew Between Communication Links]

As described above, in the CIS I/F and the general-purpose I/F, a single communication link is established by a pair of a single transmission unit and a single reception unit, and data is transmitted.

The communication link is a data transmission path between an imaging unit and an image processing unit in the CIS I/F and a data transmission path between two information processing units in the general-purpose I/F. An array of data having the data structure described above is transmitted by the communication link as a data stream.

The transmission system illustrated in FIGS. 1 and 33 includes a single pair of the transmission unit and the reception unit and transmits data by using a single path. Therefore, the transmission system is a system using a single communication link.

On the other hand, since the transmission system illustrated in FIGS. 2 and 34 includes two pairs of the transmission units and the reception units and transmits data by using two paths, the transmission system is a system using two communication links. The same applies to the transmission system illustrated in FIGS. 3 and 35.

Hereinafter, in a case where one communication link is used in the transmission system, the communication link is appropriately referred to as a single communication link. Furthermore, in a case where a plurality communication links is used in the transmission system, the communication link is referred to as a multi-communication link.

[(1-1) Single Communication Link]

Figure 45:
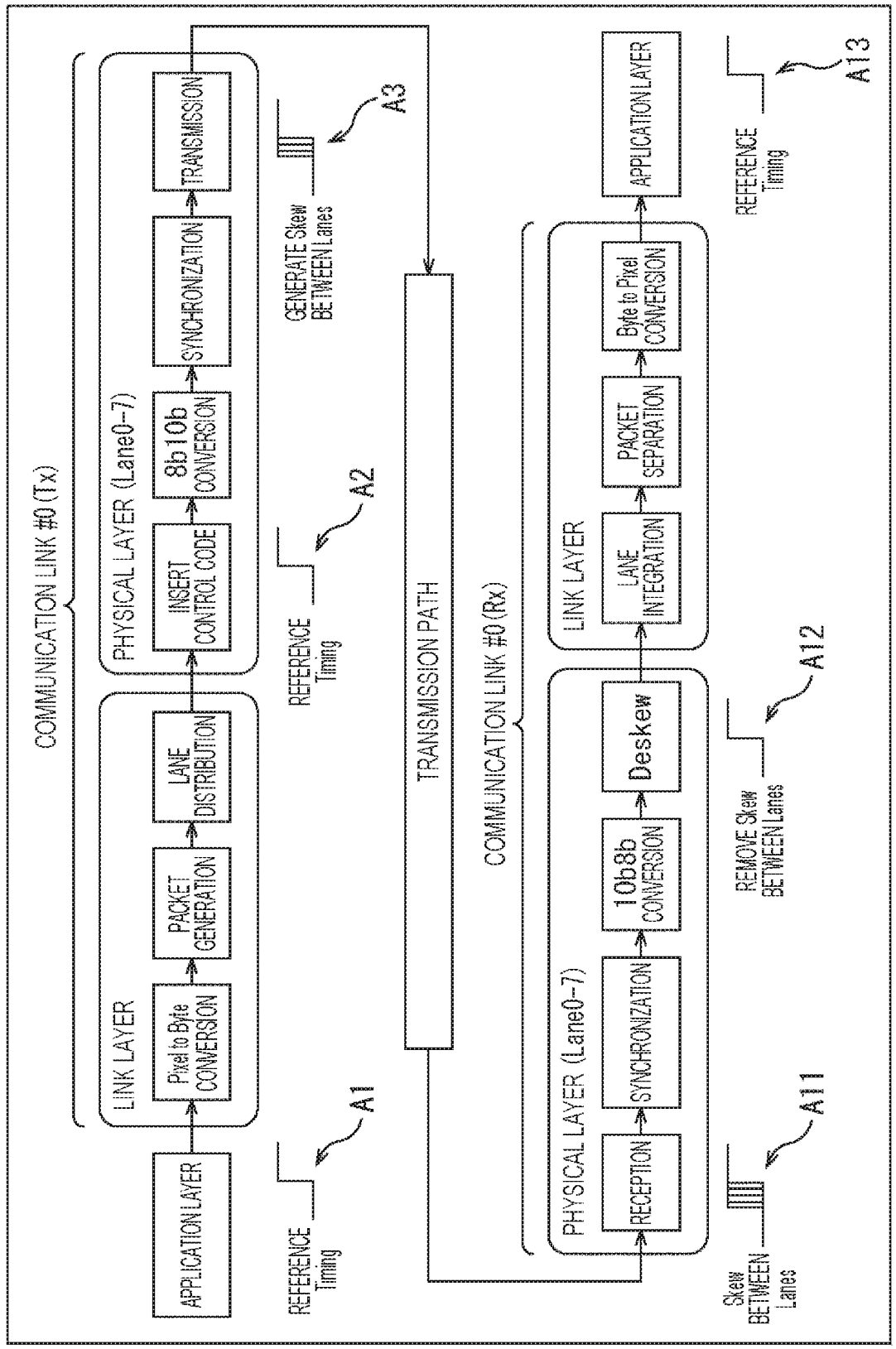
FIG. 45 is a diagram illustrating an example of a processing flow of a single communication link.

FIG. 45 is a diagram illustrating an example of a processing flow of the single communication link. The single communication link in the CIS I/F will be described. However, the same applies to the general-purpose I/F.

As illustrated in FIG. 45, a communication link #0 which is a single communication link is a path including the link layer and the physical layer of the transmission unit 22, the transmission path between the transmission unit 22 and the reception unit 31, and the physical layer and the link layer of the reception unit 31.

Data is input from the application layer (imaging unit 21) to the link layer of the transmission unit 22 according to a reference timing as indicated by an arrow A1. The reference timing is a signal indicating a timing to be a reference of processing.

In the link layer of the transmission unit 22, Pixel to Byte conversion, packet generation, and lane distribution are sequentially performed as main processing.

In each lane of the physical layer, insertion of the control code, 8B10B conversion, synchronization (symbol synchronization and bit synchronization), and data transmission are sequentially performed as main processing. The processing in the physical layer of the transmission unit 22 is executed in each lane (each of signal processing units 83-0 to 83-N) in parallel. Note that, in a case where the transmission side does not execute the synchronization processing, data acquired by the 8B10B conversion is transmitted as it is.

The same reference timing is input to each lane of the physical layer as indicated by an arrow A2. In each lane, processing is executed according to the reference timing.

In each lane of the physical layer, a difference between data timings of the respective lanes is generated according to a difference between data to be processed, a difference between characteristics of the signal processing units, and the like. The difference between the data timings appears as Data Skew between the lanes as indicated by an arrow A3.

Data output from each lane of the physical layer is input to the reception unit 31 as having Data Skew between the lanes as indicated by an arrow A11.

The processing in the physical layer of the reception unit 31 is executed in each lane (each of signal processing units 102-0 to 102-N) in parallel. In each lane of the physical layer, data reception, synchronization, 10B8B conversion, and Deskew (correction of Data Skew between lanes) are sequentially performed as main processing.

By performing Data Skew as described with reference to FIG. 25, data from which Data Skew between the lanes is removed is acquired as indicated by an arrow A12. The data from which Data Skew between the lanes is removed is output from each lane of the physical layer to the link layer.

In the link layer of the reception unit 31, lane integration, packet separation, and Byte to Pixel conversion are sequentially performed as main processing. The processing of the link layer is performed after the data output from each lane is integrated into data in one system.

The data to be transmitted is output from the link layer to the application layer (image processing unit 32) according to a predetermined reference timing as indicated by an arrow A13.

In this way, the data transmission by the CIS I/F and the general-purpose I/F is performed as removing Data Skew between the lanes generated in the physical layer on the transmission side by the physical layer on the reception side.

[(1-2) Multi-Communication Link]

Figure 46:
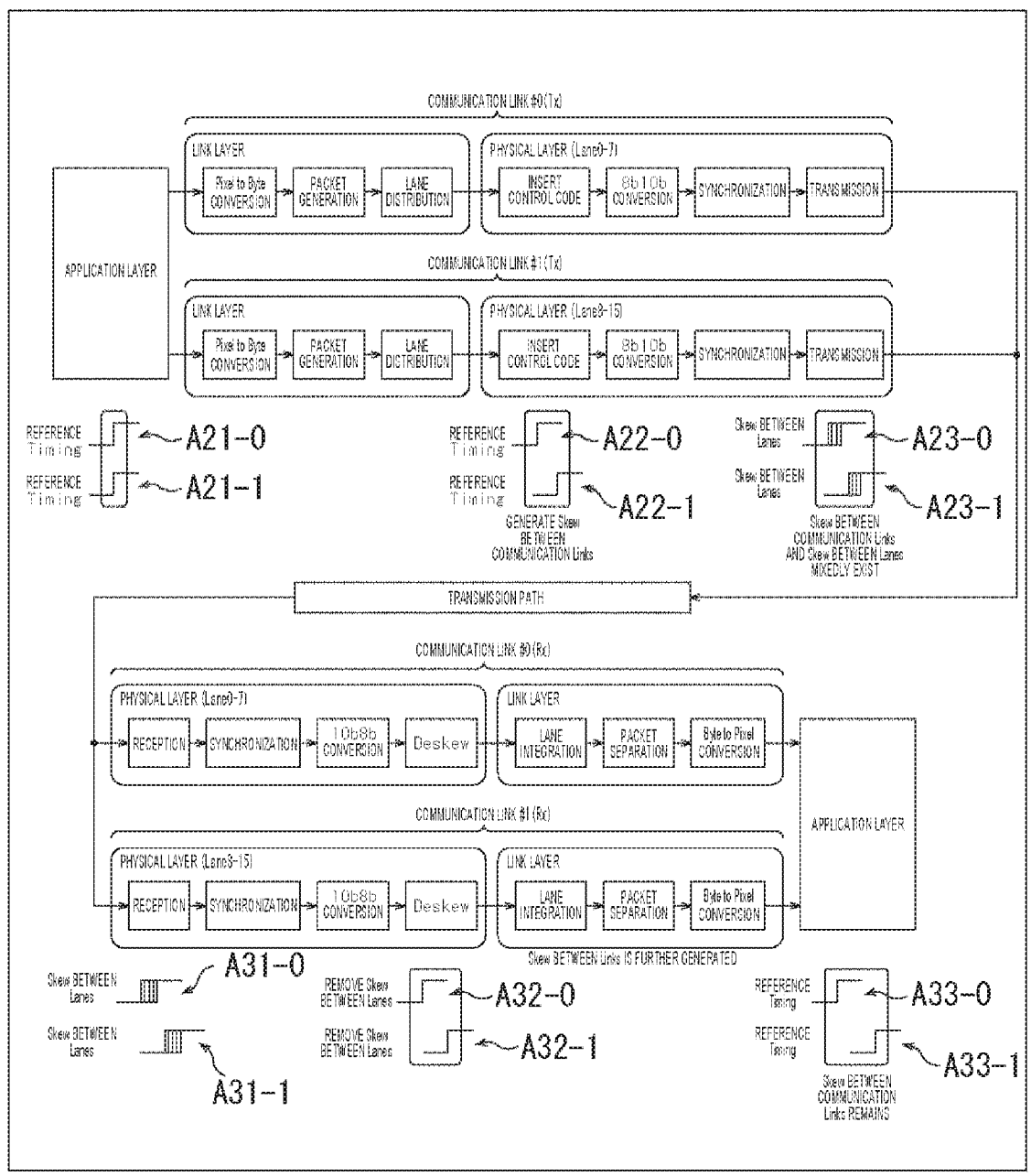
FIG. 46 is a diagram illustrating an example of a processing flow of a multi-communication link.

FIG. 46 is a diagram illustrating an example of a processing flow of the multi-communication link. The description overlapping with the above description with reference to FIG. 45 will be appropriately omitted.

The multi-communication link illustrated in FIG. 46 includes communication links #0 and #1. For example, the communication link #0 is realized by a pair of the transmission unit 22-1 and the reception unit 31-1 in FIG. 2, and the communication link #1 is realized by a pair of the transmission unit 22-2 and the reception unit 31-2.

In this case, the communication link #0 is a path including the link layer and the physical layer of the transmission unit 22-1, the transmission path between the transmission unit 22-1 and the reception unit 31-1, and the physical layer and the link layer of the reception unit 31-1. Furthermore, the communication link #1 is a path including the link layer and the physical layer of the transmission unit 22-2, the transmission path between the transmission unit 22-2 and the reception unit 31-2, and the physical layer and the link layer of the reception unit 31-2.

The input of the data to the link layer of the transmission unit 22-1 included in the communication link #0 and the input of the data to the link layer of the transmission unit 22-2 included in the communication link #1 are performed according to the same reference timing as indicated by arrows A21-0 and A21-1.

In the link layer of the transmission unit 22-1 included in the communication link #0 and the link layer of the transmission unit 22-2 included in the communication link #1, the processing in the link layer described above is independently executed.

The data distributed to each lane is output from the link layer of the transmission unit 22-1 to the physical layer. Similarly, the data distributed to each lane is output from the link layer of the transmission unit 22-2 to the physical layer.

When the pieces of data input to the link layer at the same timing are input to the physical layer, input timings are different as indicated by reference timings of arrows A22-0 and A22-1.

The difference between the timings is generated by a difference between the characteristics of the configuration for executing the processing of the link layer of the transmission unit 22-1 and the configuration for executing the processing of the link layer of the transmission unit 22-2 (difference in behavior clock and the like) and the like.

Hereinafter, the difference between the timings of the data caused in the link layers of the different communication links is referred to as Data Skew between the communication links as appropriate. Data Skew between the communication links is different from Data Skew between the lanes removed by using Deskew Code as described above.

In each lane of the physical layer, insertion of the control code, 8B10B conversion, synchronization, and data transmission are sequentially performed. The processing of the physical layers of the transmission units 22-1 and 22-2 is executed in the respective lanes in parallel.

The data output from each lane of the physical layer of the transmission unit 22-1 included in the communication link #0 mixedly includes Data Skew between the communication links caused in the link layer and Data Skew between the lanes caused in the physical layer as indicated by an arrow A23-0.

Furthermore, the data output from each lane of the physical layer of the transmission unit 22-2 included in the communication link #1 mixedly includes Data Skew between the communication links caused in the link layer and Data Skew between the lanes caused in the physical layer as indicated by an arrow A23-1.

The data including Data Skew between the communication links and Data Skew between the lanes is input to the physical layers of the reception units 31-1 and 31-2 as indicated by arrows A31-0 and A31-1.

In each lane of the physical layer of the reception unit 31-1 included in the communication link #0, data reception, synchronization, 10B8B conversion, and Deskew are sequentially performed, and the data from which Data Skew between the lanes is removed can be acquired as indicated by an arrow A32-0.

In each lane of the physical layer of the reception unit 31-2 included in the communication link #1, data reception, synchronization, 10B8B conversion, and Deskew are sequentially performed, and the data from which Data Skew between the lanes is removed can be acquired as indicated by an arrow A32-1.

The data from which Data Skew between the lanes is removed is output from each lane of the physical layer to the link layer. Note that only Data Skew between the lanes is removed by Deskew in each lane of the physical layer, and Data Skew between the communication links is not removed.

In the link layer of the reception unit 31-1 included in the communication link #0, lane integration, packet separation, and Byte to Pixel conversion are sequentially performed. Data in which Data Skew between the communication links remains is output from the link layer to the application layer as indicated by an arrow A33-0.

In the link layer of the reception unit 31-2 included in the communication link #1, lane integration, packet separation, and Byte to Pixel conversion are sequentially performed. Data in which Data Skew between the communication links remains is output from the link layer to the application layer as indicated by an arrow A33-1.

Note that, in each of the link layers of the reception units 31-1 and 31-2, Data Skew between the communication links is caused and is added to data to be processed.

In this way, in the data transmission by using the multi-communication link, it is necessary to consider not only Data Skew between the lanes but also Data Skew between the communication links. Hereinafter, how to remove Data Skew between the communication links will be described.

[(2) Removal of Data Skew Between Communication Links]

Figure 47:
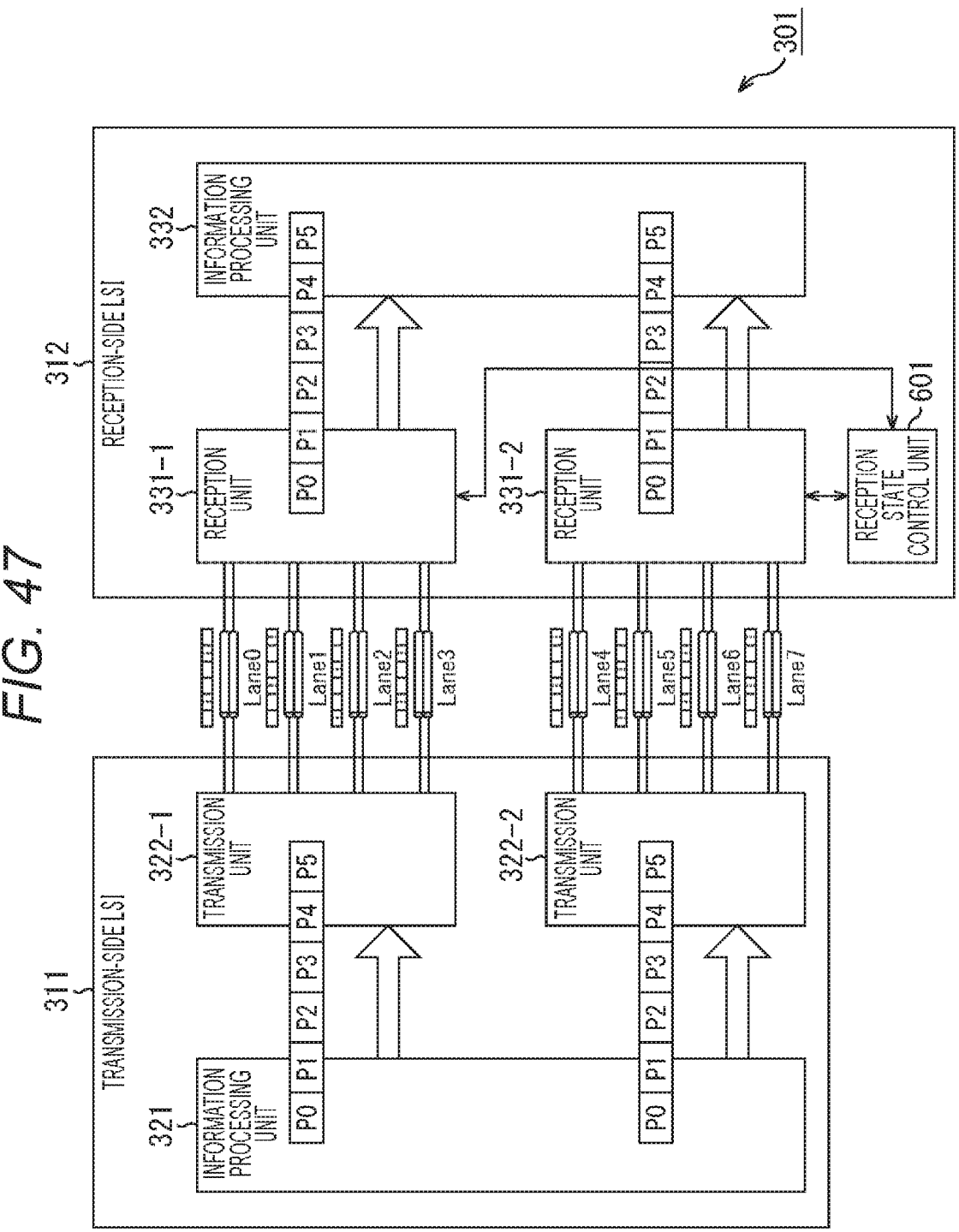
FIG. 47 is a diagram illustrating another exemplary configuration of the transmission system.

FIG. 47 is a diagram illustrating another exemplary configuration of the transmission system 301. Components illustrated in FIG. 47 same as the components illustrated in FIG. 34 are respectively denoted with the same reference numerals. The overlapped description will be appropriately omitted.

The transmission system 301 illustrated in FIG. 47 has a configuration different from the configuration illustrated in FIG. 34 in that a reception state control unit 601 is provided in the reception-side LSI 312. The multi-communication link in the general-purpose I/F will be described. However, the same applies to the CIS I/F.

The communication link #0 is realized by a pair of the transmission unit 322-1 provided in the transmission-side LSI 311 and the reception unit 331-1 provided in the reception-side LSI 312. Furthermore, the communication link #1 is realized by a pair of the transmission unit 322-2 provided in the transmission-side LSI 311 and the reception unit 331-2 provided in the reception-side LSI 312.

The reception state control unit 601 detects Data Skew between the communication links on the basis of a data reception state of the reception unit 331-1 and a data reception state of the reception unit 331-2.

Furthermore, the reception state control unit 601 controls a timing of data processed by the reception unit 331-1 and a timing of data processed by the reception unit 331-2 so as to correct Data Skew between the communication links. The reception state control unit 601 functions as a control unit that corrects Data Skew between the communication links.

[(2-1) First Example in a Case where Physical Layer on Reception Side Removes Data Skew Between Communication Links]

Exemplary Configuration of Transmission System

Figure 48:
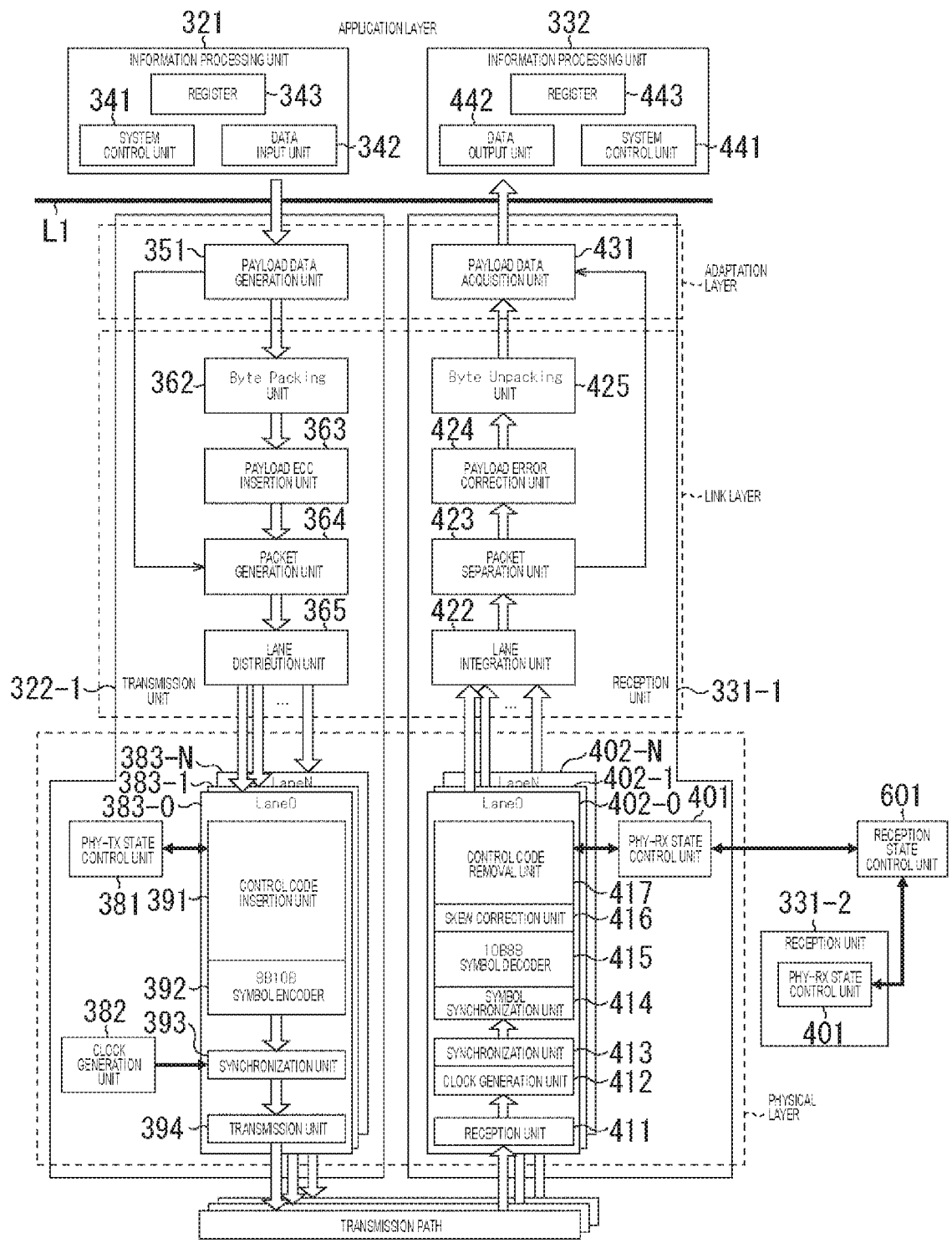
FIG. 48 is a diagram illustrating an exemplary configuration of the transmission-side LSI and the reception-side LSI.

FIG. 48 is a diagram illustrating an exemplary configuration of the transmission-side LSI 311 and the reception-side LSI 312.

Components illustrated in FIG. 48 same as the components illustrated in FIG. 37 are respectively denoted with the same reference numerals. The overlapped description will be appropriately omitted. The same applies to FIGS. 51, 53, and the like to be described later.

As illustrated in FIG. 48, the reception state control unit 601 is connected to the PHY-RX state control unit 401 of the reception unit 331-1 and is connected to the PHY-RX state control unit 401 of the reception unit 331-2.

Note that, in FIG. 48, only the PHY-RX state control unit 401 is illustrated as the configuration of the reception unit 331-2, and illustration of other components is omitted. In the reception unit 331-2, the configuration same as the configuration of the reception unit 331-1 including the PHY-RX state control unit 401 is provided.

Furthermore, in FIG. 48, as the configuration of the transmission unit, only the transmission unit 322-1 that realizes the communication link #0 together with the reception unit 331-1 is illustrated. The transmission unit 322-2 that realizes the communication link #1 together with the reception unit 331-2 is provided. The reception unit 331-2 receives data transmitted from the transmission unit 322-2 and outputs the data to the information processing unit 332.

Data is transmitted between the information processing units 321 and 332 by using the multi-communication link including the communication links #0 and #1. In each communication link, the processing described with reference to FIG. 37 and the like is executed.

The skew correction unit 416 of each of the signal processing units 402-0 to 402-N of the reception unit 331-1 detects Deskew Code and outputs information regarding a detection timing to the PHY-RX state control unit 401. Furthermore, each skew correction unit 416 corrects the timing of the detected Deskew Code according to the control by the PHY-RX state control unit 401.

As described later, the correction timing is set by the reception state control unit 601 so as to correct Data Skew between the communication links.

The PHY-RX state control unit 401 of the reception unit 331-1 outputs the information regarding the detection timing of Deskew Code supplied from the skew correction unit 416 of each of the signal processing units 402-0 to 402-N to the reception state control unit 601. In a case where the information regarding the correction timing is supplied from the reception state control unit 601, the PHY-RX state control unit 401 controls an operation of the skew correction unit 416 of each of the signal processing units 402-0 to 402-N.

Each unit of the reception unit 331-2 executes processing similar to that of each unit of the reception unit 331-1.

In other words, the skew correction unit 416 (not illustrated) of each of the signal processing units 402-0 to 402-N of the reception unit 331-2 detects Deskew Code and outputs the information regarding the detection timing of Deskew Code to the PHY-RX state control unit 401. Furthermore, each skew correction unit 416 corrects the timing of the detected Deskew Code according to the control by the PHY-RX state control unit 401.

The PHY-RX state control unit 401 of the reception unit 331-2 outputs the information regarding the detection timing of Deskew Code supplied from the skew correction unit 416 of each of the signal processing units 402-0 to 402-N to the reception state control unit 601. In a case where the information regarding the correction timing is supplied from the reception state control unit 601, the PHY-RX state control unit 401 controls an operation of the skew correction unit 416 of each of the signal processing units 402-0 to 402-N.

The reception state control unit 601 receives the information regarding the detection timing supplied from the PHY-RX state control unit 401 of the reception unit 331-1 and the information regarding the detection timing supplied from the PHY-RX state control unit 401 of the reception unit 331-2.

The reception state control unit 601 sets a correction timing on the basis of the timing of Deskew Code detected in each lane of the reception unit 331-1 and each lane of the reception unit 331-2.

Figure 49:
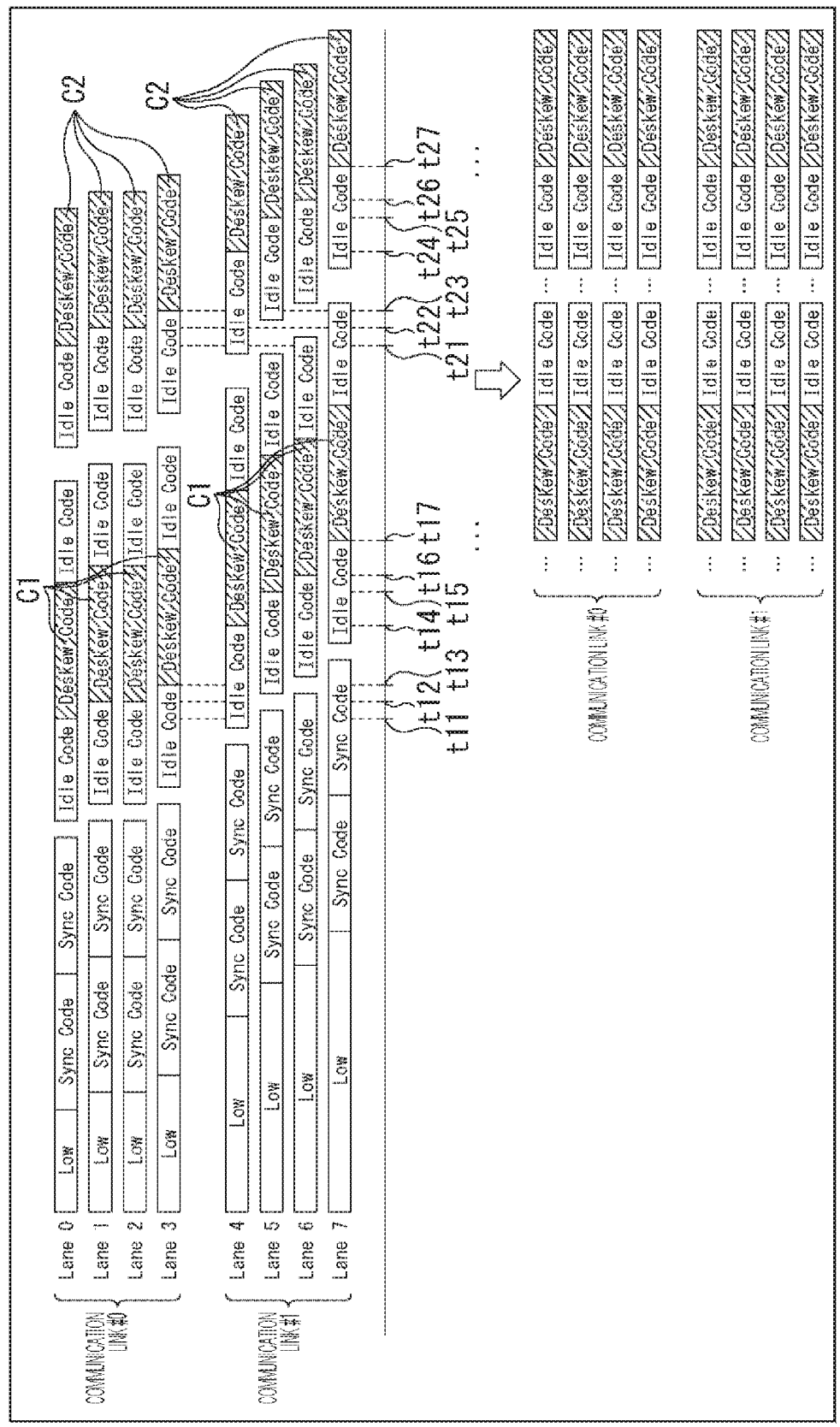
FIG. 49 is a diagram illustrating an example of setting of a correction timing.

FIG. 49 is a diagram illustrating an example of setting of the correction timing.

In the example in FIG. 49, four lanes including Lanes 0 to 3 are used for the communication link #0, and four lanes including Lanes 4 to 7 are used for the communication link #1. In each lane, similar to those described with reference to FIG. 25, Sync Code, Sync Code, . . . , Idle Code, Deskew Code, Idle Code, . . . , Idle Code, and Deskew Code are transmitted.

In the communication link #0, Deskew Code C1 in Lane 0 is detected at a timing of a time t1*l*. Deskew Code C1 in Lane 1 and Deskew Code C1 in Lane 2 are detected at the same timing of a time t12. Deskew Code C1 in Lane 3 is detected at a timing of a time t13.

Furthermore, in the communication link #0, Deskew Code C2 in Lane 0 is detected at a timing of a time t21. Deskew Code C2 in Lane 1 and Deskew Code C2 in Lane 2 are detected at the same timing of a time t22. Deskew Code C2 in Lane 3 is detected at a timing of a time t23.

Such information regarding the detection timing is supplied from the PHY-RX state control unit 401 of the reception unit 331-1 to the reception state control unit 601.

On the other hand, in the communication link #1, Deskew Codes C1 in Lanes 4 to 7 are respectively detected at timings of times t14, t15, t16, and t17.

Furthermore, in the communication link #1, Deskew Codes C2 in Lanes 4 to 7 are respectively detected at timings of times t24, t25, t26, and t27.

Such information regarding the detection timing is supplied from the PHY-RX state control unit 401 of the reception unit 331-2 to the reception state control unit 601.

Deskew Codes C1 detected in the respective lanes are pieces of data corresponding to each other that is inserted in the communication links #0 and #1 (physical layers of transmission units 322-1 and 322-2) at the same timing. Similarly, Deskew Codes C2 detected in the respective lanes are pieces of data corresponding to each other that is inserted in the communication links #0 and #1 at the same timing.

In this case, the reception state control unit 601 sets, for example, the timing of the time t17 that is the latest from among the detection timings in Lanes 0 to 3 of the communication link #0 and Lanes 4 to 7 of the communication link #1 as the correction timing of Deskew Code C1.

Furthermore, the reception state control unit 601 sets, for example, the timing of the time t27 that is the latest from among the detection timings in Lanes 0 to 3 of the communication link #0 and Lanes 4 to 7 of the communication link #1 as the correction timing of Deskew Code C2.

The reception state control unit 601 outputs the information regarding the correction timing set in this way to the PHY-RX state control unit 401 of the reception unit 331-1 and the PHY-RX state control unit 401 of the reception unit 331-2.

The skew correction unit 416 of each of the signal processing units 402-0 to 402-N of the reception unit 331-1 performs Deskew so as to adjust the timing of Deskew Code C1 to the timing of the time t17 according to the control by the PHY-RX state control unit 401. Furthermore, Deskew is performed so as to adjust the timing of Deskew Code C2 to the timing of the time t27. The timing of Deskew Code is corrected by using a FIFO provided in each skew correction unit 416.

On the other hand, the skew correction unit 416 of each of the signal processing units 402-0 to 402-N of the reception unit 331-2 performs Deskew so as to adjust the timing of Deskew Code C1 to the timing of the time t17 according to the control by the PHY-RX state control unit 401. Furthermore, Deskew is performed so as to adjust the timing of Deskew Code C2 to the timing of the time t27. The timing of Deskew Code is corrected by using a FIFO provided in each skew correction unit 416.

With this operation, as indicated in a portion pointed by an outline arrow in FIG. 49, the timings of Deskew Code C1 in Lanes 0 to 3 of the communication link #0 and the timings of Deskew Code C1 in Lanes 4 to 7 of the communication link #1 are corrected to be the same.

Furthermore, the timings of Deskew Code C2 in Lanes 0 to 3 of the communication link #1 and the timings of Deskew Code C2 in Lanes 4 to 7 of the communication link #1 are corrected to be the same.

Deskew Code of which the timing is corrected in this way is output from the skew correction unit 416.

With this operation, Data Skew between the communication links is corrected by using Deskew Code that is known information. Furthermore, Data Skew between the lanes is corrected.

Operation of Transmission System

Next, a series of operations in a case where Data Skew between the communication links is corrected in the physical layer will be described with reference to the sequence diagram in FIG. 50.

Figure 50:
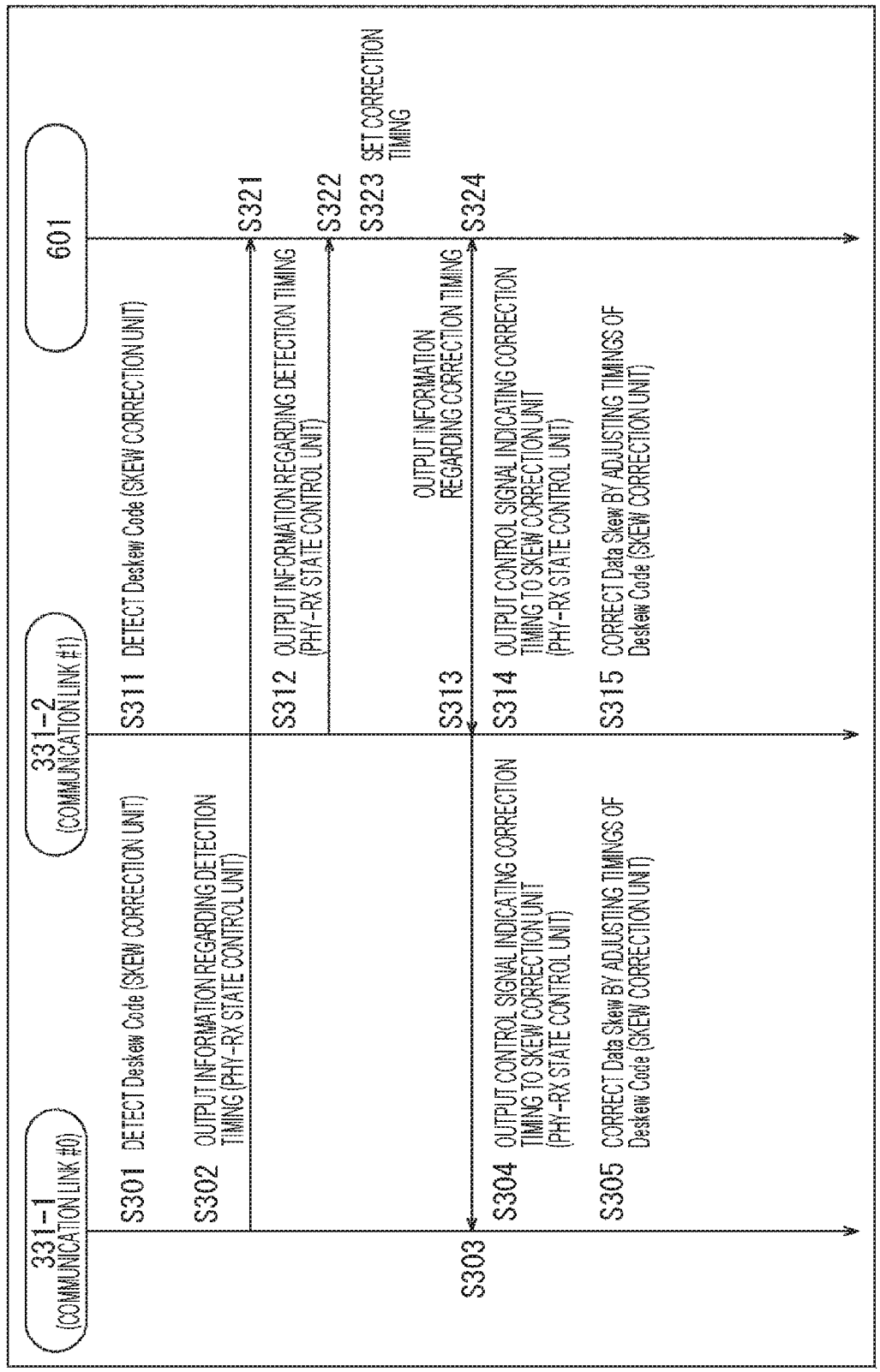
FIG. 50 is a sequence diagram for explaining a series of operations in a case where Data Skew between communication links is corrected in a physical layer.

Processing illustrated at the left end of FIG. 50 is processing of the reception unit 331-1 that realizes the communication link #0. Processing illustrated at the center is processing of the reception unit 331-2 that realizes the communication link #1. Processing illustrated at the right end is processing of the reception state control unit 601.

In the reception unit 331-1, the data transmitted from the transmission unit 322-1 is received by the signal processing unit of each lane, and each processing of the physical layer is executed. Similarly, in the reception unit 331-2, the data transmitted from the transmission unit 322-2 is received by the signal processing unit of each lane, and each processing of the physical layer is executed.

In step S301, the skew correction unit 416 of each of the signal processing units 402-0 to 402-N of the reception unit 331-1 detects Deskew Code. The information regarding the detection timing is supplied to the PHY-RX state control unit 401 of the reception unit 331-1.

In step S302, the PHY-RX state control unit 401 of the reception unit 331-1 outputs the information regarding the detection timing of Deskew Code supplied from the skew correction unit 416 of each of the signal processing units 402-0 to 402-N to the reception state control unit 601.

On the other hand, similar processing is executed in the reception unit 331-2. In step S311, the skew correction unit 416 of each of the signal processing units 402-0 to 402-N of the reception unit 331-2 detects Deskew Code. The information regarding the detection timing is supplied to the PHY-RX state control unit 401 of the reception unit 331-2.

In step S312, the PHY-RX state control unit 401 of the reception unit 331-2 outputs the information regarding the detection timing of Deskew Code supplied from the skew correction unit 416 of each of the signal processing units 402-0 to 402-N to the reception state control unit 601.

In step S321, the reception state control unit 601 receives the information supplied from the PHY-RX state control unit 401 of the reception unit 331-1.

Furthermore, in step S322, the reception state control unit 601 receives the information supplied from the PHY-RX state control unit 401 of the reception unit 331-2.

In step S323, the reception state control unit 601 sets a correction timing as described above on the basis of the timing of Deskew Code detected in each lane of the reception unit 331-1 and each lane of the reception unit 331-2.

In step S324, the reception state control unit 601 outputs the information regarding the correction timing to the PHY-RX state control unit 401 of the reception unit 331-1 and the PHY-RX state control unit 401 of the reception unit 331-2.

In step S303, the PHY-RX state control unit 401 of the reception unit 331-1 receives the information regarding the correction timing supplied from the reception state control unit 601.

In step S304, the PHY-RX state control unit 401 of the reception unit 331-1 outputs a control signal indicating the correction timing to the skew correction unit 416 of each of the signal processing units 402-0 to 402-N.

In step S305, the skew correction unit 416 of each of the signal processing units 402-0 to 402-N of the reception unit 331-1 corrects Data Skew between the communication links and Data Skew between the lanes by adjusting the timing of Deskew Code to the correction timing and outputs the corrected data.

On the other hand, similar processing is executed in the reception unit 331-2. In step S313, the PHY-RX state control unit 401 of the reception unit 331-2 receives the information regarding the correction timing supplied from the reception state control unit 601.

In step S314, the PHY-RX state control unit 401 of the reception unit 331-2 outputs a control signal indicating the correction timing to the skew correction unit 416 of each of the signal processing units 402-0 to 402-N.

In step S315, the skew correction unit 416 of each of the signal processing units 402-0 to 402-N of the reception unit 331-2 corrects Data Skew between the communication links and Data Skew between the lanes by adjusting the timing of Deskew Code to the correction timing and outputs the corrected data.

After the data in each lane of which Data Skew between the communication links and Data Skew between the lanes are corrected is integrated as data in one system in the link layer, each processing is executed on the integrated data. The data acquired by the processing of the link layer is supplied from the link layer to the application layer.

The processing described above is executed, for example, each time when Deskew Code is detected in each lane of the plurality of communication links.

According to the above processing, it is possible to remove Data Skew between the communication links in the physical layer on the reception side.

It is assumed that the correction timing be set on the basis of the detection timing of Deskew Code. However, the correction timing may be set on the basis of a timing of other data detected in the physical layer. For example, the correction timing may be set on the basis of a detection timing of a predetermined symbol detected in each lane and a detection timing of other control code such as Start Code and End Code.

A structure of data generated on the transmission side such as each packet, a control code that is known information to be added to the packet, and the like is the same regardless of the difference in the communication links used for transmission. As the data forming a group (data stream) of data having the above structure, any data can be used to set the correction timing as long as the data is arranged at the same position (timing) of each communication link.

Note that, even in the transmission system using the multi-communication link of the CIS I/F, Data Skew between the communication links is corrected in the physical layer on the reception side according to the similar processing.

[(2-2) Second Example in a Case where Link Layer on Reception Side Removes Data Skew Between Communication Links]

Exemplary Configuration of Transmission System

Figure 51:
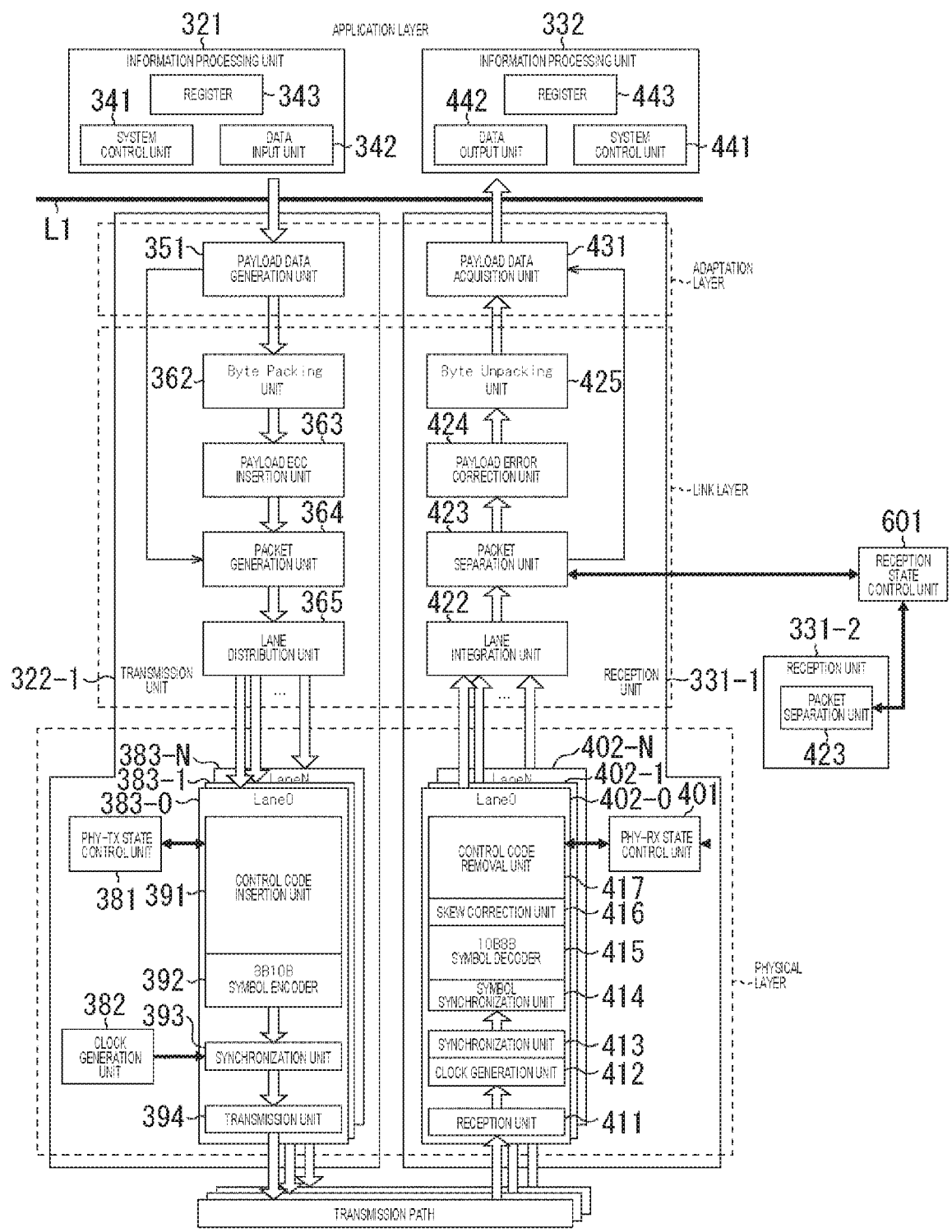
FIG. 51 is a diagram illustrating another exemplary configuration of the transmission-side LSI and the reception-side LSI.

FIG. 51 is a diagram illustrating another exemplary configuration of the transmission-side LSI 311 and the reception-side LSI 312.

In the example in FIG. 51, the reception state control unit 601 is connected to the packet separation unit 423 of the reception unit 331-1 and is connected to the packet separation unit 423 of the reception unit 331-2.

In FIG. 51, only the packet separation unit 423 is illustrated as the configuration of the reception unit 331-2, and illustration of other components is omitted. In the reception unit 331-2, the configuration same as the configuration of the reception unit 331-1 including the packet separation unit 423 is provided.

Data is transmitted between the information processing units 321 and 332 by using the multi-communication link including the communication links #0 and #1.

The packet separation unit 423 of the reception unit 331-1 detects the payload data of each packet from the data integrated by the lane integration unit 422 and outputs the information regarding the detection timing to the reception state control unit 601. Furthermore, the packet separation unit 423 corrects a timing of the detected payload data so as to adjust to the correction timing set by the reception state control unit 601 and outputs the data. An output timing of the payload data is corrected. The output timing of the payload data is corrected by using a FIFO provided in the packet separation unit 423.

The packet separation unit 423 of the reception unit 331-2 executes the similar processing to the packet separation unit 423 of the reception unit 331-1.

In other words, the packet separation unit 423 of the reception unit 331-2 detects the payload data of each packet from the data integrated by the lane integration unit 422 and outputs the information regarding the detection timing to the reception state control unit 601. Furthermore, the packet separation unit 423 corrects a timing of the detected payload data so as to adjust to the correction timing set by the reception state control unit 601 and outputs the data. The output timing of the payload data is corrected by using a FIFO provided in the packet separation unit 423.

The reception state control unit 601 receives the information regarding the detection timing supplied from the packet separation unit 423 of the reception unit 331-1 and the information regarding the detection timing supplied from the packet separation unit 423 of the reception unit 331-2.

The reception state control unit 601 sets the correction timing on the basis of the detection timing of the payload data of the packet separation unit 423 of the reception unit 331-1 and the detection timing of the payload data of the packet separation unit 423 of the reception unit 331-2.

For example, the latest timing from among the detection timings of the corresponding pieces of the payload data respectively detected by the packet separation unit 423 of the reception unit 331-1 and the packet separation unit 423 of the reception unit 331-2 is set as the correction timing. The reception state control unit 601 outputs the information regarding the correction timing set in this way to the packet separation unit 423 of the reception unit 331-1 and the packet separation unit 423 of the reception unit 331-2.

Operation of Transmission System

Figure 52:
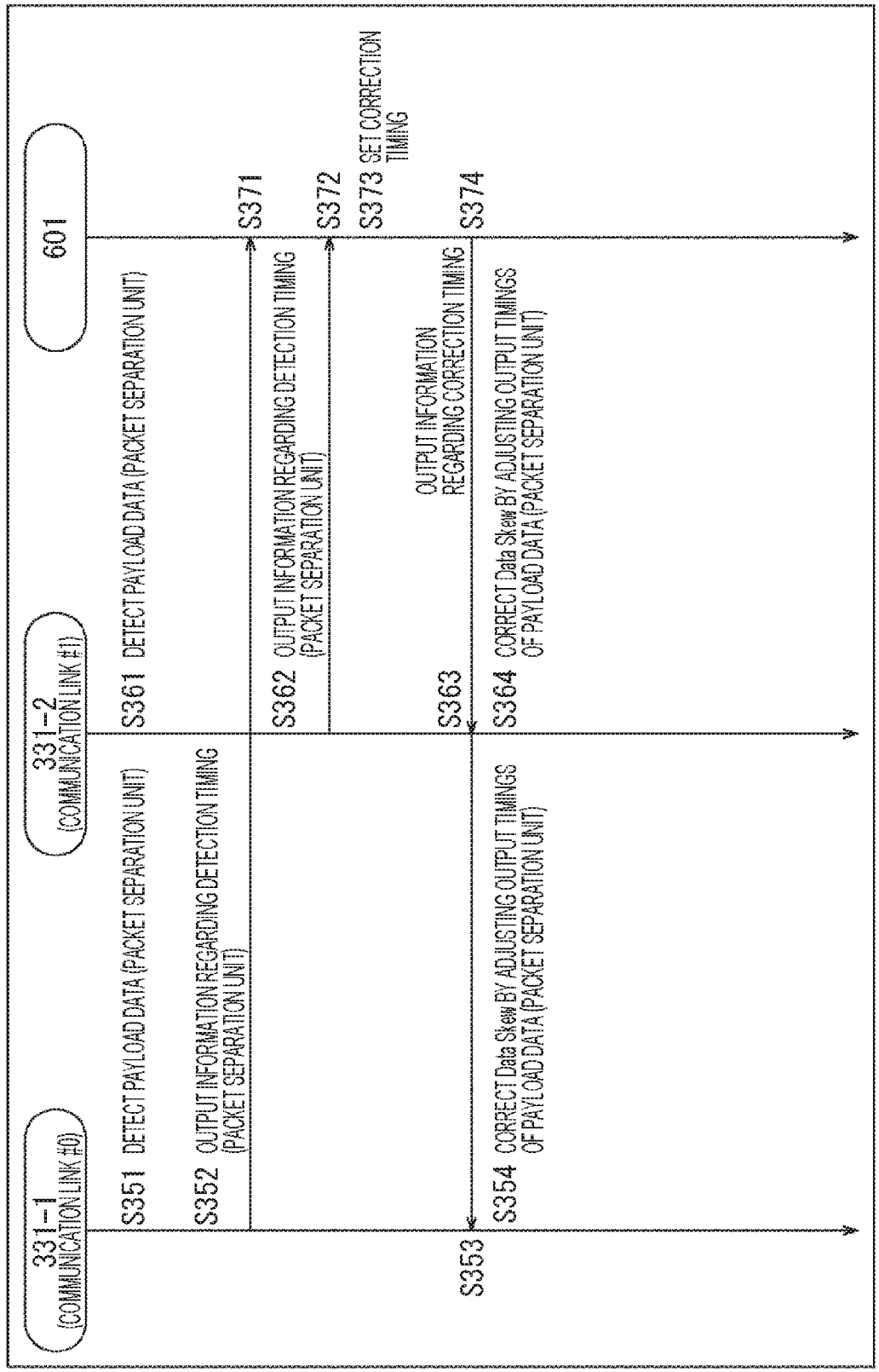
FIG. 52 is a sequence diagram for explaining a series of operations in a case where Data Skew between the communication links is corrected in a link layer.

Next, a series of operations in a case where Data Skew between the communication links is corrected in the link layer will be described with reference to the sequence diagram in FIG. 52.

In the reception unit 331-1, the data transmitted from the transmission unit 322-1 is received by the signal processing unit of each lane, and each processing of the physical layer is executed. Data in each lane output from the physical layer is integrated by the lane integration unit 422 as data in one system and is output to the packet separation unit 423. Note that, since the processing of the physical layer is executed, the data to be supplied to the packet separation unit 423 is data of which Data Skew between the lanes is corrected.

Similarly, in the reception unit 331-2, the data transmitted from the transmission unit 322-2 is received by the signal processing unit of each lane, and each processing of the physical layer is executed. Data in each lane output from the physical layer is integrated by the lane integration unit 422 as data in one system and is output to the packet separation unit 423.

In step S351, the packet separation unit 423 of the reception unit 331-1 detects payload data of each packet from the data integrated by the lane integration unit 422.

In step S352, the packet separation unit 423 of the reception unit 331-1 outputs the information regarding the detection timing of the payload data to the reception state control unit 601.

On the other hand, similar processing is executed in the reception unit 331-2. In step S361, the packet separation unit 423 of the reception unit 331-2 detects payload data of each packet from the data integrated by the lane integration unit 422.

In step S362, the packet separation unit 423 of the reception unit 331-2 outputs the information regarding the detection timing of the payload data to the reception state control unit 601.

In step S371, the reception state control unit 601 receives the information supplied from the packet separation unit 423 of the reception unit 331-1.

Furthermore, in step S372, the reception state control unit 601 receives the information supplied from the packet separation unit 423 of the reception unit 331-2.

In step S373, the reception state control unit 601 sets the correction timing on the basis of the timings of the corresponding pieces of the payload data detected in the communication links #0 and #1.

In step S374, the reception state control unit 601 outputs the information regarding the correction timing to the packet separation unit 423 of the reception unit 331-1 and the packet separation unit 423 of the reception unit 331-2.

In step S353, the packet separation unit 423 of the reception unit 331-1 receives the information regarding the correction timing supplied from the reception state control unit 601.

In step S354, the packet separation unit 423 of the reception unit 331-1 corrects Data Skew between the communication links by adjusting the timing of the detected payload data to the correction timing and outputs the data.

On the other hand, similar processing is executed in the reception unit 331-2. In step S363, the packet separation unit 423 of the reception unit 331-2 receives the information regarding the correction timing supplied from the reception state control unit 601.

In step S364, the packet separation unit 423 of the reception unit 331-2 corrects Data Skew between the communication links by adjusting the timing of the detected payload data to the correction timing and outputs the data.

Other processing is executed on the payload data, in which Data Skew between the communication links is corrected, in the link layer and is supplied to the application layer.

The above processing is executed, for example, each time when the payload data is detected in each communication link.

According to the above processing, it is possible to remove Data Skew between the communication links in the link layer on the reception side.

It is assumed that the correction timing be set on the basis of the detection timing of the payload data. However, the correction timing may be set on the basis of a timing of other data detected in the link layer. For example, in a case where the payload data includes the header information, the correction timing can be set on the basis of a detection timing of the corresponding pieces of header information.

The correction timing may be set on the basis of the detection timing of the parity included in the payload data, and the correction timing may be set on the basis of a detection timing of predetermined packing data forming the payload data. In the former case, the payload error correction unit 424 corrects Data Skew between the communication links. Furthermore, in the latter case, the Byte Unpacking unit 425 corrects Data Skew between the communication links.

Note that, even in the transmission system using the multi-communication link of the CIS I/F, Data Skew between the communication links is corrected in the link layer on the reception side according to the similar processing.

[(2-3) Third Example in a Case where Adaptation Layer on Reception Side Removes Data Skew Between Communication Links]

Exemplary Configuration of Transmission System

Figure 53:
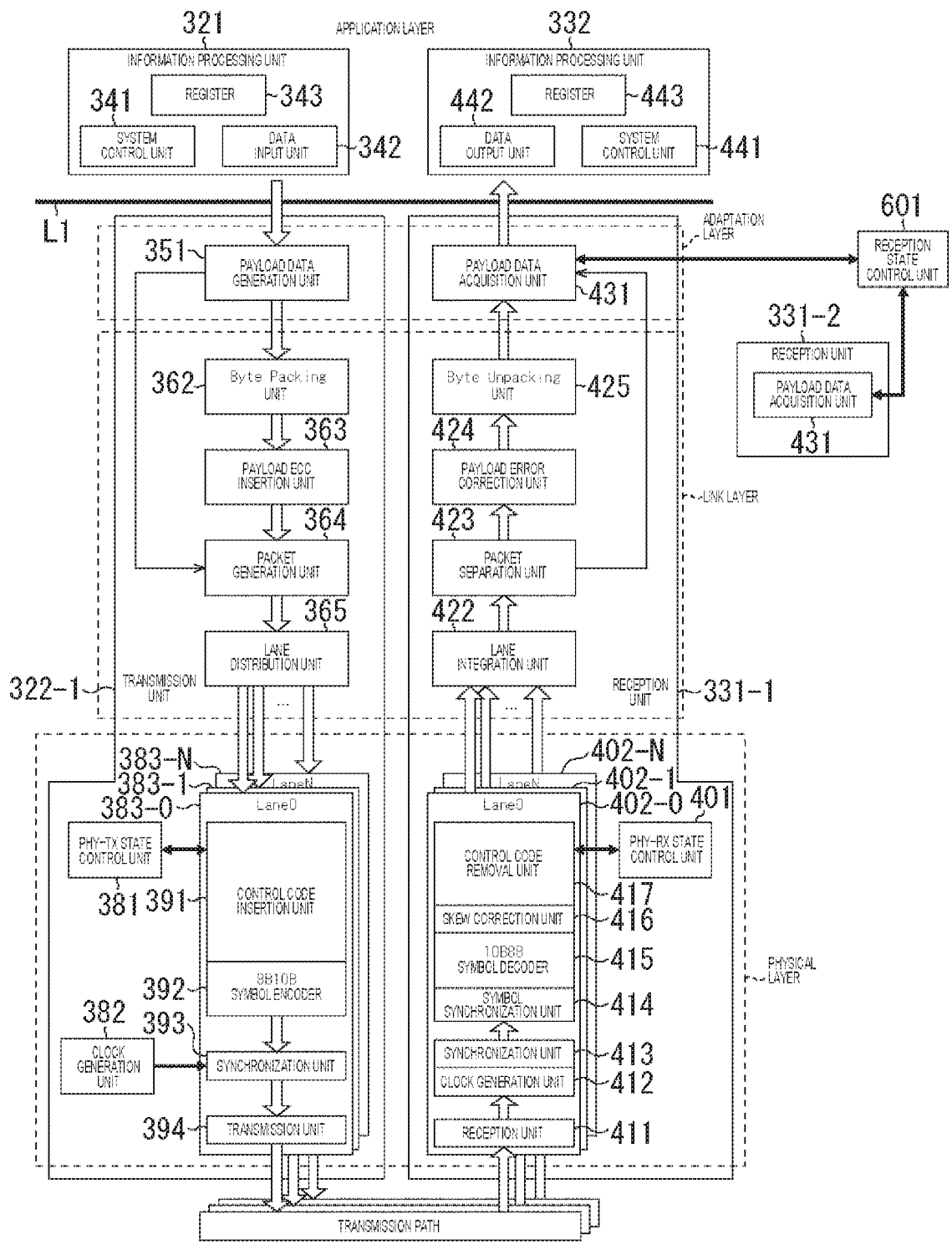
FIG. 53 is a diagram illustrating still another exemplary configuration of the transmission-side LSI and the reception-side LSI.

FIG. 53 is a diagram illustrating still another exemplary configuration of the transmission-side LSI 311 and the reception-side LSI 312.

In the example in FIG. 53, the reception state control unit 601 is connected to the payload data acquisition unit 431 of the reception unit 331-1 and is connected to the payload data acquisition unit 431 of the reception unit 331-2.

In FIG. 53, only the payload data acquisition unit 431 is illustrated as the configuration of the reception unit 331-2, and illustration of other components is omitted. In the reception unit 331-2, the configuration same as the configuration of the reception unit 331-1 including the payload data acquisition unit 431 is provided.

Data is transmitted between the information processing units 321 and 332 by using the multi-communication link including the communication links #0 and #1.

The payload data acquisition unit 431 of the reception unit 331-1 acquires the payload data of each packet supplied from the Byte Unpacking unit 425 of the link layer and outputs information regarding an acquisition timing to the reception state control unit 601. Furthermore, the payload data acquisition unit 431 corrects a timing of the detected payload data so as to adjust to the correction timing set by the reception state control unit 601 and outputs the data. An output timing of the payload data is corrected. The output timing of the payload data is corrected by using a FIFO provided in the payload data acquisition unit 431.

The payload data acquisition unit 431 of the reception unit 331-2 executes similar processing to the payload data acquisition unit 431 of the reception unit 331-1.

In other words, the payload data acquisition unit 431 of the reception unit 331-2 acquires the payload data of each packet supplied from the Byte Unpacking unit 425 of the link layer and outputs the information regarding the acquisition timing to the reception state control unit 601. Furthermore, the payload data acquisition unit 431 corrects a timing of the acquired payload data so as to adjust to the correction timing set by the reception state control unit 601 and outputs the data. The output timing of the payload data is corrected by using a FIFO provided in the payload data acquisition unit 431.

The reception state control unit 601 receives the information regarding the acquisition timing supplied from the payload data acquisition unit 431 of the reception unit 331-1 and the information regarding the acquisition timing supplied from the payload data acquisition unit 431 of the reception unit 331-2.

The reception state control unit 601 sets the correction timing on the basis of the acquisition timing of the payload data by the payload data acquisition unit 431 of the reception unit 331-1 and the acquisition timing of the payload data by the payload data acquisition unit 431 of the reception unit 331-2.

For example, the latest timing from among the timings of the corresponding pieces of the payload data acquired by the payload data acquisition unit 431 of the reception unit 331-1 and the payload data acquisition unit 431 of the reception unit 331-2 is set as a correction timing. The reception state control unit 601 outputs the information regarding the correction timing set in this way to the payload data acquisition unit 431 of the reception unit 331-1 and the payload data acquisition unit 431 of the reception unit 331-2.

Operation of Transmission System

Figure 54:
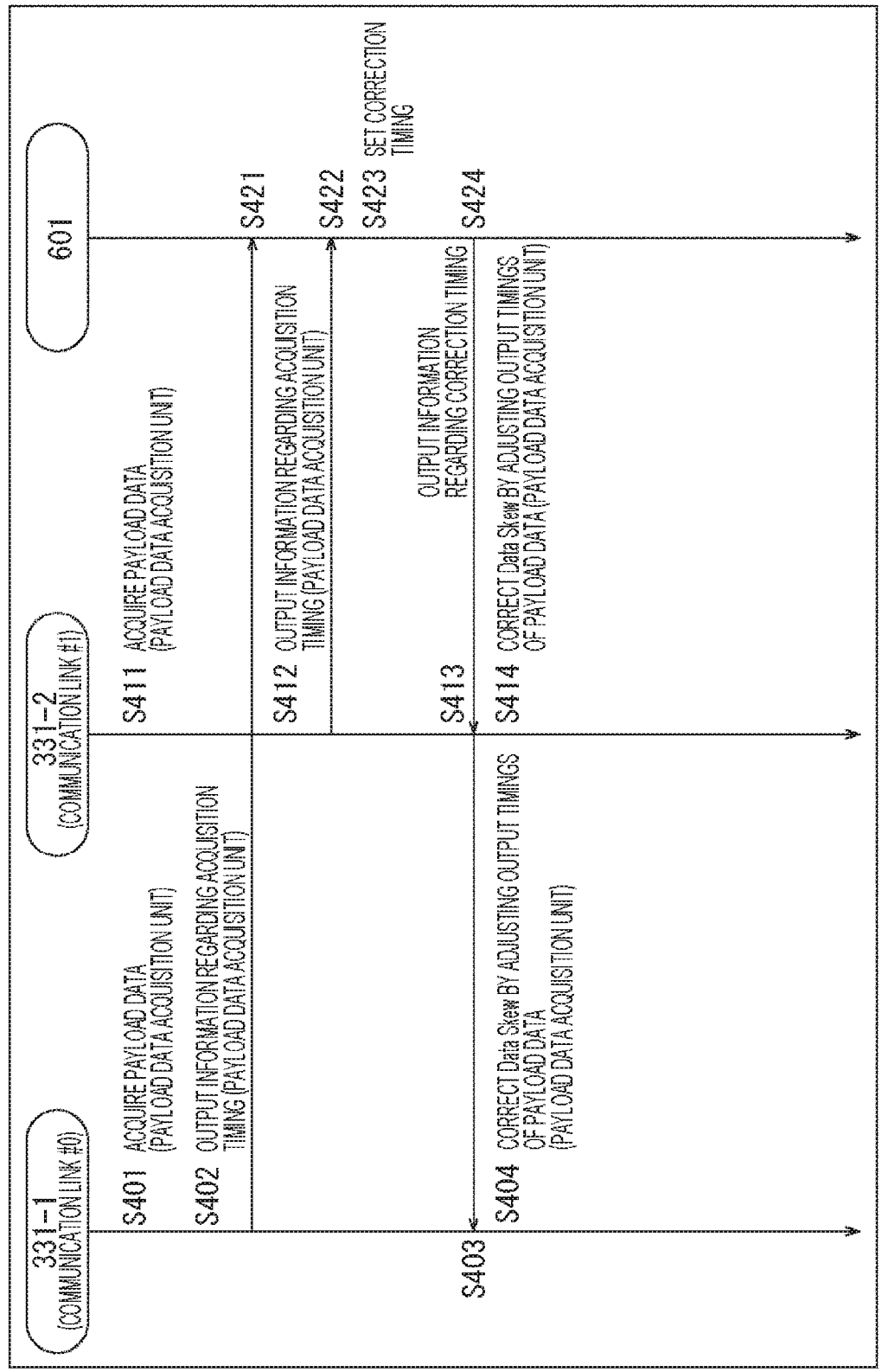
FIG. 54 is a sequence diagram for explaining a series of operations in a case where Data Skew between the communication links is corrected in an adaptation layer.

Next, a series of operations in a case where Data Skew between the communication links is corrected in the adaptation layer will be described with reference to the sequence diagram in FIG. 54.

In the reception unit 331-1, the data transmitted from the transmission unit 322-1 is received by the signal processing unit of each lane, and each processing of the physical layer is executed. Data in each lane output from the physical layer is integrated by the lane integration unit 422 as data in one system, and each processing in the link layer is executed. The payload data of each packet is output from the link layer to the payload data acquisition unit 431 of the adaptation layer. Note that, since the processing of the physical layer is executed, the data to be supplied to the payload data acquisition unit 431 is data of which Data Skew between the lanes has been corrected.

Similarly, in the reception unit 331-2, the data transmitted from the transmission unit 322-2 is received by the signal processing unit of each lane, and each processing of the physical layer is executed. Data in each lane output from the physical layer is integrated by the lane integration unit 422 as data in one system, and each processing in the link layer is executed. The payload data of each packet is output from the link layer to the payload data acquisition unit 431 of the adaptation layer.

In step S401, the payload data acquisition unit 431 of the reception unit 331-1 acquires the payload data of each packet supplied from the Byte Unpacking unit 425.

In step S402, the payload data acquisition unit 431 of the reception unit 331-1 outputs the information regarding the acquisition timing of the payload data to the reception state control unit 601.

On the other hand, similar processing is executed in the reception unit 331-2. In step S411, the payload data acquisition unit 431 of the reception unit 331-2 acquires the payload data of each packet supplied from the Byte Unpacking unit 425.

In step S412, the payload data acquisition unit 431 of the reception unit 331-2 outputs the information regarding the acquisition timing of the payload data to the reception state control unit 601.

In step S421, the reception state control unit 601 receives the information supplied from the payload data acquisition unit 431 of the reception unit 331-1.

Furthermore, in step S422, the reception state control unit 601 receives the information supplied from the payload data acquisition unit 431 of the reception unit 331-2.

In step S423, the reception state control unit 601 sets the correction timing on the basis of the timings of the corresponding pieces of the payload data acquired by the payload data acquisition unit 431 of the reception unit 331-1 and the payload data acquisition unit 431 of the reception unit 331-2.

In step S424, the reception state control unit 601 outputs the information regarding the correction timing to the payload data acquisition unit 431 of the reception unit 331-1 and the payload data acquisition unit 431 of the reception unit 331-2.

In step S403, the payload data acquisition unit 431 of the reception unit 331-1 receives the information regarding the correction timing supplied from the reception state control unit 601.

In step 3404, the payload data acquisition unit 431 of the reception unit 331-1 corrects Data Skew between the communication links by adjusting the timing of the acquired payload data to the correction timing and outputs the data.

On the other hand, similar processing is executed in the reception unit 331-2. In step S413, the payload data acquisition unit 431 of the reception unit 331-2 receives the information regarding the correction timing supplied from the reception state control unit 601.

In step S414, the payload data acquisition unit 431 of the reception unit 331-2 corrects Data Skew between the communication links by adjusting the timing of the acquired payload data to the correction timing and outputs the data.

Predetermined processing is executed on the payload data, in which Data Skew between the communication links is corrected, in the application layer.

The above processing is executed, for example, each time when the payload data is acquired in each communication link.

According to the above processing, it is possible to remove Data Skew between the communication links in the adaptation layer on the reception side.

Note that, since the configuration of the adaptation layer is not provided, in the transmission system using the multi-communication link of the CIS I/F, it is not possible to correct Data Skew between the communication links in the adaptation layer.

[(2-4) Fourth Example in a Case where Application Layer on Reception Side Removes Data Skew Between Communication Links]

It is possible to correct Data Skew between the communication links in the application layer on the reception side by correcting a timing of output of the payload data from the reception-side LSI 312 to another external processing unit.

In this case, the system control unit 441 of the information processing unit 332 sets the correction timing on the basis of the acquisition timing of the payload data supplied from the reception unit 331-1 and the acquisition timing of the payload data supplied from the reception unit 331-2.

The data output unit 442 acquires the payload data supplied from the reception unit 331-1 and the payload data supplied from the reception unit 331-2. Furthermore, the data output unit 442 corrects the timing of the acquired payload data to be adjusted to the correction timing set by the system control unit 441 and outputs the data. An output timing of the payload data is corrected. The output timing of the payload data is corrected by using a FIFO provided in the data output unit 442.

Note that, in this case, the reception state control unit 601 described above is not needed.

Operation of Transmission System

Figure 55:
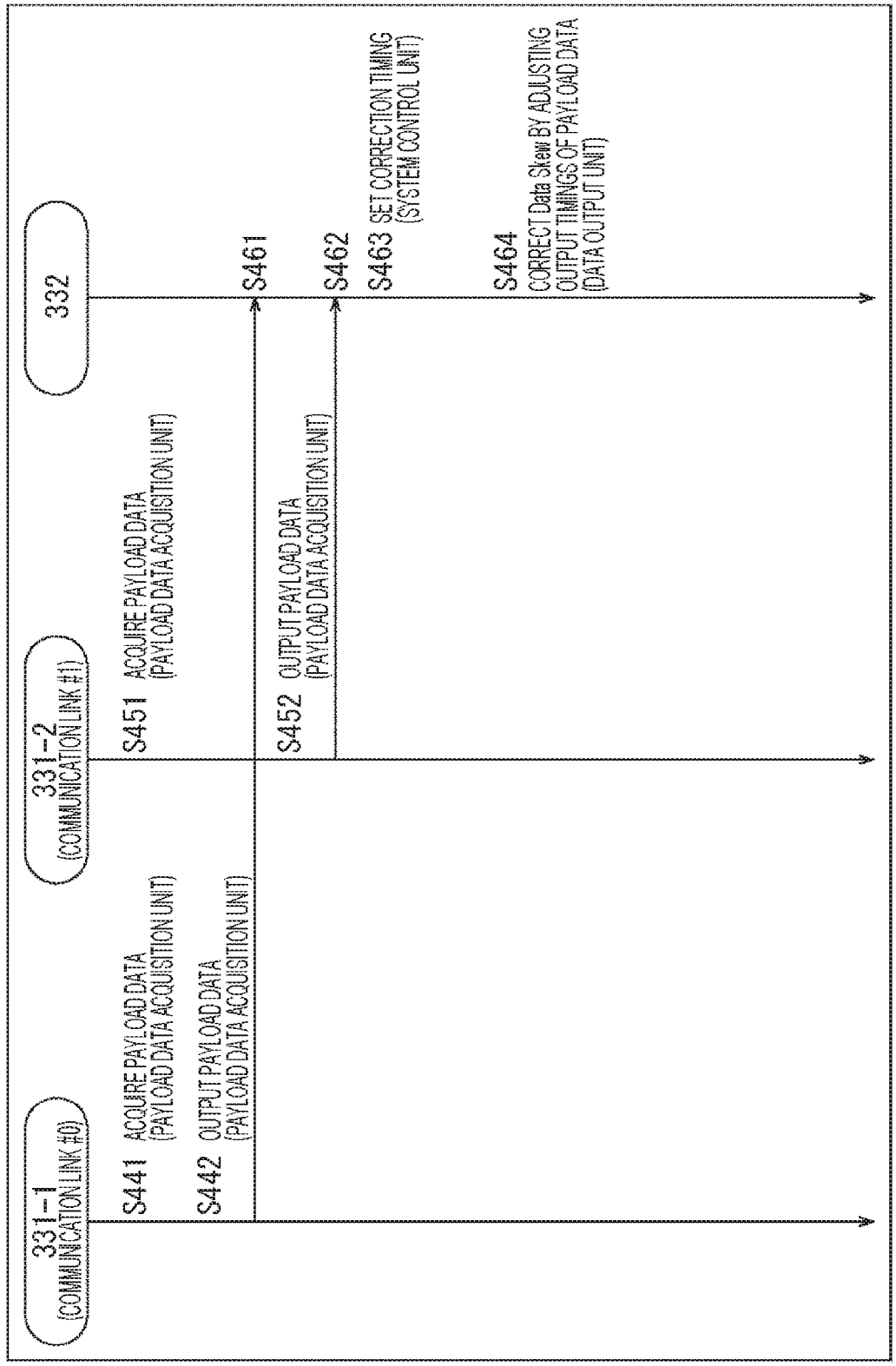
FIG. 55 is a sequence diagram for explaining a series of operations in a case where Data Skew between the communication links is corrected in an application layer.

A series of operations in a case where Data Skew between the communication links is corrected in the application layer will be described with reference to the sequence diagram in FIG. 55.

In the reception unit 331-1, the data transmitted from the transmission unit 322-1 is received by the signal processing unit of each lane, and each processing of the physical layer is executed. Data in each lane output from the physical layer is integrated by the lane integration unit 422 as data in one system, and each processing in the link layer is executed. The payload data of each packet is output from the link layer to the payload data acquisition unit 431 of the adaptation layer. Note that, since the processing of the physical layer is executed, the data to be supplied to the payload data acquisition unit 431 is data of which Data Skew between the lanes has been corrected.

Similarly, in the reception unit 331-2, the data transmitted from the transmission unit 322-2 is received by the signal processing unit of each lane, and each processing of the physical layer is executed. Data in each lane output from the physical layer is integrated by the lane integration unit 422 as data in one system, and each processing in the link layer is executed. The payload data of each packet is output from the link layer to the payload data acquisition unit 431 of the adaptation layer.

In step S441, the payload data acquisition unit 431 of the reception unit 331-1 acquires the payload data of each packet supplied from the Byte Unpacking unit 425.

In step S442, the payload data acquisition unit 431 of the reception unit 331-1 outputs the payload data to the application layer.

On the other hand, similar processing is executed in the reception unit 331-2. In step S451, the payload data acquisition unit 431 of the reception unit 331-2 acquires the payload data of each packet supplied from 5 the Byte Unpacking unit 425.

In step S452, the payload data acquisition unit 431 of the reception unit 331-2 outputs the payload data to the application layer.

In step S461, the data output unit 442 of the information processing unit 332 receives the payload data supplied from the payload data acquisition unit 431 of the reception unit 331-1.

Furthermore, in step S462, the data output unit 442 of the information processing unit 332 receives the payload data supplied from the payload data acquisition unit 431 of the reception unit 331-2.

In step S463, the system control unit 441 of the information processing unit 332 sets the correction timing on the basis of the timing of the corresponding pieces of the payload data.

In step S464, the data output unit 442 of the information processing unit 332 corrects Data Skew between the communication links by adjusting the timing of the acquired payload data to the correction timing and outputs the data.

The above processing is executed, for example, each time when the payload data is supplied from each communication link to the application layer.

According to the above processing, it is possible to remove Data Skew between the communication links in the application layer on the reception side.

Note that, even in the transmission system using the multi-communication link of the CIS I/F, Data Skew between the communication links is corrected in the application layer on the reception side according to the similar processing.

[(2-5) Fifth Example in a Case where Transmission Side Removes Data Skew Between Communication Links]

Exemplary Configuration of Transmission System

Figure 56:
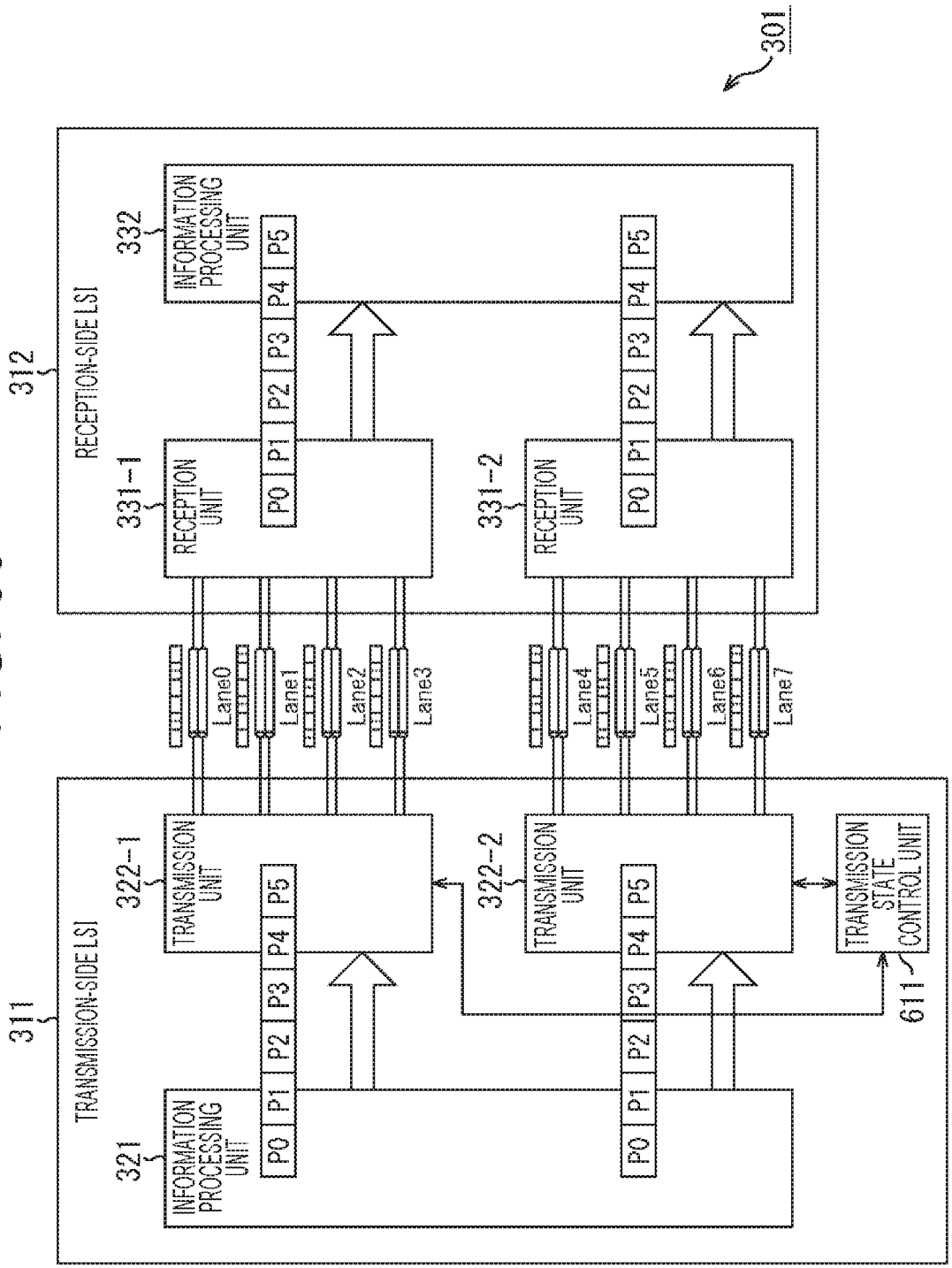
FIG. 56 is a diagram illustrating yet another exemplary configuration of the transmission system.

FIG. 56 is a diagram illustrating yet another exemplary configuration of the transmission system 301.

The transmission system 301 illustrated in FIG. 56 has a configuration different from the configuration illustrated in FIG. 47 in that a transmission state control unit 611 corresponding to the reception state control unit 601 is provided in the transmission-side LSI 311. The multi-communication link in the general-purpose I/F will be described. However, the same applies to the CIS I/F.

Figure 57:
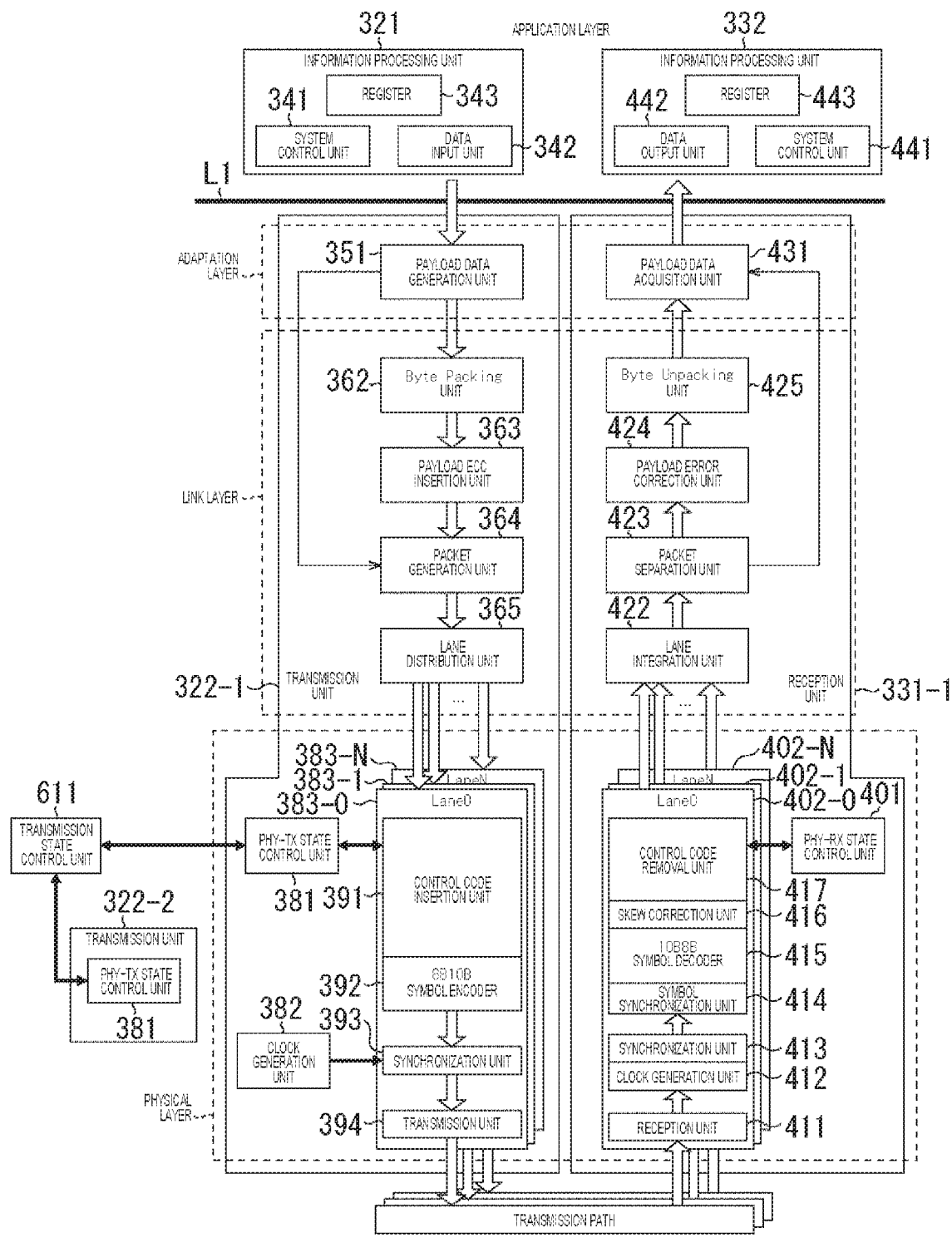
FIG. 57 is a diagram illustrating an exemplary configuration of the transmission-side LSI and the reception-side LSI in FIG. 56.

FIG. 57 is a diagram illustrating an exemplary configuration of the transmission-side LSI 311 and the reception-side LSI 312 in FIG. 56.

In FIG. 57, only the PHY-TX state control unit 381 is illustrated as the configuration of the transmission unit 322-2, and illustration of other components is omitted. In the transmission unit 322-2, the configuration same as the configuration of the transmission unit 322-1 including the PHY-TX state control unit 381 is provided.

Furthermore, in FIG. 57, as the configuration of the reception side, only the reception unit 331-1 that realizes the communication link #0 together with the transmission unit 322-1 is illustrated. The reception unit 331-2 that realizes the communication link #1 together with the transmission unit 322-2 is provided. The reception unit 331-2 receives data transmitted from the transmission unit 322-2 and outputs the data to the information processing unit 332.

As illustrated in FIG. 57, the transmission state control unit 611 is connected to the PHY-TX state control unit 381 of the transmission unit 322-1 and is connected to the PHY-TX state control unit 381 of the transmission unit 322-2.

The PHY-TX state control unit 381 of the transmission unit 322-1 outputs information regarding control timings relative to the signal processing units 383-0 to 383-N to the transmission state control unit 611. For example, the PHY-TX state control unit 381 outputs information regarding an insertion timing of a predetermined control code.

Furthermore, the PHY-TX state control unit 381 of the transmission unit 322-1 controls an operation by the control code insertion unit 391 of each of the signal processing units 383-0 to 383-N so as to insert the control code according to the correction timing set by the transmission state control unit 611.

The control code insertion unit 391 of each of the signal processing units 383-0 to 383-N of the transmission unit 322-1 inserts the control code according to the control by the PHY-TX state control unit 381.

Each unit of the transmission unit 322-2 executes processing similar to that of each unit of the transmission unit 322-1.

In other words, the PHY-TX state control unit 381 of the transmission unit 322-2 outputs information regarding control timings relative to the signal processing units 383-0 to 383-N to the transmission state control unit 611.

Furthermore, the PHY-TX state control unit 381 of the transmission unit 322-2 controls an operation by the control code insertion unit 391 of each of the signal processing units 383-0 to 383-N so as to insert the control code according to the correction timing set by the transmission state control unit 611.

The control code insertion unit 391 of each of the signal processing units 383-0 to 383-N of the transmission unit 322-2 inserts the control code according to the control by the PHY-TX state control unit 381.

The transmission state control unit 611 receives the information supplied from the PHY-TX state control unit 381 of the transmission unit 322-1 and the information supplied from the PHY-TX state control unit 381 of the transmission unit 322-2.

The transmission state control unit 611 sets the correction timing on the basis of the insertion timing of the predetermined control code by the PHY-TX state control unit 381 of the transmission unit 322-1 and the insertion timing of the predetermined control code by the PHY-TX state control unit 381 of the transmission unit 322-2.

For example, the latest timing from among the insertion timings of the control code insertion units 391 of the respective signal processing units 383-0 to 383-N of the transmission unit 322-1 and the insertion timings of the control code insertion units 391 of the respective signal processing units 383-0 to 383-N of the transmission unit 322-2 is set as the correction timing. The transmission state control unit 611 outputs the information regarding the correction timing set in this way to the PHY-TX state control unit 381 of the transmission unit 322-1 and the PHY-TX state control unit 381 of the transmission unit 322-2.

In this way, the transmission state control unit 611 controls the timing of the data processed by the transmission unit 322-1 and the timing of the data processed by the transmission unit 322-2 so as to correct Data Skew between the communication links. The transmission state control unit 611 functions as a control unit that corrects Data Skew between the communication links.

Operation of Transmission System

Next, a series of operations in a case where Data Skew between the communication links is corrected on the transmission side will be described with reference to the sequence diagram in FIG. 58.

Figure 58:
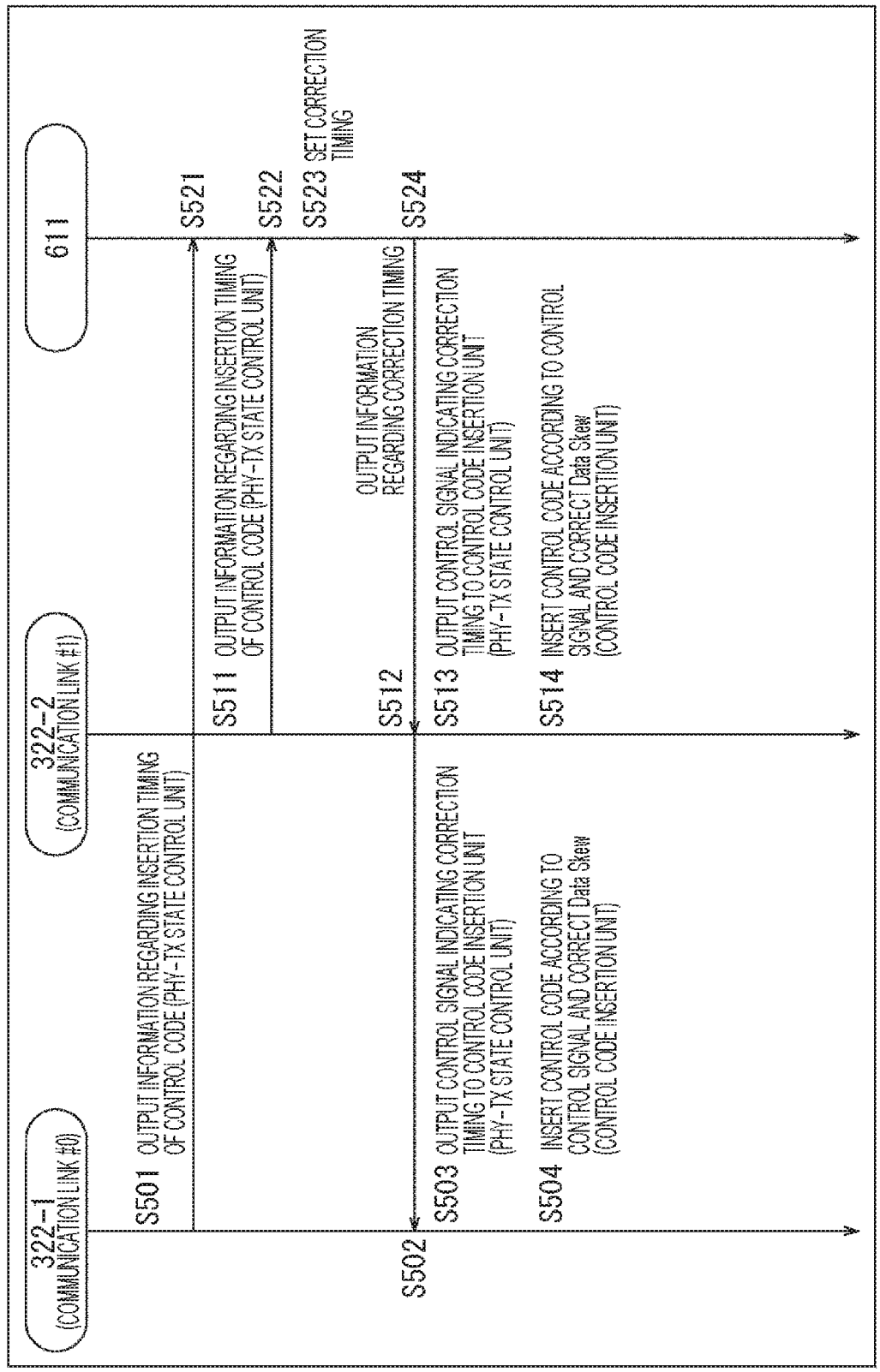
FIG. 58 is a sequence diagram for explaining a series of operations in a case where Data Skew between the communication links is corrected on the transmission side.

Processing illustrated at the left end of FIG. 58 is processing of the transmission unit 322-1 that realizes the communication link #0. Processing illustrated at the center is processing of the transmission unit 322-2 that realizes the communication link #1. Processing illustrated at the right end is processing of the transmission state control unit 611.

The transmission unit 322-1 executes each processing in the link layer on the data to be transmitted, and data distributed to each lane is output to the signal processing units 383-0 to 383-N of the physical layer. Similarly, the transmission unit 322-2 executes each processing in the link layer on the data to be transmitted, and data distributed to each lane is output to the signal processing units 383-0 to 383-N of the physical layer.

In step S501, the PHY-TX state control unit 381 of the transmission unit 322-1 outputs the information regarding the insertion timing of the predetermined control code to the transmission state control unit 611.

On the other hand, the transmission unit 322-2 executes similar processing. In step S511, the PHY-TX state control unit 381 of the transmission unit 322-2 outputs the information regarding the insertion timing of the corresponding predetermined control code to the transmission state control unit 611.

In step S521, the transmission state control unit 611 receives the information supplied from the PHY-TX state control unit 381 of the transmission unit 322-1.

Furthermore, in step S522, the transmission state control unit 611 receives the information supplied from the PHY-TX state control unit 381 of the transmission unit 322-2.

In step S523, the transmission state control unit 611 sets the correction timing on the basis of the insertion timing of the control code of the transmission unit 322-1 and the insertion timing of the control code of the transmission unit 322-2.

In step 3524, the transmission state control unit 611 outputs the information regarding the correction timing to the PHY-TX state control unit 381 of the transmission unit 322-1 and the PHY-TX state control unit 381 of the transmission unit 322-2.

In step S502, the PHY-TX state control unit 381 of the transmission unit 322-1 receives the information regarding the correction timing supplied from the transmission state control unit 611.

In step S503, the PHY-TX state control unit 381 of the transmission unit 322-1 outputs a control signal indicating the correction timing to the control code insertion unit 391 of each of the signal processing units 383-0 to 383-N.

In step S504, the control code insertion unit 391 of each of the signal processing units 383-0 to 383-N of the transmission unit 322-1 inserts the control code according to the correction timing indicated by the control signal so as to correct Data Skew between the communication links.

On the other hand, the transmission unit 322-2 executes similar processing. In step S512, the PHY-TX state control unit 381 of the transmission unit 322-2 receives the information regarding the correction timing supplied from the transmission state control unit 611.

In step S513, the PHY-TX state control unit 381 of the transmission unit 322-2 outputs a control signal indicating the correction timing to the control code insertion unit 391 of each of the signal processing units 383-0 to 383-N.

In step S514, the control code insertion unit 391 of each of the signal processing units 383-0 to 383-N of the transmission unit 322-2 inserts the control code according to the correction timing indicated by the control signal so as to correct Data Skew between the communication links.

After the other processing in the physical layer is executed on the data in each lane of which Data Skew between the communication links is corrected, the data in each lane is transmitted to the reception unit.

According to the above processing, the physical layer on the transmission side can remove Data Skew between the communication links caused in the link layer on the transmission side.

It is assumed that Data Skew between the communication links be corrected by adjusting the insertion timings of the control codes. However, Data Skew between the communication links may be corrected by adjusting a timing of other processing in the physical layer. For example, by matching an output timing of a predetermined symbol processed in each lane and the insertion timing of the other control code such as Start Code, End Code, and the like, it is possible to correct Data Skew between the communication links.

Note that, even in the transmission system using the multi-communication link of the CIS I/F, Data Skew between the communication links is corrected in the physical layer on the reception side according to the similar processing.

4. Modification

It is assumed that Data Skew between the communication links be corrected in any one of the four layers on the reception side. However, Data Skew may be corrected in two or more layers. In other words, it is possible to correct Data Skew between the communication links at least in any one of the physical layer, the link layer, the adaptation layer, or the application layer. In a case of the CIS I/F, it is possible to correct Data Skew between the communication links at least in any one of the physical layer, the link layer, or the application layer.

Furthermore, in the above description, Data Skew between the communication links is corrected on the reception side or the transmission side. However, Data Skew between the communication links may be corrected on both of the reception side and the transmission side.

It is assumed that the number of communication links included in the multi-communication link be two. However, the number of communication links may be equal to or more than three.

In the above, it is assumed that the image sensor 11 and the DSP 12 be provided in the same device. However, the image sensor 11 and the DSP 12 may be provided in different devices. Similarly, the transmission-side LSI 311 and the reception-side LSI 312 may be provided in the same device or different devices.

Exemplary Configuration of Computer

The above-mentioned series of processing can be performed by hardware and software. In a case where the software executes the series of processing, a program included in the software is installed from a program recording medium to a computer incorporated in dedicated hardware or, for example, a general-purpose personal computer.

Figure 59:
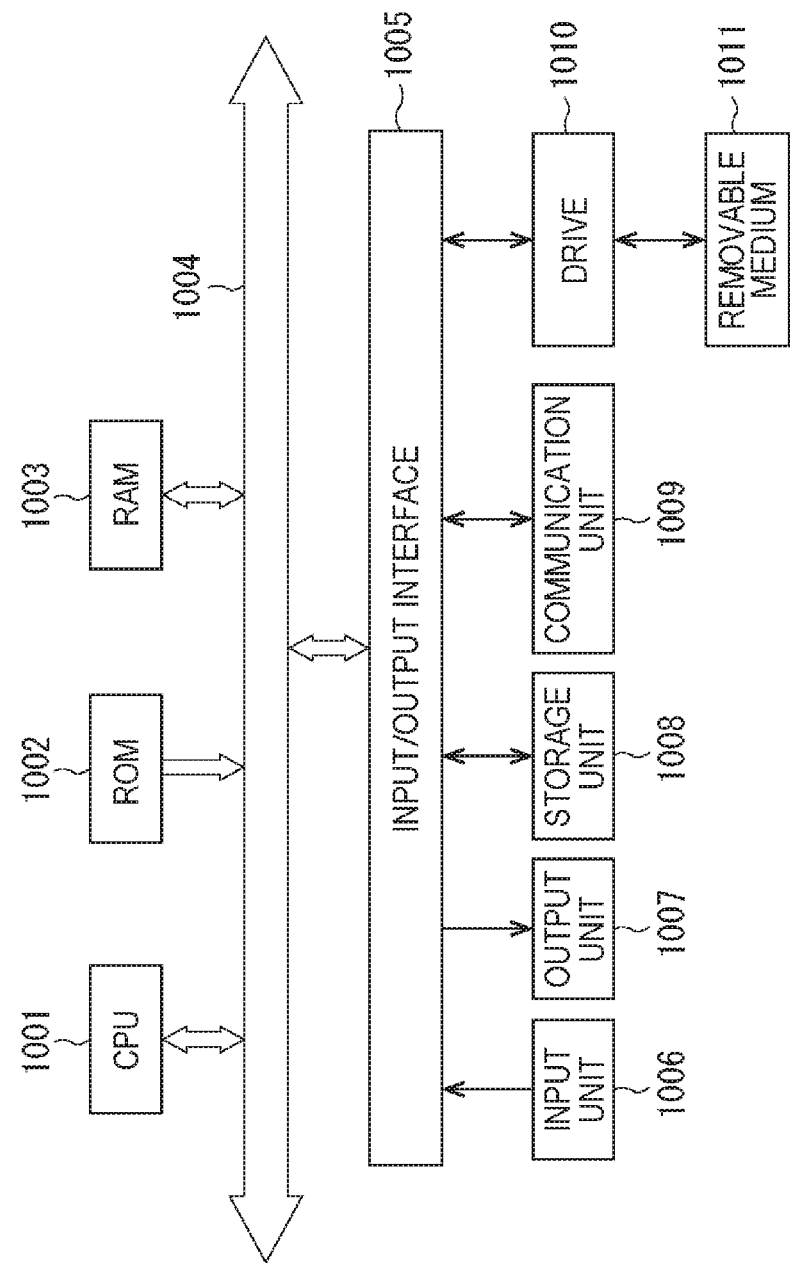
FIG. 59 is a block diagram illustrating an exemplary configuration of a computer.

FIG. 59 is a block diagram illustrating an exemplary configuration of hardware of the computer for executing the above-mentioned series of processing by the program.

A central processing unit (CPU) 1001, a read only memory (ROM) 1002, and a random access memory (RAM) 1003 are connected to each other with a bus 1004.

In addition, an input/output interface 1005 is connected to the bus 1004. The input/output interface 1005 is connected to an input unit 1006 including a keyboard, a mouse, and the like and an output unit 1007 including a display, a speaker, and the like. Furthermore, the input/output interface 1005 is connected to a storage unit 1008 including a hard disk, a non-volatile memory, and the like, a communication unit 1009 including a network interface and the like, and a drive 1010 that drives a removable medium 1011.

In the computer configured as described above, the CPU 1001 loads, for example, the program stored in the storage unit 1008 to the RAM 1003 via the input/output interface 1005 and the bus 1004 and executes the program so that the above-mentioned series of processing is executed.

The program executed by the CPU 1001 is provided and installed to the storage unit 1008, for example, by recording the program in the removable medium 1011, or via a wired or wireless transmission medium such as a local area network, the Internet, and digital broadcasting.

Note that, the program performed by the computer may be a program in which processing is executed along the order described herein in a time series manner and a program in which the processing is executed in parallel or at a necessary timing, for example, when a call has been performed.

The embodiment of the present technology is not limited to the above-mentioned embodiments, and various changes can be made without departing from the scope of the present technology.

Note that the effects described in the present specification are only exemplary and not limited to these. Furthermore, there may be an additional effect.

5. Application Example

The technology according to the present disclosure can be applied to various products. For example, the technology according to the present disclosure may be applied to an endoscopic surgery system. In this case, the image sensor 11 is provided in a casing of an endoscope, and the DSP 12 is provided in a casing of an image processing device that processes image data transmitted from the endoscope.

Figure 60:
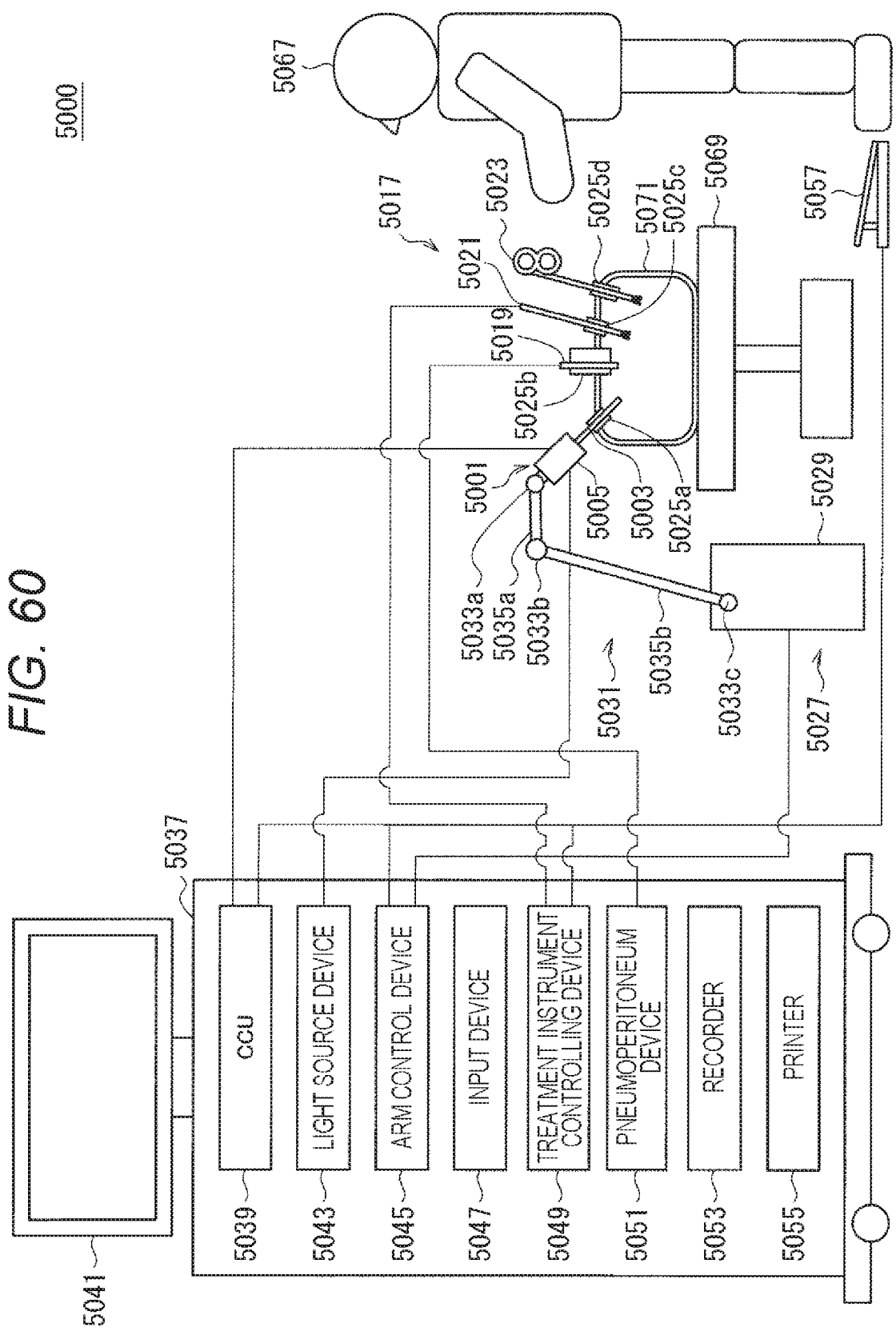
FIG. 60 is a diagram of an exemplary schematic configuration of an endoscopic surgery system.

FIG. 60 is a diagram illustrating an exemplary schematic configuration of an endoscopic surgery system 5000 to which the technology according to the present disclosure may be applied. In FIG. 60, a state is illustrated in which an operator (doctor) 5067 is operating a patient 5071 on a patient bed 5069 by using the endoscopic surgery system 5000. As illustrated in FIG. 60, the endoscopic surgery system 5000 includes an endoscope 5001, other surgical tools 5017, a supporting arm device 5027 for supporting the endoscope 5001, and a cart 5037 on which various devices for endoscopic surgery are mounted.

In endoscopic surgery, instead of cutting an abdominal wall and opening an abdomen, the abdominal wall is punctured by a plurality of cylindrical puncture devices referred to as trocars 5025a to 5025d. Then, through the trocars 5025a to 5025d, a lens barrel 5003 of the endoscope 5001 and the other surgical tools 5017 are inserted into the body cavity of the patient 5071. In the illustrated example, as the other surgical tools 5017, a pneumoperitoneum tube 5019, an energy treatment instrument 5021, and a forceps 5023 are inserted into the body cavity of the patient 5071. Furthermore, the energy treatment instrument 5021 is a treatment instrument which performs dissection and detachment of tissue, sealing of a blood vessel, or the like by high-frequency current or ultrasonic vibration. However, the illustrated surgical tools 5017 are only exemplary, and it is preferable to use various surgical tools used for general endoscopic surgery, for example, tweezers, a retractor, and the like as the surgical tools 5017.

An image of an operation site in the body cavity of the patient 5071 imaged by the endoscope 5001 is displayed on a display device 5041. While viewing the image of the operation site displayed on the display device 5041 in real time, the operator 5067 performs treatment, such as removing an affected part, or the like, by using the energy treatment instrument 5021 and the forceps 5023. Note that, although not illustrated, the pneumoperitoneum tube 5019, the energy treatment instrument 5021, and the forceps 5023 are supported by the operator 5067, an assistant, or the like during surgery.

(Supporting Arm Device)

The supporting arm device 5027 includes an arm portion 5031 extending from a base portion 5029. In the illustrated example, the arm portion 5031 includes joint portions 5033a, 5033b, and 5033c and links 5035a and 5035b and is driven by control of an arm control device 5045. The arm portion 5031 supports the endoscope 5001 and controls the position and the posture of the endoscope 5001. With this device, the endoscope 5001 may be stably fixed to a position.

(Endoscope)

The endoscope 5001 includes the lens barrel 5003 of which a portion with a predetermined length from a front end is inserted into the body cavity of the patient 5071 and a camera head 5005 connected to a base end of the lens barrel 5003. In the illustrated example, the endoscope 5001 formed as a so-called rigid endoscope having a rigid lens barrel 5003 is illustrated. However, the endoscope 5001 may be formed as a so-called flexible endoscope having a flexible lens barrel 5003.

At the front end of the lens barrel 5003, an opening in which an objective lens is fitted is provided. A light source device 5043 is connected to the endoscope 5001, and light generated by the light source device 5043 is guided to the front end of the lens barrel by a light guide extending in the lens barrel 5003 and is irradiated to an object to be observed in the body cavity of the patient 5071 through the objective lens. Note that the endoscope 5001 may be a forward-viewing endoscope, an oblique-viewing endoscope, or a side-viewing endoscope.

An optical system and an imaging element are provided in the camera head 5005, and light reflected by the object to be observed (observation light) is collected by the optical system to the imaging element. The imaging element photoelectrically converts the observation light and generates an electric signal corresponding to the observation light, that is, an image signal corresponding to an observation image. The image signal is transmitted to a Camera Control Unit (CCU) 5039 as RAW data. Note that the camera head 5005 has a function for adjusting the magnification and the focal distance by appropriately driving the optical system of the camera head 5005.

Note that, for example, to realize stereoscopic viewing (3D display) or the like, a plurality of imaging elements may be provided in the camera head 5005. In this case, a plurality of relay optical systems is provided in the lens barrel 5003 so as to guide the observation light to each of the plurality of imaging elements.

(Various Devices Mounted on Cart)

The CCU 5039 includes a Central Processing Unit (CPU), a Graphics Processing Unit (GPU), and the like and comprehensively controls the operations of the endoscope 5001 and the display device 5041. Specifically, the CCU 5039 executes various image processing to display an image based on an image signal, for example, developing processing (demosaic processing) or the like, on the image signal received from the camera head 5005. The CCU 5039 provides the image-processed image signal to the display device 5041. Furthermore, the CCU 5039 transmits a control signal to the camera head 5005 and controls driving of the camera head 5005. The control signal may include information regarding imaging conditions such as a magnification and a focal distance.

The display device 5041 displays the image based on the image signal on which the image processing has been performed by the CCU 5039 according to the control by the CCU 5039. For example, in a case where the endoscope 5001 is compatible with high resolution imaging such as 4K (the number of horizontal pixels 3840×the number of vertical pixels 2160) or 8K (the number of horizontal pixels 7680×the number of vertical pixels 4320), or the like, and/or in a case where the endoscope 5001 is compatible with 3D display, a display device which can achieve high resolution display and/or 3D display to cope with both cases may be used as the display device 5041. In a case where the display device 5041 is compatible with high resolution imaging such as 4K or 8K, more immersive feeling can be acquired by using a display device 5041 having a size equal to or larger than 55 inches. Furthermore, depending on the application, the plurality of display devices 5041 having different resolutions and different sizes may be provided.

The light source device 5043 includes a light source such as a Light Emitting Diode (LED) and the like, and supplies irradiation light, at the time when an operation site is imaged, to the endoscope 5001.

The arm control device 5045 includes, for example, a processor such as a CPU and operates according to a predetermined program so as to control driving of the arm portion 5031 of the supporting arm device 5027 according to a predetermined control method.

The input device 5047 may be an input interface relative to the endoscopic surgery system 5000. A user can input various information and input instructions to the endoscopic surgery system 5000 via the input device 5047. For example, the user inputs various information regarding the surgery such as body information of the patient, an operative method, and the like via the input device 5047. Furthermore, for example, the user inputs an instruction to drive the arm portion 5031, an instruction to change the imaging conditions (kind of irradiation light, magnification, focal distance, and the like) by the endoscope 5001, an instruction to drive the energy treatment instrument 5021, and the like via the input device 5047.

The kind of the input device 5047 is not limited, and the input device 5047 may be various known input devices. As the input device 5047, for example, a mouse, a keyboard, a touch panel, a switch, a foot switch 5057 and/or a lever, and the like may be applied. In a case where a touch panel is used as the input device 5047, the touch panel may be provided on a display surface of the display device 5041.

Alternatively, the input device 5047 is a device worn by the user, for example, a glass-type wearable device, a Head Mounted Display (HMD), or the like, and various inputs are performed according to a gesture and a line of sight of the user detected by these devices. Furthermore, the input device 5047 includes a camera which can detect a motion of the user, and various inputs are performed according to the gesture and the line of sight of the user detected from a video imaged by the camera. In addition, the input device 5047 includes a microphone which can collect voice of the user, and various inputs are performed by using voice via the microphone. In this way, the input device 5047 is configured to be capable of inputting various information in a non-contact manner so that the user (for example, operator 5067) belonging to an especially clean area can operate devices belonging to an unclean area in a non-contact manner. Furthermore, since the user can operate the device without releasing his hand from the holding surgical tools, convenience of the user is improved.

A treatment instrument controlling device 5049 controls driving of the energy treatment instrument 5021 for cauterizing or dissecting of tissue or sealing a blood vessel, for example. To secure a field of view and an operation space of an operator by the endoscope 5001, a pneumoperitoneum device 5051 injects gas into the body cavity through the pneumoperitoneum tube 5019 to swell the body cavity of the patient 5071. A recorder 5053 is a device capable of recording various information regarding surgery. A printer 5055 is a device capable of printing various information regarding surgery in various formats such as a text, an image, a graph, and the like.

Hereinafter, a particularly characteristic configuration of the endoscopic surgery system 5000 will be described in more detail.

(Supporting Arm Device)

The supporting arm device 5027 includes the base portion 5029 that is a base and the arm portion 5031 extending from the base portion 5029. In the illustrated example, the arm portion 5031 includes the plurality of joint portions 5033*a*, 5033*b*, and 5033*c* and the plurality of links 5035*a* and 5035*b* coupled by the joint portion 5033*b*. However, for easy understanding, the simplified configuration of the arm portion 5031 is illustrated in FIG. 60. Actually, shapes, the number, and arrangement of the joint portions 5033*a* to 5033*c* and the links 5035*a* and 5035*b*, directions of rotation axes of the joint portions 5033a to 5033c, and the like may be appropriately set so that the arm portion 5031 has a desired degree of freedom. For example, the arm portion 5031 may be preferably configured to have degrees of freedom equal to or more than six degrees of freedom. With this configuration, since the endoscope 5001 can be freely moved in a movable range of the arm portion 5031, the lens barrel 5003 of the endoscope 5001 can be inserted into the body cavity of the patient 5071 in a desired direction.

Actuators are provided in the joint portions 5033a to 5033c, and the joint portions 5033a to 5033c can rotate around a predetermined rotation axis by driving of the actuators. By controlling the driving of the actuators by the arm control device 5045, a rotation angle of each of the joint portions 5033a to 5033c is controlled, and the driving of the arm portion 5031 is controlled. With this operation, the position and the posture of the endoscope 5001 can be controlled. At this time, the arm control device 5045 can control the driving of the arm portion 5031 by various known control methods such as force control or position control.

For example, the operator 5067 appropriately performs an operation input via the input device 5047 (including foot switch 5057) so as to appropriately control the driving of the arm portion 5031 by the arm control device 5045 according to the operation input, and the position and the posture of the endoscope 5001 may be controlled. With this control, after the endoscope 5001 provided at the front end of the arm portion 5031 is moved from a certain position to a certain position, the endoscope 5001 can be fixedly supported at the position after being moved. Note that the arm portion 5031 may be operated by a so-called master-slave method. In this case, the arm portion 5031 may be remotely controlled by the user via the input device 5047 provided at a place away from the operating room.

Furthermore, in a case where the force control is applied, the arm control device 5045 may perform so-called power assist control of receiving external force from the user and driving the actuator of each of the joint portions 5033a to 5033c so as to smoothly move the arm portion 5031 according to the external force. With this control, when the user moves the arm portion 5031 while directly having contact with the arm portion 5031, the arm portion 5031 can be moved with relatively weak force. Therefore, the endoscope 5001 can be more intuitively moved by a more simple operation, and the convenience of the user can be improved.

Here, in general, a doctor called an endoscopic technician has supported the endoscope 5001 in the endoscopic surgery. On the other hand, by using the supporting arm device 5027, the position of the endoscope 5001 can be more reliably fixed without manual operations. Therefore, the image of the operation site can be stably acquired, and surgery can be smoothly performed.

Note that the arm control device 5045 is not necessarily provided on the cart 5037. Furthermore, the arm control device 5045 is not necessarily a single device. For example, the arm control device 5045 may be provided in each of the joint portions 5033a to 5033c of the arm portion 5031 of the supporting arm device 5027, and the driving of the arm portion 5031 may be controlled by operating the plurality of arm control devices 5045 in cooperation with each other.

(Light Source Device)

The light source device 5043 supplies irradiation light used for imaging the operation site to the endoscope 5001. The light source device 5043 includes, for example, an LED, a laser light source or a white light source configured by a combination of the LED and the laser light source. At this time, in a case where the white light source is configured by a combination of RGB laser light sources, an output intensity and an output timing of each color (each wavelength) can be controlled with high accuracy. Therefore, the light source device 5043 can adjust a white balance of the captured image. Furthermore, in this case, by irradiating the object to be observed with laser light from each of the RGB laser light sources in time division and controlling the driving of the imaging element of the camera head 5005 in synchronization with the irradiation timing, images respectively corresponding to the R, G, and B can be imaged in time division. According to this method, a color image can be acquired without providing a color filter in the imaging element.

Furthermore, the driving of the light source device 5043 may be controlled so as to change the intensity of output light for each predetermined time period. By controlling the driving of the imaging element of the camera head 5005 in synchronization with a timing of the change of the light intensity and acquiring the images in time division, and synthesizing the images, an image with a high dynamic range that does not have so-called blown-out highlights and blocked up shadows can be generated.

Furthermore, the light source device 5043 may be formed to be capable of supplying light in a predetermined wavelength band compatible with special light observation. In the special light observation, for example, by irradiating light in a narrower band than irradiation light (in other words, white light) at the time of normal observation using wavelength dependency of a body tissue to absorb light, so-called Narrow Band Imaging is performed, in which a predetermined tissue such as a blood vessel in a mucosal surface layer is imaged with high contrast. Alternatively, in the special light observation, fluorescence observation for acquiring an image with fluorescence generated by irradiating excitation light may be performed. In the fluorescence observation, the fluorescence from the body tissue may be observed by irradiating the body tissue with the excitation light (self-fluorescence observation), or it is possible to inject a reagent such as indocyanine green (ICG) in the body tissue and irradiate the body tissue with the excitation light corresponding to the fluorescence wavelength of the reagent to acquire a fluorescent image, for example. The light source device 5043 can supply narrow band light and/or excitation light compatible with such special light observation.

(Camera Head and CCU)

Figure 61:
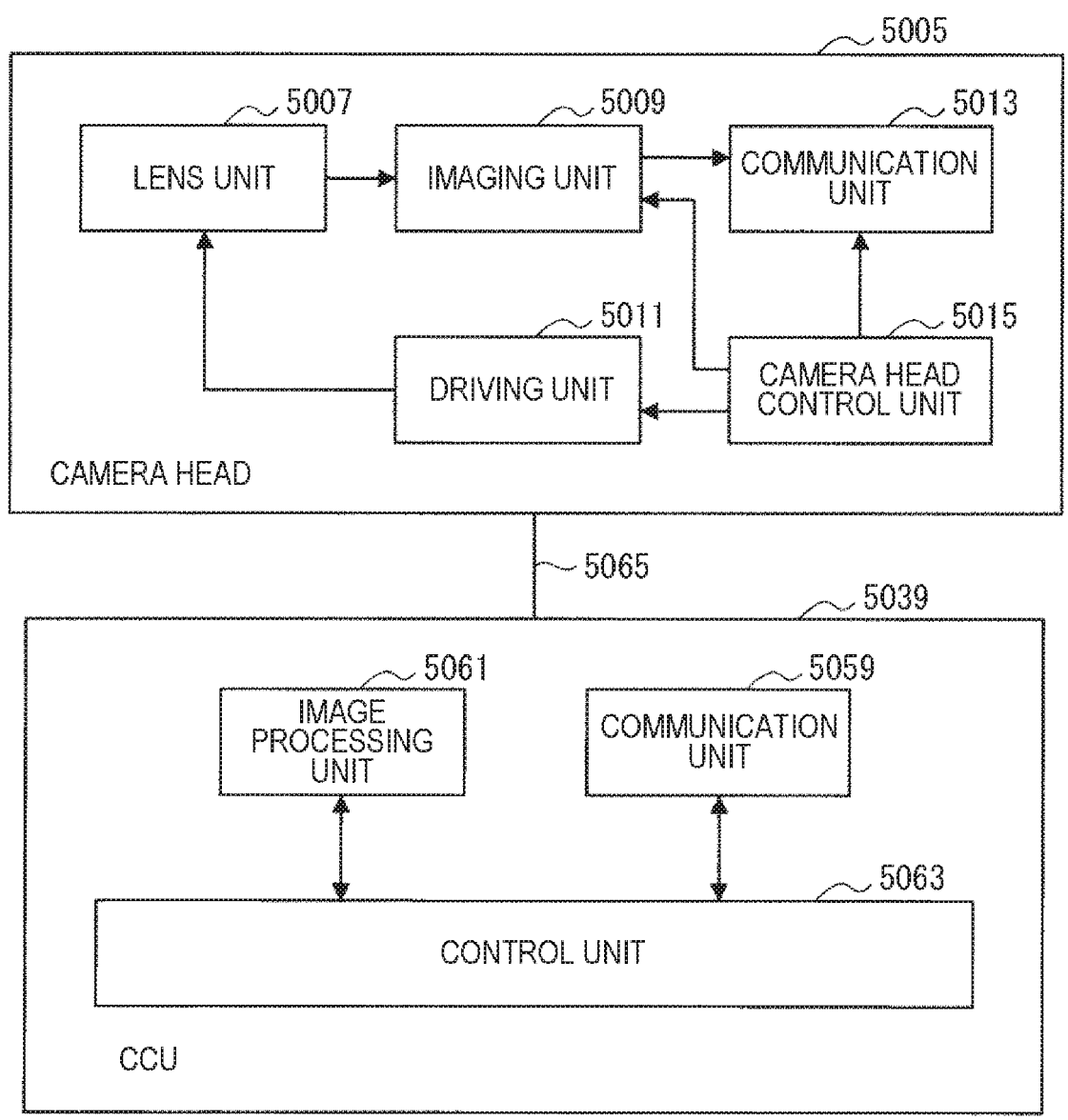
FIG. 61 is a block diagram of an exemplary functional configuration of a camera head and a CCU illustrated in FIG. 60.

Referring to FIG. 61, functions of the camera head 5005 and the CCU 5039 of the endoscope 5001 will be described in more detail. FIG. 61 is a block diagram of an exemplary functional configuration of the camera head 5005 and the CCU 5039 illustrated in FIG. 60.

Referring to FIG. 61, the camera head 5005 includes a lens unit 5007, an imaging unit 5009, a driving unit 5011, a communication unit 5013, and a camera head control unit 5015 as functions of the camera head 5005. Furthermore, the CCU 5039 includes a communication unit 5059, an image processing unit 5061, and a control unit 5063 as functions of the CCU 5039. The camera head 5005 and the CCU 5039 are communicably and bidirectionally connected to each other by a transmission cable 5065.

First, a functional configuration of the camera head 5005 will be described. The lens unit 5007 is an optical system provided at a connecting portion with the lens barrel 5003. Observation light taken from the front end of the lens barrel 5003 is guided to the camera head 5005 and enters the lens unit 5007. The lens unit 5007 is formed by combining a plurality of lenses including zoom lenses and focus lenses.

Optical characteristics of the lens unit 5007 are adjusted to collect the observation light on a light receiving surface of an imaging element of the imaging unit 5009. Furthermore, positions of the zoom lens and the focus lens on the optical axis can be moved to adjust a magnification and a focus of an imaged image.

The imaging unit 5009 includes the imaging element and is arranged at a subsequent stage of the lens unit 5007. The observation light which has passed through the lens unit 5007 is collected on the light receiving surface of the imaging element, and an image signal corresponding to an observation image is generated by photoelectric conversion. The image signal generated by the imaging unit 5009 is provided to the communication unit 5013.

The imaging element included in the imaging unit 5009 is, for example, a Complementary Metal Oxide Semiconductor (CMOS) type image sensor which has a Bayer arrangement and can perform color imaging. Note that, as the imaging element, an imaging element that can cope with imaging an image with a high resolution, for example, equal to or more than 4K may be used. By acquiring the image of the operation site with high resolution, the operator 5067 can recognize the state of the operation site in more detail, and the surgery can be more smoothly progressed.

Furthermore, the imaging element configuring the imaging unit 5009 includes a pair of imaging elements for respectively acquiring image signals for right and left eyes coping with the 3D display. With the 3D display, the operator 5067 can more accurately recognize the depth of the living tissue in the operation site. Note that in a case where the imaging unit 5009 has a multi-plate type configuration, a plurality of lens units 5007 is provided in correspondence with the imaging elements.

Furthermore, the imaging unit 5009 is not necessarily provided in the camera head 5005. For example, the imaging unit 5009 may be provided just behind the objective lens in the lens barrel 5003.

The driving unit 5011 includes an actuator and moves the zoom lens and the focus lens of the lens unit 5007 by a predetermined distance along the optical axis under the control by the camera head control unit 5015. With this movement, the magnification and the focus of the image imaged by the imaging unit 5009 may be appropriately adjusted.

The communication unit 5013 includes a communication device for transmitting and receiving various information to/from the CCU 5039. The communication unit 5013 transmits the image signal acquired from the imaging unit 5009 to the CCU 5039 via the transmission cable 5065 as RAW data. At this time, to display the imaged image of the operation site with low latency, it is preferable that the image signal be transmitted by optical communication. This is because, since the operator 5067 performs surgery while observing the state of the affected part by using the imaged image at the time of surgery, it is required to display a moving image of the operation site in real time as possible for safer and more reliable surgery. In a case where the optical communication is performed, a photoelectric conversion module which converts an electric signal into an optical signal is provided in the communication unit 5013. After the image signal is converted into the optical signal by the photoelectric conversion module, the image signal is transmitted to the CCU 5039 via the transmission cable 5065.

Furthermore, the communication unit 5013 receives a control signal for controlling the driving of the camera head 5005 from the CCU 5039. The control signal includes, for example, information regarding the imaging conditions such as information specifying a frame rate of the imaged image, information specifying an exposure value at the time of imaging, and/or information specifying the magnification and the focus of the imaged image. The communication unit 5013 provides the received control signal to the camera head control unit 5015. Note that the control signal from the CCU 5039 may be transmitted by optical communication. In this case, a photoelectric conversion module which converts an optical signal into an electric signal is provided in the communication unit 5013, and after converted into an electric signal by the photoelectric conversion module, the control signal is provided to the camera head control unit 5015.

Note that the control unit 5063 of the CCU 5039 automatically sets the imaging conditions such as the frame rate, the exposure value, the magnification and the focus on the basis of the acquired image signal. That is, the endoscope 5001 has a so-called Auto Exposure (AE) function, an Auto Focus (AF) function, and an Auto White Balance (AWB) function.

The camera head control unit 5015 controls the driving of the camera head 5005 on the basis of the control signal from the CCU 5039 received via the communication unit 5013. For example, the camera head control unit 5015 controls the driving of the imaging element of the imaging unit 5009 on the basis of the information specifying the frame rate of the imaged image and/or the information specifying the exposure at the time of imaging. Furthermore, for example, the camera head control unit 5015 appropriately moves the zoom lens and the focus lens of the lens unit 5007 via the driving unit 5011 on the basis of the information specifying the magnification and the focus of the imaged image. The camera head control unit 5015 may further have a function for storing information for identifying the lens barrel 5003 and the camera head 5005.

Note that, by arranging the components such as the lens unit 5007, the imaging unit 5009, and the like in a sealed structure having high airtightness and waterproofness, the camera head 5005 can have resistance to autoclave sterilization.

Next, the functional configuration of the CCU 5039 will be described. The communication unit 5059 includes a communication device for transmitting and receiving various information to/from the camera head 5005. The communication unit 5059 receives the image signal transmitted from the camera head 5005 via the transmission cable 5065. At this time, as described above, the image signal may be preferably transmitted by optical communication. In this case, to be compatible with optical communication, a photoelectric conversion module which converts an optical signal into an electric signal is provided in the communication unit 5059. The communication unit 5059 provides the image signal converted into the electric signal to the image processing unit 5061.

Furthermore, the communication unit 5059 transmits the control signal to control the driving of the camera head 5005 to the camera head 5005. The control signal may be transmitted by optical communication.

The image processing unit 5061 executes various image processing on the image signal that is the RAW data transmitted from the camera head 5005. The image processing includes various known signal processing, for example, development processing, image quality enhancement processing (band emphasis processing, super-resolution processing, Noise Reduction (NR) processing, and/or camera shake correction processing, and/or the like), and/or enlargement processing (electronic zoom processing), and/or the like. Furthermore, the image processing unit 5061 executes detection processing on the image signal so as to achieve the AE, the AF, and the AWB.

The image processing unit 5061 includes a processor such as a CPU and a GPU, and the processor operates according to a predetermined program so that the image processing and the detection processing may be executed. Note that, in a case where the image processing unit 5061 includes the plurality of GPUs, the image processing unit 5061 appropriately divides information regarding the image signal and executes the image processing in parallel by using the plurality of GPUs.

The control unit 5063 performs various controls regarding imaging of the operation site by the endoscope 5001 and display of the imaged image. For example, the control unit 5063 generates the control signal to control the driving of the camera head 5005. At this time, in a case where the imaging conditions are input by the user, the control unit 5063 generates the control signal on the basis of the input by the user. Alternatively, in a case where the AE function, the AF function, and the AWB function are mounted on the endoscope 5001, the control unit 5063 appropriately calculates an optimum exposure value, focal distance, and white balance according to the result of the detection processing by the image processing unit 5061 and generates a control signal.

Furthermore, the control unit 5063 makes the display device 5041 display the image of the operation site on the basis of the image signal on which the image processing has been executed by the image processing unit 5061. In this case, the control unit 5063 recognizes various objects in the image of the operation site by using various image recognition technologies. For example, by detecting an edge shape, a color, and the like of the object included in the image of the operation site, the control unit 5063 can recognize surgical tools such as a forceps, a specific body portion, bleed, mist at the time of using the energy treatment instrument 5021, and the like. When making the display device 5041 display the image of the operation site, the control unit 5063 superimposes and displays various surgery assist information on the image of the operation site by using the recognition result. The surgery assist information is superimposed and displayed, and is presented to the operator 5067 so that the surgery can be more safely and reliably proceeded.

The transmission cable 5065 for connecting the camera head 5005 and the CCU 5039 is an electric signal cable compatible with electric signal communication, an optical fiber compatible with optical communication, or a composite cable thereof.

Here, in the illustrated example, wired communication has been performed by using the transmission cable 5065. However, the camera head 5005 and the CCU 5039 may wirelessly communicate with each other. In a case where the camera head 5005 and the CCU 5039 wirelessly communicate with each other, it is not necessary to provide the transmission cable 5065 in the operating room. Therefore, a state where movement of a medical staff in the operating room is prevented by the transmission cable 5065 may be resolved.

An example of the endoscopic surgery system 5000 to which the technology according to the present disclosure may be applied has been described above. Note that, here, the endoscopic surgery system 5000 has been described as an example. However, a system to which the technology according to the present disclosure may be applied is not limited to the example. For example, the technology according to the present disclosure may be applied to a flexible endoscope system for examination and a microsurgical system.

[Example of Combination of Configurations]

The present technology can have the following configuration.

(1)

A reception device including:

a plurality of reception units configured to execute processing for receiving data streams that have same data structures and are transmitted from a plurality of transmission units included in a transmission device by using a plurality of lanes in parallel as processing of a first layer and execute processing for integrating the received data streams into a single system data and acquiring a packet configuring the data stream as processing of a second layer; and a control unit configured to correct a difference between timings of corresponding pieces of data in respective communication links realized by each pair of the one transmission unit and the one reception unit.

(2)

The reception device according to (1), in which each of the plurality of reception units detects known information from the received data stream, and the control unit corrects the difference between the timings on the basis of a detection timing of the known information by each of the reception units.

(3)

The reception device according to (2), in which each of the plurality of reception units includes signal processing units that execute the processing of the first layer in parallel as many as the number of lanes and includes a processing unit that executes the processing of the second layer.

(4)

The reception device according to (3), in which each of the plurality of reception units detects a control code as the known information by each of the signal processing units, and the control unit corrects the difference between the timings by matching timings of the control codes of the respective signal processing units.

(5)

The reception device according to (3) or (4), in which each of the plurality of reception units detects payload data configuring the packet by the processing unit as the known information, and the control unit corrects the difference between the timings by matching output timings of the payload data by the respective processing units.

(6)

The reception device according to any one of (3) to (5), in which each of the plurality of reception units further includes an acquisition unit that executes processing for acquiring payload data configuring the packet output from the processing unit as processing of a third layer and detects the payload data configuring the packet as the known information by the acquisition unit, and the control unit corrects the difference between the timings by matching output timings of the payload data of the respective acquisition units to an external information processing unit.

(7)

The reception device according to any one of (3) to (6), in which the control unit receives data output from the plurality of reception units and matches output timing of the received data to outside so as to correct the difference between the timings.

(8)

A control method including:

executing processing for receiving data streams that have same data structures and are transmitted from a plurality of transmission units included in a transmission device by using a plurality of lanes in parallel as processing of a first layer and executing processing for integrating the received data streams into a single system data and acquiring a packet configuring the data stream as processing of a second layer by a plurality of reception units; and correcting a difference between timings of corresponding pieces of data in respective communication links realized by each pair of the one transmission unit and the one reception unit.

(9)

A program causing a computer to execute processing including steps of:

executing processing for receiving data streams that have same data structures and are transmitted from a plurality of transmission units included in a transmission device by using a plurality of lanes in parallel as processing of a first layer and executing processing for integrating the received data streams into a single system data and acquiring a packet configuring the data stream as processing of a second layer by a plurality of reception units; and correcting a difference between timings of corresponding pieces of data in respective communication links realized by each pair of the one transmission unit and the one reception unit.

(10)

A transmission device including:

a plurality of transmission units configured to execute processing including generation of a packet that stores data to be transmitted and processing for distributing the generated packet into a plurality of lanes as processing of a first layer and execute processing for transmitting data streams having same data structures including the distributed packet to a reception device including a plurality of reception units by using the plurality of lanes in parallel as processing of a second layer; and a control unit configured to correct a difference between timings of corresponding pieces of data in communication links realized by each pair of the one transmission unit and the one reception unit.

(11)

The transmission device according to (10), in which each of the plurality of transmission units includes signal processing units that execute the processing of the second layer in parallel as many as the number of lanes, and the control unit corrects the difference between the timings by matching timings of insertion of control codes into the data streams by the respective signal processing units.

(12)

A control method including:

executing processing including generation of a packet that stores data to be transmitted and processing for distributing the generated packet into a plurality of lanes as processing of a first layer and executing processing for transmitting data streams having same data structures including the distributed packet to a reception device including a plurality of reception units by using the plurality of lanes in parallel as processing of a second layer by a plurality of transmission units; and correcting a difference between timings of corresponding pieces of data in respective communication links realized by each pair of the one transmission unit and the one reception unit.

(13)

A program causing a computer to execute processing including steps of:

executing processing including generation of a packet that stores data to be transmitted and processing for distributing the generated packet into a plurality of lanes as processing of a first layer and executing processing for transmitting data streams having same data structures including the distributed packet to a reception device including a plurality of reception units by using the plurality of lanes in parallel as processing of a second layer by a plurality of transmission units; and correcting a difference between timings of corresponding pieces of data in respective communication links realized by each pair of the one transmission unit and the one reception unit.

(14)

A transmission and reception system including:

a transmission device including:

a plurality of transmission units that executes processing including generation of a packet that stores data to be transmitted and processing for distributing the generated packet into a plurality of lanes as processing of a first layer and executes processing for transmitting data streams having same data structures including the distributed packet by using the plurality of lanes in parallel as processing of a second layer; and a reception device including:

a plurality of reception units that executes processing for receiving data streams that are transmitted from a plurality of the transmission units by using a plurality of lanes in parallel as the processing of the second layer and executes processing for integrating the received data streams into a single system data and acquiring a packet configuring the data stream as the processing of the second layer; and a control unit that corrects a difference between timings of corresponding pieces of data in respective communication links realized by each pair of the one transmission unit and the one reception unit.

REFERENCE SIGNS LIST

1 Transmission system
11 Image sensor
12 DSP
21 Imaging unit
22 Transmission unit
31 Reception unit
32 Image processing unit
62 Pixel to Byte converter
63 Payload ECC insertion unit
64 Packet generation unit
65 Lane distribution unit
72 Header generation unit
83-0 to 83-N Signal processing unit
91 Control code insertion unit
92 8B10B symbol encoder
93 Synchronization unit
94 Transmission unit 102-0 to 102-N Signal processing unit
111 Reception unit
112 Clock generation unit
113 Synchronization unit
114 Symbol synchronization unit
115 10B8B symbol decoder
116 Skew correction unit
117 Control code removal unit
122 Lane integration unit
123 Packet separation unit
124 Payload error correction unit
125 Byte to Pixel converter
132 Header error correction unit

The invention claimed is:

1. A reception device comprising:
a plurality of receivers configured to execute processing for receiving data streams that have same data structures and are received from a plurality of transmitters included in a transmission device by using a plurality of lanes in parallel as processing of a first layer and execute processing for integrating the received data streams into a single system data and acquiring a packet configuring the data stream as processing of a second layer; and
a controller configured to correct a difference between timings of corresponding pieces of data in communication links realized by each pair of one of the transmitters and one of the receivers, wherein
each of the plurality of receivers detects known information from the received data stream,
the controller corrects the difference between the timings on a basis of a detection timing of the known information by each of the receivers,
each of the plurality of receivers includes signal processors that execute the processing of the first layer in parallel as many as the number of lanes, a processor that executes the processing of the second layer, and acquisition circuitry configured to execute processing for acquiring payload data configuring the packet output from the processor as processing of a third layer,
each of the plurality of receivers detects the payload data configuring the packet as the known information by the acquisition circuitry, and
the controller corrects the difference between the timings by matching output timings of the payload data of the respective acquisition circuitries to an external information processor.

2. The reception device according to claim 1, wherein
each of the plurality of receivers detects a control code as the known information by each of the signal processors, and
the controller corrects the difference between the timings by matching timings of the control codes of the respective signal processors.

3. The reception device according to claim 1, wherein
each of the plurality of receivers detects payload data configuring the packet by the processor as the known information, and
the controller corrects the difference between the timings by matching output timings of the payload data by the respective processors.

4. The reception device according to claim 1, wherein
the controller receives data output from the plurality of receivers and matches output timing of the received data to outside so as to correct the difference between the timings.

5. A control method comprising:
executing, by a plurality of receivers, processing for receiving data streams that have same data structures and are received from a plurality of transmitters included in a transmission device by using a plurality of lanes in parallel as processing of a first layer and executing processing for integrating the received data streams into a single system data and acquiring a packet configuring the data stream as processing of a second layer by a plurality of receivers; and
correcting, by a controller, a difference between timings of corresponding pieces of data in respective communication links realized by each pair of one of the transmitters and one of the receivers, wherein
each of the plurality of receivers detects known information from the received data stream,
the controller corrects the difference between the timings on a basis of a detection timing of the known information by each of the receivers,
each of the plurality of receivers includes signal processors that execute the processing of the first layer in parallel as many as the number of lanes, a processor that executes the processing of the second layer, and acquisition circuitry configured to execute processing for acquiring payload data configuring the packet output from the processor as processing of a third layer,
each of the plurality of receivers detects the payload data configuring the packet as the known information by the acquisition circuitry, and
the controller corrects the difference between the timings by matching output timings of the payload data of the respective acquisition circuitries to an external information processor.

6. A non-transitory computer readable medium storing a program, the program being executable by a computer to perform operations comprising:
executing processing for receiving data streams that have same data structures and are received from a plurality of transmitters included in a transmission device by using a plurality of lanes in parallel as processing of a first layer and executing processing for integrating the received data streams into a single system data and acquiring a packet configuring the data stream as processing of a second layer by a plurality of receivers; and
correcting a difference between timings of corresponding pieces of data in respective communication links realized by each pair of one of the transmitters and one of the receivers, wherein
each of the plurality of receivers detects known information from the received data stream,
the controller corrects the difference between the timings on a basis of a detection timing of the known information by each of the receivers,
each of the plurality of receivers includes signal processors that execute the processing of the first layer in parallel as many as the number of lanes, a processor that executes the processing of the second layer, and acquisition circuitry configured to execute processing for acquiring payload data configuring the packet output from the processor as processing of a third layer,
each of the plurality of receivers detects the payload data configuring the packet as the known information by the acquisition circuitry, and the controller corrects the difference between the timings by matching output timings of the payload data of the respective acquisition circuitries to an external information processor.

7. A transmission and reception system comprising:
a transmission device including:
a plurality of transmitters that executes processing including generation of a packet that stores data to be transmitted and processing for distributing the generated packet into a plurality of lanes as processing of a first layer and executes processing for transmitting data streams having same data structures including the distributed packet by using the plurality of lanes in parallel as processing of a second layer; and
a reception device including:
a plurality of receivers that executes processing for receiving data streams that are transmitted from the plurality of the transmitters by using a plurality of lanes in parallel as the processing of the second layer and executes processing for integrating the received data streams into a single system data and acquiring a packet configuring the data stream as the processing of the first layer; and
a controller that corrects a difference between timings of corresponding pieces of data in respective communication links realized by each pair of one of the transmitters and one of the receivers, wherein
each of the plurality of receivers detects known information from the received data stream,
the controller corrects the difference between the timings on a basis of a detection timing of the known information by each of the receivers,
each of the plurality of receivers includes signal processors that execute the processing of the first layer in parallel as many as the number of lanes, a processor that executes the processing of the second layer, and acquisition circuitry configured to execute processing for acquiring payload data configuring the packet output from the processor as processing of a third layer,
each of the plurality of receivers detects the payload data configuring the packet as the known information by the acquisition circuitry, and
the controller corrects the difference between the timings by matching output timings of the payload data of the respective acquisition circuitries to an external information processor.

8. The transmission and reception system according to claim 4, wherein
each of the plurality of receivers detects a control code as the known information by each of the signal processors, and
the controller corrects the difference between the timings by matching timings of the control codes of the respective signal processors.

9. The transmission and reception system according to claim 4, wherein
each of the plurality of receivers detects payload data configuring the packet by the processor as the known information, and
the controller corrects the difference between the timings by matching output timings of the payload data by the respective processors.

10. The transmission and reception system according to claim 4, wherein
the controller receives data output from the plurality of receivers and matches output timing of the received data to outside so as to correct the difference between the timings.

11. The non-transitory computer readable medium according to claim 6, wherein
each of the plurality of receivers detects a control code as the known information by each of the signal processors, and
the controller corrects the difference between the timings by matching timings of the control codes of the respective signal processors.

12. The non-transitory computer readable medium according to claim 6, wherein
each of the plurality of receivers detects payload data configuring the packet by the processor as the known information, and
the controller corrects the difference between the timings by matching output timings of the payload data by the respective processors.

13. The non-transitory computer readable medium according to claim 6, wherein
the controller receives data output from the plurality of receivers and matches output timing of the received data to outside so as to correct the difference between the timings.

* * * * *